(12) United States Patent
Peikert et al.

(10) Patent No.: US 10,810,583 B2
(45) Date of Patent: Oct. 20, 2020

(54) DIGITAL ASSET MODELING

(71) Applicant: Digital Asset Holdings, LLC, New York, NY (US)

(72) Inventors: Vincent Peikert, New York, NY (US); Ratko Goran Veprek, New York, NY (US); Johan Sjodin, New York, NY (US); James Litsios, New York, NY (US); Alexander Bernauer, New York, NY (US); Darko Pilav, New York, NY (US); Robin Krom, New York, NY (US); Simon Meier, New York, NY (US); Shaul Kfir, New York, NY (US)

(73) Assignee: Digital Asset Holdings, New York, NY (US)

( * ) Notice: Subject to any disclaimer, the term of this patent is extended or adjusted under 35 U.S.C. 154(b) by 661 days.

(21) Appl. No.: 15/181,144

(22) Filed: Jun. 13, 2016

(65) Prior Publication Data

US 2017/0316391 A1   Nov. 2, 2017

Related U.S. Application Data

(60) Provisional application No. 62/329,888, filed on Apr. 29, 2016.

(51) Int. Cl.
*G06Q 20/38* (2012.01)
*G06Q 20/12* (2012.01)
(Continued)

(52) U.S. Cl.
CPC ....... *G06Q 20/382* (2013.01); *G06Q 20/1235* (2013.01); *H04L 9/006* (2013.01);
(Continued)

(58) Field of Classification Search
CPC .................................................. G06Q 20/0658
See application file for complete search history.

(56) References Cited

U.S. PATENT DOCUMENTS 5,978,779 A   11/1999 Stein et al.
7,957,991 B2 * 6/2011 Mikurak ................ G06Q 10/06
                                             705/7.11
(Continued)

FOREIGN PATENT DOCUMENTS

| CN | 104915249 A | 9/2015 |
|----|-------------|--------|
| KR | 20150129223 A | 11/2015 |

(Continued)

OTHER PUBLICATIONS

Ignatovich and Passmore, Feb. 26, 2016, public comment on Reg ATS-N, "Imandra Modeling Language".*

(Continued)

*Primary Examiner* — Jacob C. Coppola
(74) *Attorney, Agent, or Firm* — Lerner, David, Littenberg, Krumholz & Mentlik, LLP

(57) ABSTRACT

A system and method are provided for modeling and interpreting a modeled digital asset and its evolution with respect to the rights of a plurality of parties, the method comprising: executing an await function instance no more than once using one of at least one choice defined therein for disposition of the digital asset with respect to the rights of at least one of the plurality of parties, said await function instance incorporated upon the consent of the affected parties to fulfil a configured function instance associated with the at least one choice; executing an agree function instance that requires the consent of at least one of the plurality of parties to execute; and storing the results of the executed function instances in an append-only ledger.

30 Claims, 44 Drawing Sheets

(51) Int. Cl.
  *H04L 9/00* (2006.01)
  *H04L 9/32* (2006.01)
  *H04L 9/06* (2006.01)

(52) U.S. Cl.
  CPC .......... *H04L 9/0637* (2013.01); *H04L 9/3239* (2013.01); *H04L 2209/38* (2013.01); *H04L 2209/56* (2013.01)

(56) References Cited

U.S. PATENT DOCUMENTS

| | | | |
|---|---|---|---|
| 8,121,913 B2 | 2/2012 | Bracken et al. | |
| 8,655,782 B2 | 2/2014 | Poon et al. | |
| 9,594,542 B2* | 3/2017 | Gabel | G06F 8/20 |
| 2002/0152086 A1* | 10/2002 | Smith | G06Q 10/10 |
| | | | 705/80 |
| 2002/0194136 A1* | 12/2002 | Sullivan | G06Q 20/382 |
| | | | 705/64 |
| 2003/0023527 A1* | 1/2003 | Wilce | G06Q 50/188 |
| | | | 705/35 |
| 2004/0083159 A1 | 4/2004 | Crosby et al. | |
| 2006/0036530 A1* | 2/2006 | Shkedy | G06Q 30/00 |
| | | | 705/37 |
| 2009/0254572 A1* | 10/2009 | Redlich | G06Q 10/06 |
| 2010/0076824 A1 | 3/2010 | Wallman | |
| 2013/0166455 A1 | 6/2013 | Feigelson | |
| 2013/0317984 A1 | 11/2013 | O'Leary et al. | |
| 2014/0164251 A1 | 6/2014 | Loh | |
| 2014/0229739 A1 | 8/2014 | Roth et al. | |
| 2014/0230007 A1 | 8/2014 | Roth et al. | |
| 2014/0279540 A1 | 9/2014 | Jackson | |
| 2014/0279557 A1 | 9/2014 | Abou-Nasr et al. | |
| 2014/0298042 A1 | 10/2014 | Ogura et al. | |
| 2014/0380402 A1 | 12/2014 | Roth | |
| 2015/0120569 A1 | 4/2015 | Belshe et al. | |
| 2015/0161414 A1 | 6/2015 | Pandian et al. | |
| 2015/0206106 A1* | 7/2015 | Yago | G06F 21/645 |
| | | | 705/68 |
| 2015/0209678 A1 | 7/2015 | Edwards et al. | |
| 2015/0235011 A1 | 8/2015 | Swaminathan et al. | |
| 2015/0254640 A1 | 9/2015 | Cassano et al. | |
| 2015/0262176 A1 | 9/2015 | Langschaedel et al. | |
| 2015/0271148 A1 | 9/2015 | Ahari et al. | |
| 2015/0287014 A1 | 10/2015 | Granbery | |
| 2015/0294308 A1 | 10/2015 | Pauker et al. | |
| 2015/0324789 A1 | 11/2015 | Dvorak et al. | |
| 2015/0324909 A1* | 11/2015 | deOliveira | G06Q 40/02 |
| | | | 705/38 |
| 2015/0332256 A1 | 11/2015 | Minor | |
| 2015/0341176 A1 | 11/2015 | Staykov et al. | |
| 2015/0262173 A1 | 12/2015 | Durbin et al. | |
| 2015/0356555 A1* | 12/2015 | Pennanen | G06Q 20/06 |
| | | | 705/71 |
| 2015/0363769 A1 | 12/2015 | Ronca et al. | |
| 2015/0363770 A1 | 12/2015 | Ronca et al. | |
| 2015/0363772 A1 | 12/2015 | Ronca et al. | |
| 2015/0363773 A1 | 12/2015 | Ronca et al. | |
| 2015/0363777 A1 | 12/2015 | Ronca et al. | |
| 2015/0363778 A1 | 12/2015 | Ronca et al. | |
| 2015/0363782 A1 | 12/2015 | Ronca et al. | |
| 2015/0363783 A1 | 12/2015 | Ronca et al. | |
| 2015/0363876 A1 | 12/2015 | Ronca et al. | |
| 2015/0365283 A1 | 12/2015 | Ronca et al. | |
| 2015/0379510 A1* | 12/2015 | Smith | G06Q 20/3829 |
| | | | 705/71 |
| 2016/0012465 A1* | 1/2016 | Sharp | G06Q 20/18 |
| | | | 705/14.17 |
| 2016/0078539 A1* | 3/2016 | Ignatovich | G06F 30/20 |
| | | | 705/37 |
| 2016/0092988 A1* | 3/2016 | Letourneau | G06Q 40/06 |
| | | | 705/66 |
| 2016/0098730 A1* | 4/2016 | Feeney | G06Q 30/0185 |
| | | | 705/71 |
| 2016/0117471 A1* | 4/2016 | Belt | G06F 19/3456 |
| | | | 705/2 |
| 2016/0292672 A1* | 10/2016 | Fay | G06Q 20/363 |
| 2016/0292680 A1* | 10/2016 | Wilson, Jr. | G06Q 20/3674 |
| 2016/0350749 A1* | 12/2016 | Wilkins | G06Q 20/382 |
| 2017/0005804 A1* | 1/2017 | Zinder | H04L 9/3247 |
| 2017/0046526 A1* | 2/2017 | Chan | G06Q 20/102 |
| 2017/0046698 A1* | 2/2017 | Haldenby | G06Q 30/0214 |
| 2017/0098291 A1* | 4/2017 | Code | G06Q 40/02 |
| 2017/0132621 A1* | 5/2017 | Miller | G06Q 20/3829 |
| 2017/0132630 A1 | 5/2017 | Castinado et al. | |
| 2017/0140408 A1* | 5/2017 | Wuehler | G06Q 30/0207 |
| 2017/0177898 A1* | 6/2017 | Dillenberger | G06F 16/2379 |
| 2017/0230375 A1* | 8/2017 | Kurian | H04L 63/102 |
| 2017/0279774 A1* | 9/2017 | Booz | G06F 16/24568 |
| 2017/0287068 A1* | 10/2017 | Nugent | G06Q 20/08 |
| 2017/0287090 A1* | 10/2017 | Hunn | G06F 40/166 |
| 2017/0316391 A1* | 11/2017 | Peikert | H04L 9/0637 |
| 2017/0331896 A1* | 11/2017 | Holloway | H04L 9/12 |
| 2019/0147415 A1* | 5/2019 | Peikert | H04L 9/006 |
| | | | 705/64 |

FOREIGN PATENT DOCUMENTS

| | | | | |
|---|---|---|---|---|
| WO | 2012079170 A1 | 6/2012 | | |
| WO | 2014201459 A1 | 12/2014 | | |
| WO | WO-2015171580 A1 * | 11/2015 | ............ | G06Q 40/02 |
| WO | 2017098519 A1 | 6/2017 | | |

OTHER PUBLICATIONS

UK Government Chief Scientific Adviser, Feb. 19, 2016, "Distributed ledger Technology: Blackett Review", UK Open Government Licence.*
Norta, Alex, "Creation of Smart-Contracting Collaborations for Decentralized Autonomous Organizations," International Conference on Business Informatics Research, Aug. 18, 2015, all pages. (Year: 2015).*
"The Digital Asset Platform Non-technical White Paper," Digital Asset Holdings, LLC, all pages. (Year: 2016).*
Szabo, Nick, "Formalizing and Securing Relationships on Public Networks," First Monday, 1997, all pages. (Year: 1997).*
Buterin, Vitalik, "A Next Generation Smart Contract & Decentralized Application Platform," ethereum.org, all pages. (Year: 2014).*
Molina-Jimenez et al., "A Model for Checking Contractual Compliance of Business Interactions," IEEE Transactions and Services Computing, vol. 5, No. 2, 2012, all pages. (Year: 2012).*
International Search Report dated Jul. 19, 2017, in related International Application No. PCT/IB2017/052462; 5 pages.
Written Opinion dated Jul. 19, 2017, in related International Application No. PCT/IB2017/052462; 7 pages.
Examination Report dated Jan. 15, 2018, in corresponding Australian Application No. 2016266092; 6 pages.
Plooy, C.J. (Apr. 2015). "Emulation of Hash-Time-Locked Contracts of the Lightning network by a trusted, but publically auditable escrow service," available from https://cornwarecjp.github.io/amiko-pay/doc/lightning_emulation.pdf (13 pages).
International Search Report and Written Opinion cited in corresponding International Application No. PCT/US16/37253 dated Sep. 9, 2016.
Notification of Transmittal of International Preliminary Report on Patentability dated Aug. 27, 2018, in International Application No. PCT/IB2017/052462; 9 pages.
Citation List from Examination Report 1 for AU2016266092 dated Jan. 13, 2017.
Watanabe Hiroki et al: 11 Blockchain contract: A complete consensus using blockchain 11 2015 IEEE 4th Global Conference on Consumer Electronics (GCCE). IEEE. Oct. 27, 2015 (Oct. 27, 2015). pp. 577-578. XP032858173. DOI: 10.1109/GCCE.2015. 7398721 [retrieved on Feb. 3, 2016] * abstract * *Chapter III. 11 Proposed Method 11 *.
Anna Lali Tsilidou et al: "Further applications of the blockchain" 12th Student Conference on Managerial Science and Technology. May 1, 2015 (May 1, 2015). pp. 1-8. XP55629175. Athens Retrieved

(56) References Cited

OTHER PUBLICATIONS from the Internet: URL:https:jjwww.researchgate.netjprofile/Georgios_Forogloujpublicationj276304843 Further_applications_of_the_blockchain/links/5ba0a02a92851ca9edllcccf/Further-applications-of-the-blockchain.pdf [retrieved on Oct. 7, 2019] * abstract * * chapter 2. "Current and future uses of blockchain technology" *.
Supplementary European Search Report for EP17788929 dated Oct. 16, 2019.
Written Opinion dated Jul. 19, 2017 in International Application No. PCT/IB2017/052462; 7 pages.
International Preliminary Report on Patentability dated Aug. 27, 2018, in International Application No. PCT/IB2017/052462; 9 pages.
Second Written Opinion dated Apr. 5, 2018, in International Application No. PCT/IB2017/052462; 8 pages.

\* cited by examiner

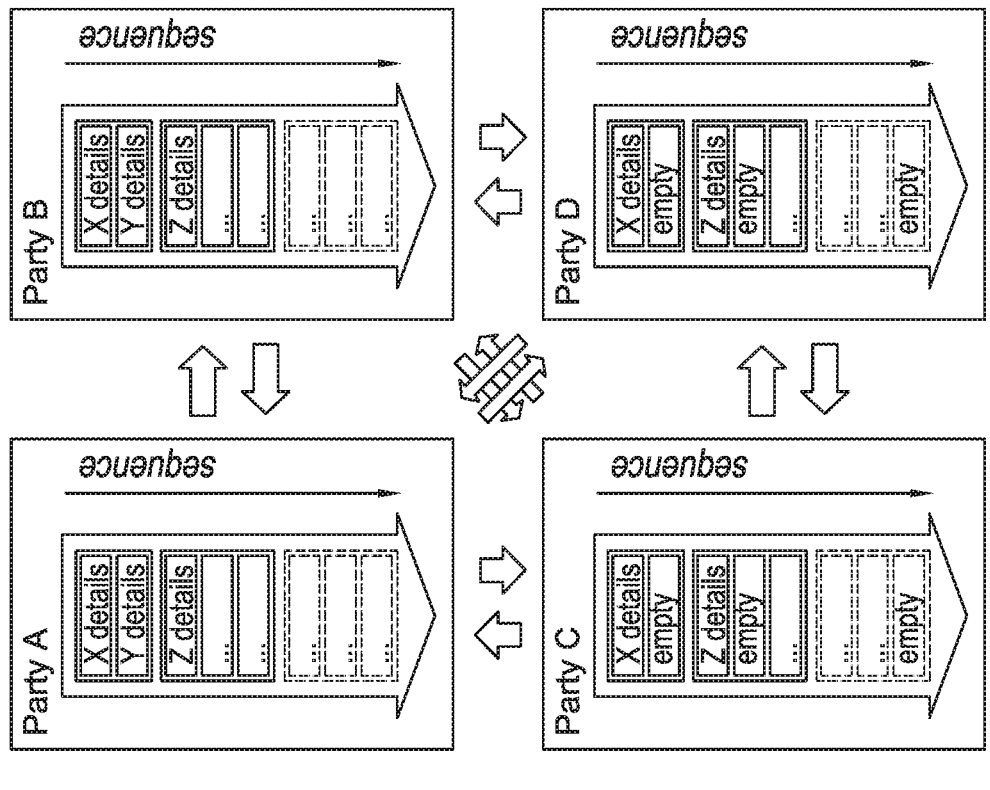
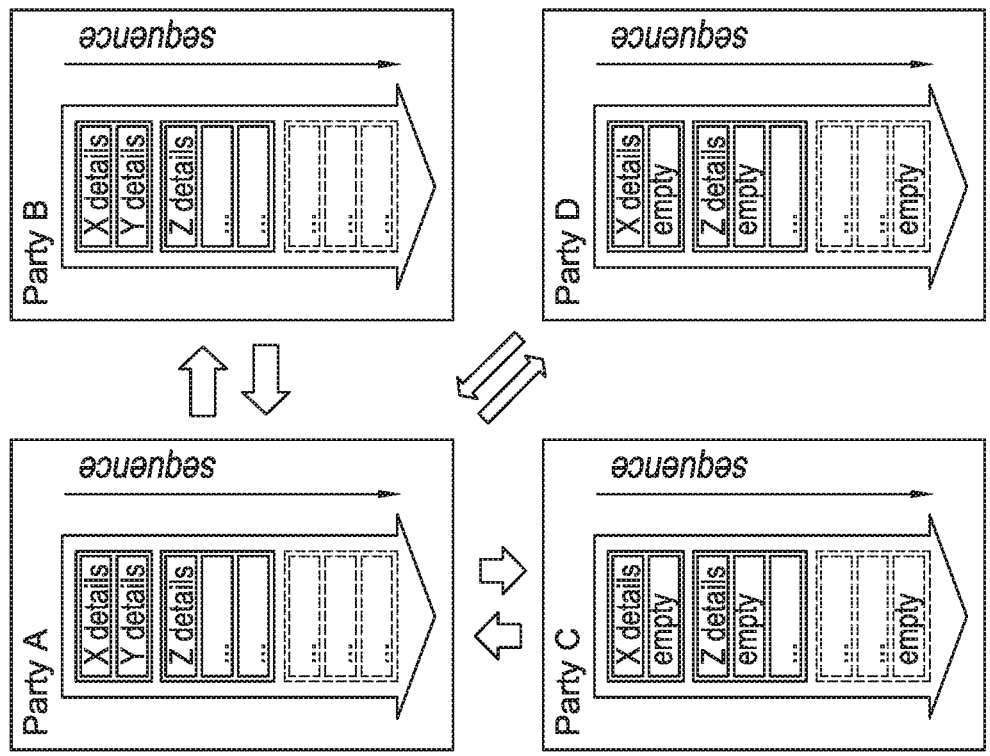
FIG. 24

```
...
registry chooses
    mid              :: ContractId,
    amountChange     :: Integer -> Integer,
    newShareClass    :: Text,
    newOutstanding   :: Integer,
    reason           :: Text,
    effective        :: time
at tchoose
such that
    mid ~
       mandatoryCorporateAction issuer registry
       shareClass version amountChange newShareClass newOutstanding
       reason effective
    && effective <= tchoose
then
  { "notification": registry, custodian agree "corporate action" <> <> "due to" <> reason
  , "equity" : equity accountId issuer registry newShareClass (version + 1)
       custodian (amountChange amount) newOutstanding
  }
...
```

E.g. agreement within an equity contract

FIG. 37

DIGITAL ASSET MODELING

CROSS-REFERENCE

This application claims priority under 35 USC § 119 to U.S. Provisional Patent Application No. 62/329,888 entitled Digital Asset Modelling Language Simulator, filed on Apr. 29, 2016 in the United States Patent and Trademark Office (USPTO), the contents of which are herein incorporated by reference in their entirety.

TECHNICAL FIELD

The present disclosure relates to a digital asset modeling system and method for modeling, tracking and settling digital assets, obligations, and transactions.

RELATED ART

Existing closed, centrally administered ledgers utilized for settling assets, obligations, and transactions are considered opaque and error-prone. This makes oversight cumbersome, requires many duplicative processes and ledgers, and allows the potential for fraud. The first and currently largest alternative to the existing ledger architectures is represented by a distributed digital ledger called Bitcoin, which uses a blockchain data structure. A fundamental principle of Bitcoin's operation is that the system is set up as a peer-to-peer transaction mechanism that utilizes public-private key cryptography, has no central intermediary or central repository, and allows all participants in the network to hold and validate the integrity of a full copy of the ledger in real time. The Bitcoin blockchain was designed in order to create a trustless native asset, bitcoin, which could be exchanged with pseudonymous parties across the globe.

Current platforms built to support digital assets on top of Bitcoin-like or blockchain-like systems are not generally structured to provide comprehensive protection to financial institutions as may be required by law for many of their existing transaction businesses. These platforms may not have contemplated the regulatory regime for financial institutions and financial transactions in general. As a result, institutional investors have hesitated to enter the digital assets market and have avoided the use of distributed ledgers for their existing businesses.

SUMMARY

The embodiments disclosed herein provide mechanisms for adding flexibility to computer executed transactions of digital assets. The embodiments provide new data models and functions to allow computer systems executing the transactions to operate in a new and advantageous manner. Provided is an exemplary embodiment method of modeling a digital asset and its evolution with respect to the rights of a plurality of parties, the method comprising: providing an await function instance that executes no more than once using one of at least one choice defined therein for disposition of the digital asset with respect to the rights of at least one of the plurality of parties, said await function instance incorporated upon the consent of the affected parties to fulfil a configured function instance associated with the at least one choice; providing an agree function instance that requires the consent of at least one of the plurality of parties to execute; and providing an append-only ledger for storing results of the executed function instances.

The method may be provided wherein the at least one of the plurality of parties whose respective rights are at stake is the same at least one of the plurality of parties whose consent is required. The method may be provided further comprising providing a delete function that requires the consent of the affected parties to invalidate an agree function or disable a non-executed await function, wherein the append-only ledger stores the results of the executed await, agree, and delete functions. The method may be provided wherein the digital asset comprises at least one of cash and/or cash-valued payment, a fungible, equity, bond, commodity, future, right, or good. The method may be provided wherein the at least one choice of the await function is made by a delegate of the at least one of the plurality of parties. The method may be provided wherein the at least one choice of the await function is made by respective delegates of at least two of the plurality of parties. The method may be provided wherein the append-only ledger comprises a blockchain. The method may be provided wherein the append-only ledger may be queried for digital asset status based on pattern-matching. The method may be provided wherein the append-only ledger may be queried for digital asset status of all models in the ledger using queries based on top-level definitions. The method may be provided further comprising providing a delete function to render an active model inactive and no longer available for future transactions.

Provided is an exemplary embodiment method of interpreting a modeled digital asset and its evolution with respect to the rights of a plurality of parties, the method comprising: executing an await function instance no more than once using one of at least one choice defined therein for disposition of the digital asset with respect to the rights of at least one of the plurality of parties, said await function instance incorporated upon the consent of the affected parties to fulfil a configured function instance associated with the at least one choice; executing an agree function instance that requires the consent of at least one of the plurality of parties to execute; and storing the results of the executed function instances in an append-only ledger.

The method may be provided wherein the at least one of the plurality of parties whose respective rights are at stake is the same at least one of the plurality of parties whose consent is required. The method may be provided further comprising executing a delete function that requires the consent of the affected parties to invalidate an agree function or disable a non-executed await function, and storing the results of the executed await, agree, and delete functions in the append-only ledger. The method may be wherein the digital asset comprises at least one of cash and/or cash-valued payment, a fungible, equity, bond, commodity, future, right, or good. The method may be provided wherein the at least one choice of the await function is made by a delegate of the at least one of the plurality of parties. The method may be provided wherein the at least one choice of the await function is made by respective delegates of at least two of the plurality of parties. The method may be provided wherein the append-only ledger comprises a blockchain. The method may be provided wherein the append-only ledger may be queried for digital asset status based on pattern-matching. The method may be provided wherein the append-only ledger may be queried for digital asset status of all models in the ledger using queries based on top-level definitions. The method may be provided further comprising executing a delete function to render an active model inactive and no longer available for future transactions.

Provided is an exemplary embodiment digital system configured to interpret a modeled digital asset and its evolution with respect to the rights of a plurality of parties, the system comprising: at least one processor configured to execute an await function instance no more than once using one of at least one choice defined therein for disposition of the digital asset with respect to the rights of at least one of the plurality of parties, said await function instance incorporated upon the consent of the affected parties to fulfil a configured function instance associated with the at least one choice, and configured to execute an agree function instance within the at least one choice that requires the consent of at least one of the plurality of parties; and at least one storage device configured to store an interpreted result of the executed function instances in an append-only ledger.

The system may be provided wherein the at least one of the plurality of parties whose respective rights are at stake is the same at least one of the plurality of parties whose consent is required. The system may be provided with the processor further configured to execute a delete function that requires the consent of the affected parties to invalidate an agree function or disable a non-executed await function, and to store the execution results of the await, agree, and delete functions in the append-only ledger. The system may be provided wherein the digital asset comprises at least one of cash and/or cash-valued payment, a fungible, equity, bond, commodity, future, right, or good. The system may be provided wherein the at least one choice of the await function is made by a delegate of the at least one of the plurality of parties. The system may be provided wherein the at least one choice of the await function is made by respective delegates of at least two of the plurality of parties. The system may be provided wherein the append-only ledger comprises a blockchain. The system may be provided wherein the append-only ledger may be queried for digital asset status based on pattern-matching. The system may be provided wherein the append-only ledger may be queried for digital asset status of all models in the ledger using queries based on top-level definitions. The system may be provided with the processor further configured to execute a delete function to render an active model inactive and no longer available for future transactions.

BRIEF DESCRIPTION OF THE DRAWINGS

Illustrative, non-limiting exemplary embodiments may be more clearly understood from the following detailed description, particularly when taken in conjunction with the accompanying drawings, in which:

FIG. 24 is a hybrid diagram showing a DAML™ transaction with ledger entries in accordance with an exemplary embodiment of the present disclosure;

FIG. 37 is a hybrid diagram showing DAML™ code of an agreement for external notification within an equity model in accordance with an exemplary embodiment of the present disclosure;

DETAILED DESCRIPTION

Figure 1:
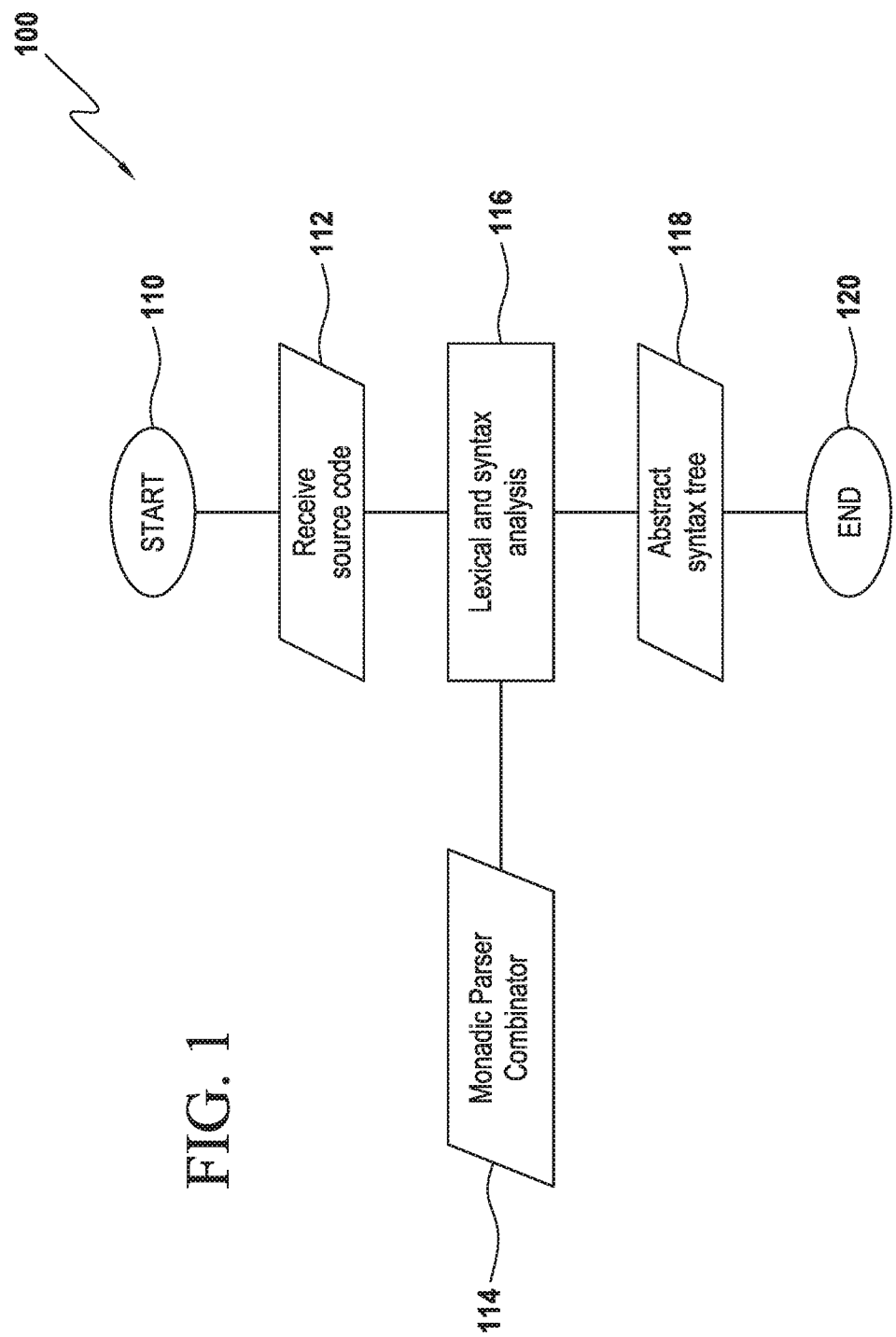
FIG. 1 is a flowchart showing a language recognizer for the Digital Asset Modeling Language (DAML™) in accordance with an exemplary embodiment of the present disclosure.

The present inventive concept will be described more fully with reference to the accompanying drawings, in which exemplary embodiments are shown. The present inventive concept may, however, be embodied in many different forms and should not be construed as being limited to the embodiments set forth herein. Like reference numerals may refer to like elements throughout this description. As used herein, the word "model" is defined as at least one bundle of agreement(s) or potential transaction(s), which, under certain governing rules such as may be provided by a Master Contract, for example, might or might not have the potential to represent a digitally-represented agreement or a legally binding contract.

As shown in FIG. 1, a language recognizer for the Digital Asset Modeling Language™ (DAML™) is indicated generally by the reference numeral 100. The language recognizer is a routine executed under the control of a computer processor. DAML™ includes predefined statements that can be stored as a computer readable data structure. The language recognizer includes a start block 110, which passes the control to an input block 112. The input block 112 receives computer executable source code, such as from a memory or communications channel, and passes control to a function block 116. The block 116 performs both lexical analysis and syntax analysis on the received source code with the help of monadic parser combinator block 114 defined for the DAML™ language, and when successful produces an abstract syntax tree 118 of the parsed DAML™ language, which, in turn, passes control to an end block 120. The abstract syntax tree 118 is stored as a data structure. The current exemplary embodiment of the DAML™ processing logic takes DAML™ abstract syntax tree structures and transforms it to a new DAML™ abstract syntax tree, and is based on each DAML™ ledger entry data structure storing serialized DAML™ abstract syntax tree data as a data structure. Alternate embodiments of the DAML™ processing logic can use alternative parser technologies to translate the DAML™ source code to DAML™ abstract syntax trees, such as, for example, recursive decent. Alternate embodiments of the DAML™ ledger entry can store data-centric representations of the DAML™ language expressions, such as, for example, by compiling the DAML™ abstract syntax trees further with the help of a type inference step and a defunctionalization step to replace the higher order functional constructions of the DAML™ language with first-order constructions.

In operation, a DAML™ recognizer, under the control of a computer processor, interprets functions and syntax suitable for modeling digital assets. An exemplary embodiment DAML™ recognizer implements all DAML™ core language features.

---

DAML ™ comments are supported using a Haskell style such as:
-- this is a line comment
{-
This is a multi-line comment. And comments {- can be -- nested -}
-}

---

The primitive types include the following: Bool is the two Boolean values True and False. Text is sequences of Unicode characters. Integer is signed integers of arbitrary size. Decimal is floating point decimal numbers. Party is unique identifiers for legal entities. Time is absolute points in time with implementation-dependent precision. RelTime is nominal differences between points in time (inheriting the same precision). ContractId is an identifier of a concrete instance of a contract (the digital equivalent to the physical identity of the piece of paper that a concrete contract is printed on).

There is a composed type for function types, which are built using the → operator as in Haskell. For example, "Integer→Text" is for a function that takes one argument of type Integer and returns a Text value.

DAML™ additionally supports the following special types: Record is a record of labeled values whose access is checked at runtime. Choice is a choice offered to a party. In an exemplary embodiment, each choice is made by a party. In an alternate embodiment, a model contract can incorporate the notion of a party's delegate or and/or an authorization scheme such as a public key infrastructure (PKI) such that a party's delegate may make such choice. Agreement is an agreement about an off-ledger event that must happen. Contract covers the terms of a model or potential contract. Update is a description of a ledger-update, which creates and deactivates active models in the ledger. Scenario is a description of a contractual interaction of multiple parties, which DAML™ embodiments may use for unit testing. Assertion is an assertion that a certain Boolean condition evaluates to True. PureValue is a value wrapped such that it can be used as a side-effect-free step both in a ledger-update or a scenario.

The following words are keywords of the language: await, at, named, if, chooses, then, else, such, that, exercises, agree, agrees, with, on, let, in, create, commit, commits, scenario, update.

Expressions over primitive types are built from literals, built-in functions, function application, and lambda abstraction. The two Bool literals are True and False. Text literals are written using double-quotes and use the same escaping rules as Haskell String literals (cf. section 2.6 of the Haskell Report 2010). An exemplary text literal is "Hello world" denoting the string 'Hello world'. Integer literals are written as base-10 numbers, with a possibly prefixed—for negative numbers. Examples are 1024 and −1. A Decimal literal represents a floating point decimal number. It is distinguished from an integer literal by having a decimal point. For example, 1234.56789, 0.5 or 1.0. The general form of decimal literals is given by the regular expression [0-9]+\.[0-9]+. Note that DAML™ ignores trailing zeros in Decimal literals; e.g., 1.5 1.50==1.5000. Party literals are written as sequences of alphanumeric characters between single-quotes. Examples are 'CITI GROUP' and 'DA'. In an exemplary embodiment, it is assumed that alphanumeric characters are enough to form the unique identifiers for legal entities. In an alternate embodiment, a concrete standard (e.g., LEI) may be used for referencing legal entities.

Time literals are always interpreted as UTC times and are written as literals according to 150-8061 and restricted to the subset that is accepted by the following regular expression: [0-9]{4}[0-9]{2}[0-9]{2}T[0-9]{2}:[0-9]{2}([0-9]{2}(\.[0-9]+)?)?Z. For example, 2007-04-05T14:30Z, 2007-04-05T14:30:00Z and 2007-04-05T14:30:00.0Z all denote the UTC time 14:30 on the 5 Apr. 2007. Time literals can have arbitrary sub-seconds precision. It is however implementation-defined how much of that precision can actually be represented. A RelTime literal represents the nominal differences between two absolute points in time. The nominal difference between two timepoints is always the same, regardless of whether a leap second has been or will be introduced. A relative time is represented as a fraction of seconds, e.g., toRelTime (24.0*60.0*60.0) denotes the amount of seconds that constitute a day (see below for an explanation of toRelTime). While RelTime literals can specify arbitrary fractions of seconds, it is implementation-defined how much of that precision can actually be represented. However, all implementations guarantee that RelTime and Time have the same precision. In alternate embodiments, alternative literals such as '1d' may be used to denote the relative time between the start and the end of a single day in the maximum precision of the implementation.

There is no fixed means for writing literals of type ContractId, as the form of ContractIds depends on the execution model. Records are written using curly braces as in JavaScript. For example, {"x": 1, "y": 2} is a Record with two fields labeled x and y whose values are 1::Integer and 2::Integer. DAML™ embodiments currently do not track what fields are present in the types. Moreover, you can only use literal strings for the labels. DAML™ embodiments use { } for the empty record.

DAML™ embodiments support the standard Haskell operators ||, &&, not for Boolean disjunction, conjunction, and negation (cf. Chapter 9 of the Haskell Report 2010). DAML™ embodiments support the standard arithmetic operators +, −, *, /, ^ for addition, subtraction, multiplication, integer division, and exponentiation for Integers with the usual precedence. As in Haskell, they can be written in parentheses to use them in prefix notation. For example, (+) 1 2 is another way of writing 1+2. In contrast to Haskell, DAML™ embodiments require infix operators to be surrounded by space. This resolves the ambiguity of 2−−2 to mean2−(−2). See below for overloaded versions of − and + when working with absolute and relative time.

DAML™ embodiments define the set of Decimals to be all rational numbers d for which there exist integers n and k such that $d=n/10^k$. That is, Decimals are a small subset of decimals, which include terminating, non-terminating, repeating, and non-repeating rational and irrational numbers when written in decimal form. Decimals (with a capital "D") include only the terminating subset of decimals. The following explains how DAML™ supports working with Decimals. DAML™ embodiments overload the arithmetic operators +, −, * to perform addition, subtraction and multiplication of Decimals. None of these operators perform any rounding, as the set of Decimals is closed under addition, subtraction and multiplication.

DAML™ embodiments support rounding of Decimals to a given precision with the function round::Integer→Decimal→Decimal where round prec d rounds the Decimal d to the nearest Decimal of the form $n/10^{prec}$ and ties are resolved by rounding towards the Decimal with an even n, which is the also known as the Banker's rounding mode. For example,

| | |
|---|---|
| round 0 2.5 == 2.0 | round 0 (−2.5) == −2.0 |
| round 0 3.5 == 4.0 | round 0 (−3.5) == −4.0 |
| round 0 3.2 == 3.0 | round 0 (−3.2) == −3.0 |
| round 0 3.8 == 4.0 | round 0 (−3.8) == −4.0 |

There is no "right" rounding mode. DAML™ embodiments may add further rounding modes on demand.

Note that the set of Decimals is not closed under division; e.g., dividing two Decimals does not necessarily result in a Decimal. For example, 1.0/3.0==0.3333 . . . is a rational number, but not a (terminating) Decimal. DAML™ embodiments therefore provide the function divD::Integer→Decimal→Decimal→Decimal to compute the result of the rational division of two decimals rounded to a given Integer precision. The rounding mode is the same as the one of round. DAML™ embodiments provide access to the remainder of this division with the function remD::Integer→Decimal→Decimal→Decimal. The relation between divD and remD is such that the following laws hold: 1) forall prec x y. y*divD prec x y+remD prec x y==x. 2) forall prec x y. abs (remD prec x y)<abs y. 3) forall prec x y. sign (remD prec x y)=sign y*sign x.

DAML™ embodiments support the conversion of Decimals from and to Integer with the functions fromInteger::Integer→Decimal, and toInteger::Decimal→Integer, where toInteger d converts the result of round 0 d. DAML™ embodiments assume that all execution models internally represent RelTimes as Decimals at a fixed, but implementation-specific precision. DAML™ embodiments therefore support converting Decimals from and to RelTime with the functions fromRelTime RelTime→Decimal, and toRelTime::Decimal→RelTime, where fromRelTime provides a the Decimal number of seconds corresponding to the RelTime and toRelTime d rounds the given number of d seconds to the implementation-specific precision of RelTime. Note that this implies toRelTime (fromRelTime dt)==dt for all dt.

DAML™ embodiments support a total order for all primitive types as follows. Bool: False <True. Text: implementation-defined. Integer: total ordering of integers. Decimal: total ordering of decimals. Party: implementation-defined. Time: absolute time is ordered along a linear axis of time. More formally, ∀t1, t2::Time. t1<t2 ⇔ (t1−t2)<toRelTime 0 1. RelTime: relative time is ordered according to its Decimal representation. ContractId: implementation-defined.

DAML™ embodiments support equality for all primitive types such that a==b ⇔ not (a<b ∨ b<a). DAML™ embodiments are using the same infix operators as Haskell does, e.g., DAML™ embodiments use ==, /=, <=, >=, <, > to denote equality, inequality, less-or-equal-than, greater-or-equal-than, less-than, and greater-than, respectively (cf. Chapter 9 of the Haskell Report 2010). Additionally DAML™ embodiments support the operator (~) ContractId→Contract→Bool, where coid~co means that coid is a contract-id that refers to an active contract in the ledger, and this active contract is an instance of co.

DAML™ embodiments support the concatenation of Text values using the (< >)::Text→Text→Text operator. DAML™ embodiments support an overloaded operation toText that converts any value of primitive type to a textual value in an implementation-defined manner. DAML™ embodiments also support a show operation that converts any value of any type to a textual value in an implementation-defined manner. This is used for debugging during scenario development.

DAML™ embodiments overload the + and − operators such that (+)::Time→RelTime→Time denotes shifting of a point in time by a relative time and (−)::Time→Time→RelTime denotes the computation of the time difference between the first and the second argument. The relation between these operators is such that t1+(t2−t1)==t2 for all t1, t2::Time.

Record access is written using brackets as in JavaScript. For example, the expression r["x"] tries to access the field labeled "x" in the record r. Record values are constructed using curly braces and literal strings as in JavaScript. For example, {"x": 1, "y": 2} is a record with two fields "x" and "y".

DAML™ embodiments use lambda abstractions as in Haskell, but always annotated with types; e.g., \(a::Integer) (b::Integer) (c::Text)→toText (a+b)< >c. Function application is written as in Haskell using juxtaposition. It is left-associative and binds stronger than all infix operators.

DAML™ embodiments use non-recursive let-bindings as in Haskell, but multiple bindings have to be separated by a semicolon; e.g., let x=4; y=5; in x+y. The formal syntax is given by: let var1=expr1; var2=expr2; varN=exprN; in expression. Recursive let-bindings are not allowed.

DAML™ embodiments use lazily evaluated if-then-else branching expressions as in Haskell. The formal syntax is: if condition then expression1 else expression2. For example, if owner 'ACME' then "sell" else "buy".

The DAML™ is based on the assumption that the main purpose of models is to describe what agreements come into effect when and under what constraints. These agreements form the connection of models in the ledger with effects in the real world. The meaning of agreements may be determined by human interpretation and optionally in the context of an applicable legal system, as it is done for paper-based contracts.

An introductory DAML™ embodiment includes agreements, choices and models. The formal syntax and semantics of choices, ledger-updates, and models are provided. Alternate DAML™ embodiments provide further examples to help deepen the understanding of this modeling language.

In an exemplary embodiment, DAML™ embodiments specify agreements using the agree keyword, whose syntax is party1, . . . , partyN agree textOfAgreement. For example: 'UBS', 'Alice' agree "'UBS' deposits 100 CHF on account 'CH42 1234 5'." is meant to denote the agreement between 'UBS' and 'Alice' that 'UBS' must deposit the 100 Swiss Francs (CHF) on the account 'CH42 1234 5' at the point in time when this agreement comes into effect.

DAML™ embodiments convert such agreements to templates of agreements using lambda abstraction. For example, the definition deposit=\(obligor::Party) (owner::Party) (amount::Integer) (account::Text)→obligor, owner agree toText obligor< >"deposits"< >toText amount< >"CHF on "< >account< >"."; allows one to write the above agreement as: deposit 'UBS' 'Alice' 100 "CH42 1234 5".

It is up to the writer of models to make sure that the textual description of an agreement is precise in the context of the legal system in which the models are interpreted. From the perspective of the model language, DAML™ embodiments do not interpret the legal text of agreements, but consider every agreement between parties to be an obligation of these parties.

DAML™ embodiments model permissions of parties by giving them choices. For example, the choice 'Alice' chooses account::Text then deposit 'UBS' 'Alice' 100 account means that 'Alice' can choose an account on which 'UBS' must deposit 100 CHF. Models are groups of choices which are simultaneously available to (possibly multiple) parties. For example, iouSellSettle=\(obligor::Party) (owner::Party) (amount::Integer)→await{"settle": owner chooses account::Text then deposit obligor owner amount account, "sell":owner chooses newOwner::Party then iouSellSettle obligor newOwner amount}; is a template for an I-owe-you model (IOU) in CHF that can be settled or sold. The model iou 'Alice' UBS' 100 denotes a concrete IOU modeling that 'UBS' owes 'Alice' 100 CHF.

The previous iouSellSettle example provides intuition on how models are specified. In the following, DAML™ embodiments will give precise definitions for both the syntax and the semantics of choices and models. These definitions are non-trivial to explain because they are mutually recursive via a third concept, which DAML™ embodiments call a ledger-update. Intuitively, these three concepts are related as follows. 1. A model is a group of mutually exclusive choices. 2. A choice is a permission given to a specific party to perform a specific kind of ledger-update at a specific time. 3. A ledger-update is a description of how to update the ledger by creating new agreements and models, exercising choices on existing models, deleting existing models, or asserting statements about the ledger's state at specific times.

In the following, DAML™ embodiments first give and explain the syntax of models, choices, and ledger-updates. Then, DAML™ embodiments explain how the state of the ledger is represented and how DAML™ embodiments transition between states using ledger-updates. DAML™ embodiments specify models using the following syntax. await identified as contractIdBinder named contractNameExpr{"choiceName1": choice1, . . . , "choiceNameN": choiceN}. Such an expression specifies a model that provides N choices labeled choiceName1 to choiceNameN to the controlling parties of these choices. The variable contractIdBinder is of type ContractId and can be used to refer to the identity of the concrete model instance in the definition of the choices 1 to N as well as in the contractNameExpr expression. ThecontractIdBinder is useful to relate multiple choices by giving them the unique contract-id as an argument. The variablecontractName is of type Text and is an arbitrary name for the model to facilitate debugging. The named contractName and the identified as contractIdBinder parts can be left out in case they are not needed.

DAML™ embodiments specify choices using the following syntax. controllingPartyExpr chooses valueBinder1:: Type1, . . . , valueBinderL::TypeL at choiceTimeBinder such that booleanChoiceCondExpr then updateExpr. Such a Choice expression specifies that a choice is given to the party denoted by controllingPartyExpr to choose values of the required types at some time in the future, and if these values and the time at which they were chosen satisfy the booleanChoiceCondExpr, then ledger-update denoted by updateExpr is executed. The choice only succeeds if this ledger-update executes successfully.

Ledger-updates reflect transactions, are stored as a data structure and are constructed using one of the following built-in functions or using an update-block. create ContractOrAgreement→Update. delete::ContractId→Contract→ Update. exercises::Party→Label→Any→ . . . →Any→ContractId→Update. assert::Bool→Update. pure::Any→Update. Intuitively, DAML™ embodiments use create to create models or agreements, delete to deactivate active models, exercises to force parties to execute choices on active models, assert to assert statements about the current state of the ledger, and pure to construct ledger updates that just return a value but do not change the ledger.

An update-block allows one to execute multiple consecutive ledger-updates as one atomic ledger-update. Update-blocks are specified using the following syntax. update [updateStatement1→binder1, . . . , updateStatementN→binderN, lastUpdateStatement]. DAML™ embodiments use the squiggly arrows → to name the results of the execution of individual update-statements. These names can then be used in later update-statements to refer to these results.

Models can be recursive, as shown in the previous iouSellSettle example. The way to specify such recursion is via the use of named top-level definitions, as explained later in the Section "DAML™ Programs". DAML™ embodiments reduce the syntactic overhead of specifying models using syntactic sugar. DAML™ embodiments allow for models and agreements to be used as updates, and DAML™ embodiments allow for records of updates to be used as updates.

When using a model c as an update, it's effect is the same as the one of create c. DAML™ embodiments add this feature as creating models is the most common update action. When using a record {"l1": upd1, . . . , "lN": updN} as an update, then it's effect is the same one of update [upd1→v1, . . . , updN→vN, pure {"l1": v1, . . . , "lN":vN}]. DAML™ embodiments add this feature as DAML™ embodiments often need to return results of many intermediate update actions.

DAML™ embodiments explain the semantics of models, choices, and ledger-updates as a transition system. The state of this transition system is a ledger, which is a finite map from ContractIds to models and a log of agreements that are in effect. The transitions are given by the interpretation of ledger-updates. Note that DAML™ embodiments specify for each interpretation both how the ledger is changed and what result value is returned by the ledger-update. DAML™ embodiments require these results when interpreting update-blocks, where later ledger-updates can refer to the results of earlier ledger-updates.

DAML™ embodiments interpret an expression create agreementExpr by evaluating agreementExpr, checking that it is indeed an agreement of the form party1, . . . , partyN agree legalText, and then recording that this agreement is now in effect. The result of this ledger-update is the agreement itself.

DAML™ embodiments interpret an expression create contractExpr by evaluating contractExpr. Provided this evaluation succeeds with a model co, DAML™ embodiments store this model co under a freshly allocated contract-id coid. The result of this ledger-update is the contract-id coid.

DAML™ embodiments interpret an expression delete contractIdExpr contractExpr by first evaluating both contractIdExpr andcontractExpr. Provided this evaluation success with a literal contract-id coid and a model co, DAML™ embodiments then check thatcoid identifies an active model equal to the model co. Provided that is the case, DAML™ embodiments remove coid from the ledger. Note that DAML™ embodiments require the model co to be specified as part of the delete to enable the static analysis of which parties are affected by this delete. The result of a delete is the empty record { }.

DAML™ embodiments interpret a ledger-update of the form partyExpr exercises "choiceLabel" with choice Value1, . . . choiceValueN on coid as follows. DAML™ embodiments first evaluate partyExpr. Provided this results in a literal party name actor, DAML™ embodiments lookup the active model associated with coid. Provided coid identifies an active model co, DAML™ embodiments mark it as inactive. Then, DAML™ embodiments lookup the choice identified by "choiceLabel" in co. Provided the actor is equal to the choice's controller, DAML™ embodiments exercise this choice; e.g., DAML™ embodiments first instantiate both the choice's condition and its follow-up ledger-update with the given choiceValues and the current time. Then, DAML™ embodiments check the choice's condition and, provided that succeeds, then interpret the choice's follow-up. The result of a ledger-update built using exercises is the result of the choice's follow-up. Note that this interpretation is potentially recursive, but it is guaranteed to terminate.

DAML™ embodiments interpret an expression assert booleanExpr by evaluating the booleanExpr, and then checking whether the result isTrue. If this is the case, then interpretation succeeds. Otherwise, it fails. The result of an assert ledger-update is the empty record { }.

DAML™ embodiments interpret an expression pure x by evaluating x and returning it as the result of this ledger-update. DAML™ embodiments can therefore use pure to construct side-effect free ledger-updates that return a specific result.

DAML™ embodiments interpret an update-block update [updateStatement1→binder1, . . . , updateStatementN→binderN, lastUpdateStatement] by interpreting the update Statements one after the other after substituting the results of the previous updateStatements for the binders. The result of an update-block is the result of the lastUpdateStatement. The interpretation of the update-block fails if any of its statements fails; and all effects on the ledger are only applied, if the update-block succeeds. Update-blocks allow therefore to build atomic composite ledger-updates.

One can also define model templates that combine other model templates. For example, the definition option=\ (controller::Party) (tlb::Time) (tub::Time) (next::Contract)→await{"exercise": controller chooses at t such that tlb<=t && t<=tub then next}; provides a combinator called option, which allows a party to enter a model during a specific time-interval.

In all previous examples, choices just lead to the creation of zero to many new models. The following example of an IOU that can be split and merged shows how to use an update-block in the "merge" choice to atomically delete (deactivate) the model merged-in and create the new IOU model over the larger amount. iouChf=\(obligor::Party) (owner::Party) (amount::Integer)→await{"settle": owner chooses account::Text then deposit obligor owner amount account, "sell": owner chooses newOwner::Party then iouChf obligor newOwner amount, "split": owner chooses newAmount::Integer such that 0<newAmount && newAmount<amount then {"iou1": iouChf obligor owner newAmount, "iou2":iouChf obligor owner (amount−newAmount)}, "merge": owner chooses otherIou ContractId, otherAmount::Integer then update [delete otherIou (iouChf obligor owner otherAmount), iouChf obligor owner (amount+otherAmount)]}.

DAML™ embodiments can also use models to coordinate changes on other models by using choices that require specific parties to execute decisions. For example, the template below can be used to require a payer to transfer ownership of a payment until a certain time.

```
-- A template for a breach-of-contract that has to be negotiated
-- between two parties in front of Swiss court.
contractBreachedBy =
    \(defendant :: Party) (plaintiff :: Party) ->
        defendant, plaintiff agree
            toText defendant <> " has breached the contract, and " <>
            toText plaintiff <> " can sue " <> toText defendant <>
            " in any court of Switzerland according to Swiss law."
    ;
-- A template for a model requiring payment within a certain time via a
-- transfer of ownership of an IOU as defined above.
mustPayIouUntil =
    \ (payer :: Party)
      (payee :: Party)
      (payment :: Contract)
      (maxPayTime :: Time)
    ->
        await
```

```
{ "pay":
    payer chooses paymentId :: ContractId
    such that
        -- a check that 'paymentId' refers to an active
        'payment' model
        paymentId ~ payment
    then payer exercises "sell" with payee on paymentId
    -- punitive clause/choice becomes available to the payee after the
    -- time that was given to the payer to pay.
, "breach":
    payee chooses at tbreached
    such that
        maxPayTime <= tbreached
    then contractBreachedBy payer payee
};
```

A combinator that uses iouChf payments could then defined as follows.

```
payInChfUntil =
    \ (payer :: Party)
      (payee :: Party)
      (obligor :: Party)
      (amount :: Integer)
      (maxPayTime :: Time)
    ->
``` mustPayIouUntil payer payee (iouChf obligor payer amount) maxPayTime;

DAML™ embodiments call a group of top-level definitions a DAML™ program. DAML™ embodiments currently separate these definitions using semi-colons due to the following local parsing ambiguity: a=b c=d would be parsed as a=b c with a parse failure for the following=d. DAML™ embodiments therefore use a trailing semi-colon for each top-level definition as follows. a=b; c=d to obviate the need for semi-colons.

Scenarios are descriptions of how multiple parties interact via a model or models stored in a ledger. DAML™ embodiments include a special notation for scenarios in the language because they serve as vital documentation and test-cases for model templates.

Here is an example scenario for the IOU definition in the previous section.

```
days = \(x :: Integer) -> toRelTime (fromInteger (x * 24 * 60 * 60));
createAndSettleIou =
    scenario
        [ commit (iouSellSettle 'UBS' 'UBS' 100) ~> ubsIou
        , 'UBS' commits 'UBS' exercises "sell" with 'Alice' on
ubsIou ~> aliceIou
        , assert (aliceIou ~ iouSellSettle 'UBS' 'Alice' 100)
        , pass (days 10) ~> now
        , 'Alice' commits 'Alice' exercises "settle" with "CH42 1234 5"
        on aliceIou ~> settled
        , assert (settled == (
            'UBS', 'Alice' agree "'UBS' deposits 100 CHF on
'CH42 1234 5'."))
        ];
```

As for update-blocks, DAML™ embodiments use squiggly arrows to bind the results of the scenario actions; and the result of a scenario is the result of its last step. The types of the bound variables in the above example are the following. ubsIou::ContractId; aliceIou Record; now::Time; settled::Record. Note that the form of the aliceIou record will be {"iou":contractId} and the one of the settled record will be {"settle": agreement}. This is determined from the labeling of the follow-ups in the "sell" and "settle" choices in the iou definition above.

DAML™ embodiments can pattern match into the records of the results of the scenario steps. For example 'Alice' exercises "settle" with "CH42 1234 5" on aliceIou ["iou"]→{"settle": agreement}. This binds the "settle" entry of the result record of the step to the variable name agreement. DAML™ embodiments can pattern match records to arbitrary depth, e.g., this is a valid pattern: {"foo":{"bar": {"baz":varName}}}.

Patterns do not need to be complete; that is, labels that are present in the result record can be omitted in the pattern. A pattern match against a label that is not present in the result record will cause an error (e.g., a runtime error if interpreted). Shadowing of variable names is determined by the order of their label keys. In the previous example the label key of the variable varName is ["foo", "bar", "baz"]. This variable would shadow one with a label key of ["foo", "bar"]. In the example {"a": varName, "b": varName} varName binds the entry accessed by ["b"], because the key ["b"] comes after the key ["a"].

The default interpretation of a scenario is as follows. Starting with an empty ledger the steps of a scenario are executed in order.

Committing ledger-updates. An expression of the form party1, . . . , partyN commit updateExpr denotes that the parties party1, . . . , partyN jointly agree that they want to commit the ledger-update denoted byupdateExpr. This succeeds if the updateExpr can successfully be interpreted as a state transition on the current ledger. DAML™ embodiments require an explicit specification of the parties that agree to the commit, as these are the only parties that are allowed to be obligable in the interpreted ledger-update. Alternate embodiments may specify the concept of obligable parties.

Controlling Time. A pass relTimeExpr→newTimeBinder step advances the current scenario time by relTimeExpr and binds the new scenario time to newTimeBinder. One can use this feature to determine the initial time of the scenario as follows: pass (toRelTime 1.0)~>now.

Expressing Expectations. A assert booleanExpr step evaluates the Boolean expression and fails the scenario if that expression is false. It has no effect otherwise. The mustFail keyword can decorate a scenario step to indicate that it is supposed to fail. Such a step fails if the inner step does not, and vice versa. For example, it makes sense to state that a model cannot be settled twice.

```
mustFailExample = scenario
  [ 'UBS' commits (iouSellSettle 'UBS' 'Alice' 100) ~> iouId
  , 'Alice' commits 'Alice' exercises "settle" with "CH12 345 6" on iouId
  , mustFail ('Alice' exercises "settle" with "CH12 345 6"on iouId)
  ]
;
```

Debugging. The trace textExpr step evaluates the Text expression and creates a scenario step that does not change the ledgers in any way, but contains the evaluated text in the description of the step, so this can be used for debugging a scenario and looking into values using the toText function. Example: trace ("gergely's trace"< >toText (42+123)).

One can annotate any expression with a textual expression using description annotations. These are written using the following syntax. {@ DESC textExpr @} someOtherExpression andItsArguments. Description annotations bind as far right as possible, and you'll have to use parentheses if you only want to annotate a function itself, e.g.,

```
\(f :: Integer -> Integer) (arg :: Integer) ->
  ({@ DESC "the function's description" @} f)
  ({@ DESC "the argument's description" @} arg)
```

DAML™ embodiments use this method as this requires fewer parentheses in the common case of annotating whole models or choices. Note that in the case of multiple annotations on the same expression, the inner-most annotation is kept and the other ones are ignored. In particular, DAML™ embodiments use description annotations to abbreviate models using non-legally-binding human-readable text for GUI purposes. For example, DAML™ embodiments can introduce named iou models as follows.

```
iou =
  \ (obligor :: Party) (owner :: Party) (amount :: Integer)
  ->
    {@ DESC
       toText obligor <> " --(" <> toText amount <> ")--> "
  <> toText owner
    @}
    await
      { "sell": owner chooses newOwner :: Party then {"iou": iou
obligor newOwner amount }
    , "settle":
        owner chooses account:: Text
        then deposit obligor owner amount account
    }
  ;
traceExample =
  scenario
    [ 'Bank' commits (iou 'Bank' 'Alice' 1) ~> alice
    , 'Bank' commits (iou 'Bank' 'Bob' 2) ~> bob
    , trace ("Bob's contract: " <> toText bob)
    ]
  ;
```

Description annotations on await keywords are remembered by the interpreter and used when printing the final ledger. For example, when finishing with a scenario, DAML™ embodiments can have this output.

```
final ledger:
  [ contract 0c created at 1970-01-01T00:00:00Z 'Bank' --(1)--> 'Alice'
    [ "sell":
      'Alice'
      chooses newOwner5 :: Party
      then { "iou": iou newOwner5 'Bank' 1 }
    ]
  , contract 1c created at 1970-01-01T00:00:00Z 'Bank' --(2)--> 'Bob'
    [ "sell":
      'Bob'
      chooses newOwner6 :: Party
      then { "iou": iou newOwner6 'Bank' 2 }
    ]
  ]
```

Here DAML™ embodiments can see the short description of the IOU, that shows that the Bank owes Alice $1 and to Bob $2.

Many models require choices by multiple parties, but are indifferent to the order in which these choices are made. Such models can be specified with the language features described up to here. However, the size of these specifications is exponential in the number of parties that must make a choice, as DAML™ embodiments must enumerate all possible orderings of choices. To avoid such an exponential blowup, DAML™ embodiments introduce explicit support for parallel choices by multiple parties.

DAML™ embodiments explain the support for parallel choices as follows. DAML™ embodiments first provide an introductory example. DAML™ embodiments then specify the formal syntax both for parallel choices and decisions on individual parallel choices. Finally, DAML™ embodiments explain the semantics of parallel choices.

The following example contract models a proposal for an option to swap two sellable contracts between two parties.

```
optionalSwap =
  \ (alice :: Party)
    (aliceGood :: Contract)
    (bob :: Party)
    (bobGood :: Contract)
  ->
    await
    { "swap":
      {| "alice": alice chooses ca :: ContractId such that ca ~ aliceGood
      , "bob" : bob chooses cb :: ContractId such that cb ~ bobGood
      |}
      then
      { "bob's": alice exercises "sell" with bob on ca
      , "alice's": bob exercises "sell" with alice on cb
      }
    , "alice cancels": alice chooses then { }
    , "bob cancels": bob chooses then { }
    };
```

In contrast to previous examples, the await choice's follow-up is guarded by two parallel choice-steps. The first step models alice's choice to pre-commit her good and the second step models bobs choice to pre-commit his good. These two steps are only pre-commits, as both alice and bob could still exercise a choice on their individual goods as long as the second party has not provided his good. As it is only an option to swap, DAML™ embodiments provide both alice and bob with a choice to cancel the swap. Both of these choices remain available as long as only alice or bob exercised their part of the "swap" choice. Note that the actual swapping of goods happens atomically once the second party has made its pre-commit choice.

The formal syntax of choices with parallel choice-steps is the following.

```
{| "choiceStep1":
   controllingPartyExpr1
   chooses
       valueBinder1_1 :: Type1_1, ..., valueBinder1_L :: Type1_L
     at choiceStepTimeBinder1
   such that
     booleanChoiceStepCondExpr1
   then followUpResultBinder1 <- followUpExpr1
, ...
, "choiceStepN":
   controllingPartyExprN
   chooses
       valueBinderN_1 :: TypeN_1, ..., valueBinderN_M :: TypeN_M
     at choiceStepTimeBinderN
   such that
     booleanChoiceStepCondExprN
   then followUpResultBinderN <- followUpExprN
|}
such that
 booleanChoiceCondExpr
then followUpExpr
```

The scope of the value binders is such that the per-choice-step bound values can be referenced in the corresponding per-choice-step Boolean conditions; and all bound values can be referenced in the choice's Boolean condition and all the choice's follow-ups. Note that the group of choice-steps must be non-empty and all the steps must be labeled differently. DAML™ embodiments chose to use a different kind of parentheses, the {| and |} variants, to ensure that records and parallel choices are clearly distinguishable. DAML™ embodiments thereby keep the syntax unencumbered for later generalizations of records.

DAML™ embodiments extend the formal syntax of decisions such that one can not only reference the choice's label, but also the choice-steps' label. This allows specifying the decision of a party to execute one of its choice steps. The concrete syntax is the following. partyExpr exercises "choiceLabel" "choiceStepLabel" with choiceStepValue1, . . . , choiceStepValueN on contractIdExpr. For example, the following scenario creates a optionalSwap of ious and exercises it.

```
optionalSwapTest =
  scenario
    [ 'UBS' commits (iouSellSettle 'UBS' 'Alice' 100) ~> aliceIou1
    , 'CS' commits (iouSellSettle 'CS' 'Bob' 160) ~> bobIou1
    , commit
      ( optionalSwap 'Alice' (iouSellSettle 'UBS' 'Alice' 100)
          'Bob' (iouSellSettle 'CS' 'Bob' 160)
      ) ~> optSwapId1
    , 'Bob' commits 'Bob' exercises "swap" "bob" with bobIou1
        on optSwapId1 ~> optSwapId2
    , 'Alice' commits 'Alice' exercises "swap" "alice" with aliceIou1
        on optSwapId2 ~> { "alice's": aliceIou2
                        , "bob's": bobIou2
                        }
    , assert (aliceIou2 ~ iouSellSettle 'CS' 'Alice' 160)
    , assert (bobIou2 ~ iouSellSettle 'UBS' 'Bob' 100)
    ];
```

The semantics of exercising parallel choices is the following. A choice c guarded by a single choice-step behaves the same way as a normal choice whose condition is the conjunction of the choice-step's condition and the condition of c. For choices guarded with more than one choice-step, exercising a decision actor exercises "choiceLabel" "step_i" with v1, . . . , vN at time now on "step_i" of a choice c guarded by N choice-steps

```
{| "step_1": step_1,
, ...
, "step_i":
   ctrl chooses x1 :: type1, ..., xN :: typeN at t such that choiceStepCond
, ...
, "step_N": step_N
|}
such that
  choiceCond
then followUps
```

This works as follows. DAML™ embodiments first check whether actor controls step_i, then DAML™ embodiments check types of the values v1, . . . , vN match the expected types, and finally DAML™ embodiments check whether the choice-step condition of step_i is satisfied. If all of these checks succeed, then DAML™ embodiments delete the current model, and create a new model, which records the decision for choice-step step_i.

More concretely, let's assume that the model c is the one pointed to by optSwapId1 in the above optionalSwapTest-scenario. Then, the step 'Bob' exercises "swap" "bob" with bobIou1 on optSwapId1→optSwapId2 executed at time t will mark optSwapId1 as inactive, and introduce a new contract-id optSwapId2 pointing to c after [exercising "swap" "bob" at t with bobIou1] where after is a special keyword marking a list of pending decisions that must be applied to a model.

Alternate DAML™ embodiments will allow the specification of pending decisions in the input-syntax of DAML. These features are fully specified and implemented in the reference semantics. However, they are not necessarily supported in all execution models. DAML™ embodiments therefore state for each feature in what execution models it is supported.

For example, HyperLedger with stakeholder ratification does not currently support the DAML™ features of Point-Wise Observables or Tabular Contract Query Language. Financial contracts often depend on external, public measurements like the closing price of a share, or the announcement of a dividend payment. DAML™ embodiments call such external, public measurements observable data. There are many models for formalizing observable data. DAML™ embodiments explore several of them in the daml-design-considerations.md document. Here, in this section, DAML™ embodiments explain the support for a simple model where 1. each party can publish their own named data-feeds of timestamped immutable data values, and 2. the models can depend on pointwise observations of these data-feeds.

DAML™ embodiments do not mandate that these data-values are published on the ledger. Instead, DAML™ embodiments assume that there is some means that allows parties to communicate values of data-feeds and to prove that a data-feed attained a certain value at a certain timepoint. Conceptually, the state of a data-feed corresponds at any time to a partially-defined, piecewise-constant function. As the state of a data-feed evolves the corresponding function becomes more and more defined, but never changes the value at an already defined timepoint. More formally, DAML™ embodiments can represent the state of a data-feed of values of type a as a non-empty list of type type Feed a=[(Time, a)] where the timepoints are strictly monotonic. Let feed=[(t_0, v_0), (t_1, v_1), . . . , (t_n, v_n)] be a non-empty list of type Feed. Then the corresponding partially-defined, piecewise-constant function is the function that maps the timepoint t to 1. v_i if there exists a consecutive pair of timed values (t_i, v_i) and (t_(i+1), v_(i+1)) in feed such that t_i<=t<t_(i+1),
2. v_n if t_n==t, and
3. undefined, if none of the above two conditions is satisfied.

Note that this definition implies that (t_n, v_n), the last timed value in feed, only defines the value of the corresponding function for t==t_n. For all t>t_n, the corresponding function is undefined.

As stated before, DAML™ embodiments do not fix a publication scheme for data-feeds to be used in a distributed ledger setting. However, one of the reasons for choosing the above definition is that it allows for a straightforward publication scheme. Namely, a publishing party can publish new values to a data-feed by signing them together with a hash-based link to the previous publication. For example, the following definitions exemplify publishing a data-feed at two consecutive timepoints t0 and t1>t0.

```
hash_0 = hash(t_0, v_0);
feed_0 = sign('PublisherPk', ("feedName", hash_0))
hash_1 = hash(hash_0, (t_1, v_1));
feed_1 = sign('PublisherPk', ("feedName", hash_1))
```

The example assumes that the bytestrings corresponding to the hashes hash_0 and hash_1 are either inlined in the published messages or distributed via a content-addressable filesystem like IPFS. Obviously, there are many ways to improve the efficiency of such a publication scheme (e.g., building blocks of timed values, or using authenticated stream-broadcast protocols like TESLA, or the like). DAML™ embodiments expect the majority of these efficiency improvements to be compatible with the assumptions on the definedness and immutability of data-feeds. Therefore, DAML™ embodiments do not further pursue the details of these publication schemes for data-feeds in this document.

In the reference implementation of the model language, DAML™ embodiments provide the following two functions to manage the querying of data-feeds and the publication of new timed values to party-specific data-feeds.

```
observeFeedAt :: Party -> Text -> Time -> Any
publishToFeed :: Party -> Text -> Any -> Scenario Unit
```

DAML™ embodiments use the expression observeFeedAt publisher feedName t to query the value that the data-feed feedName published by publisher has at time t. If the feed's value is not defined at t, then the evaluation of this expression fails. This will be the case if t is before the first published data-point of the feed feedName or after the last published data-point.

DAML™ embodiments use the expression publishToFeed publisher feedName expr to denote a scenario step that publishes the value of expr to the feed feedName of the publisher. The timestamp of this published value is the current scenario time, which implies that one cannot publish data into the future.

The following example demonstrates the interplay between observeFeedAt and publishToFeed.

```
seconds = \(t :: Integer) -> toRelTime (fromInteger t);
observeSixSmi = observeFeedAt 'SIX' "SMI";
publishToSixSmi = \(value :: Integer) ->
  scenario
    [ pass (seconds 0) ~> now
    , publishToFeed 'SIX' "SMI" value
    , pure now
    ];
publicationAndObservationTest =
  scenario
    [ publishToSixSmi 7000 ~> t0
    , assert (observeSixSmi t0 == 7000)
    , mustFail (assert (observeSixSmi (t0 - seconds 1) == 7000))
    -- ^ fails as the "SMI" feed of 'SIX' is undefined before 't0'
    , mustFail (assert (observeSixSmi (t0 + seconds 1) == 7000))
    -- ^ fails as the "SMI" feed of 'SIX' is not defined after the current
    -- scenario time, which is at this point equal to 't0'
    , pass (seconds 1) ~> t1
    , mustFail (assert (observeSixSmi (t0 + seconds 1) == 7000))
    -- ^ Fails as the last published value in the "SMI" feed of 'SIX' is
    -- at timestamp 't0'.
    , publishToSixSmi 8000
    , assert (observeSixSmi t1 == 8000)
    -- Now this succeeds as the value of the "SMI" feed of 'SIX' has
    -- been fixed at the current scenario time. DAML ™ embodiments
    -- require this explicit fixing, as otherwise the observed value at a
    -- specific timepoint could change non-deterministically. With the
    -- current solution, DAML ™ embodiments avoid this non-
    -- determinism as undefined values cannot be observed in choices
    -- of models.
    ];
```

The restriction that every feed must be published explicitly at every time is inspired from a distributed ledger standpoint, where every extension of the signed hash-chain must be published explicitly. However, with the above primitives this might prove to be a bit cumbersome in test scenarios. DAML™ embodiments therefore envision that alternate DAML™ embodiments could introduce a function fixAllFeeds::Scenario Unit that publishes the last value of all feeds as the value timestamped with the current scenario time, if such a function is necessary.

Model templates can be parameterized over data-feeds. The support for data-feeds described above is minimal. DAML™ embodiments nevertheless expect that it provides significant expressivity for formulating model templates with choices that depend on these external data-feeds. The key idea for formulating such model templates is to represent time-dependent rates as functions of type Time→Decimal and time-dependent conditions as functions of type Time→Bool. The caller of such a template can then use the given time value to inspect a data-feed.

Note that this decision means that functions in the language are not completely pure. They do depend on the state of the ledger (due to the ~ function), and on the state of the data-feeds (due to the observeFeedAt function). This is acceptable as DAML™ embodiments have a strict evaluation semantics, which ensures that it is always clear when DAML™ embodiments evaluate an expression. Evaluation semantics for alternate DAML™ embodiments may eagerly evaluate applications and arguments and stop once they encounter an unsaturated application, an await, or a choice.

Tabular Contract Query Language provides support for querying a contract-based ledger. The querying is based on syntactic pattern-matching of data structures, which DAML™ embodiments contemplate to play a central role in reading from a contract-based ledger. The language features described in this section serve as a basis with respect to how pattern-matching behaves in the context. This understanding may be used in the development of GUIs and the development of contract-specific automation for choice execution.

An execution environment, embodied on a computer system, stores models specified in DAML™ in a ledger. DAML™ embodiments want to provide the means to query such a database for contracts active in the ledger and their parameters. For example, a DAML™ embodiment could query the ledger for how many active "IOU" contracts it currently contains. Or how many "IOU" contracts there are, where the obligor is named 'UBS'. A GUI might want to present the results of a query for all active "IOU"s in the ledger in tabular form as follows.

| ContractId | CreatedAt | Amount | Obligor | Owner |
|---|---|---|---|---|
| 0xffeeafa | 2007-04-05T14:30Z | 23 | UBS | Bob |
| 0xa123001 | 2016-03-02T12:00Z | 1000 | CS | Alice |

Since contracts are not stored using fixed data schemas, but as data structures representing abstract syntax trees (ASTs), such a table cannot be provided by the underlying database implementation of the ledger. DAML™ embodiments provide the facility to query the ledger for active models with given parameters by means of syntactic pattern-matching of the AST representations of the active models in the ledger. This concept is probably best understood by looking at an example.

```
testQuery =
  scenario
    [ 'Bank1' commits (iouSellSettle 'Bank1' 'Alice' 100) ~> iou1
    , 'Bank1' commits (iouSellSettle 'Bank1' 'Bob' 20) ~> iou2
    , 'Bank2' commits (iouSellSettle 'Bank2' 'Bob' 40) ~> iou3
    , traceMatchingContracts (iouSellSettle ?obligor ?owner ?amount)
      -- This will output the following trace, where <iouN> refers to the
      -- value of the 'iouN' variable.
```

-continued

```
-- Found 3 matching contracts:
-- 1. contract <iou1> with
--    { "obligor": 'Bank1'
--    , "owner": Alice
--    , "amount": 100
--    }
-- 2. contract <iou2> with
--    { "obligor": 'Bank1'
--    , "owner": Bob
--    , "amount": 20
--    }
-- 3. contract <iou3> with
--    { "obligor": 'Bank2'
--    , "owner": Bob
--    , "amount": 40
--    }
-- DAML ™ embodiments can also fix some values and thereby
-- filter by equality.
, traceMatchingContracts (iouSellSettle ?obligor 'Alice' ?amount)
  -- This will output the following trace.
  -- Found 1 matching contracts:
  -- 1. contract <iou1> with
  --    { "obligor": 'Bank1'
  --    , "owner": Alice
  --    , "amount": 100
  --    }
];
```

DAML™ embodiments provide the function traceMatchingContracts with the syntax, traceMatchingContracts contractPatternExpr to run a query against the interpreter ledger in a scenario. A contractPatternExpr is an expression containing pattern variables. A pattern variable is distinguished from a normal variable by a leading '?' character. A simple example of a pattern is ?a+2. This pattern would syntactically match 3+2 for ?a=3, but this pattern would not match 3+9. The following table gives further examples:

| Pattern | Expression | Match |
|---|---|---|
| (?a + ?b) | (1 + 2) | {"a": 1, "b": 2} |
| (?a + ?a) | (1 + 2) | { } |
| (?a + days ?b) | (1 + days 2) | {"a": 1, "b": 2} |
| (\a -> a + ?b) | (\x -> x + 2) | {"b": 2} |
| (\a -> a + ?a) | (\x -> x + 2) | {"a": 2} |

DAML™ embodiments can create patterns by calling functions with pattern variable arguments. For example, iouSellSettle ?obligor ?owner ?amount is a pattern that matches models created using the iouSellSettle model template.

As the above example shows, the traceMatchingContracts accepts an expression of type Contract with pattern-variables. The resulting contract pattern is then matched against all active models and the results are reported as part of the interpretation. DAML™ embodiments do not yet expose the results in the Scenario result, as DAML™ embodiments cannot yet represent a list of results.

The two pattern variables ?ContractId, ?ChoiceTime are reserved pattern variable names and cannot be used in a model pattern. They match the contractIdBinder of a model and the choiceTimeBinder in a choice, respectively. If a model is parameterized by either of the two variables their values will be reported by the interpreter in the same way as a normal pattern variable.

Can all models in a ledger be pattern-matched? Given a concrete ledger one might ask whether all of its active models can be retrieved using a pattern-matching query. This is certainly true, as one can always query for each model itself using the model's AST without any variables as the query. So, one may reformulate the question: given a concrete DAML™ file defining the template for all models with which a company is interested in dealing, can all models that affect this company be pattern-matched using queries based on top-level definitions from this DAML™ file? This does not hold in general, as there can be nested await statements yielding active models for which there is no corresponding top-level definition. However, if DAML™ embodiments require that all awaits only occur in top-level definitions structured as follows, then all of the resulting models can be matched.

```
contractTemplateDef = \(param1 :: ty1) ... (paramN :: tyN) ->
    let abbrev1 = body1;
        ...
        abbrevM = bodyM;
    in await
        { ....
        }
```

This restriction does not limit expressivity. Alternate DAML™ embodiments may therefore investigate automatic translations of nested awaits into this form. Once DAML™ embodiments have this translation, DAML™ embodiments can always use pattern-matching to switch between a per-contract-template-tabular representation of models, and the native AST-based representation.

Alternate embodiment Proposed Language Extensions. The following section contain fully specified extensions not currently implemented in an exemplary execution model.

Must-choose obligations examples are parsed and executed. Many models require parties to make certain choices within a given time-bound. DAML™ embodiments can represent such obligations with the model language described up to here by using punitive clauses as shown in the 'mustPayIouWithin' example above. Adding all these punitive clauses becomes however rather cumbersome, which is why DAML™ embodiments add explicit syntactic and semantic support for must-choose obligations.

DAML™ embodiments explain the support for must-choose obligations in three steps. DAML™ embodiments first give an introductory example. Then, DAML™ embodiments specify the formal syntax of must-choose obligations; and finally DAML™ embodiments present their semantics. The following contract models the obligation to execute the "sell" choice on another model until a certain maximal time.

```
mustPayUntil =
  \ (seller :: Party)
    (buyer :: Party)
    (good :: Contract)
    (maxSellTime :: Time)
  ->
    await
      { "pay":
          seller must choose cid :: ContractId until maxSellTime
          such that
            cid ~ good
          then
          { "payment": seller exercises "sell" with buyer on cid
          }
          -- DAML ™ embodiments allow the buyer to forfeit a payment
          -- to illustrate in a later example that breached 'must choose'
          -- obligations lead to freezing the whole contract.
        , "forfeit": buyer chooses then { }
      }
  ;
```

These language elements are the must choose obligation and the until time-bound on the fulfillment of this obligation. The following scenario illustrates the use of the mustPayUntil contract template.

```
testSuccessfulSale =
    let iouFor = \(owner :: Party) -> iouSellSettle 'Bank' owner 100;
    aliceMustPayBobUntil = mustPayUntil 'Alice' 'Bob' (iouFor 'Alice');
    in
    scenario
      [ -- create IOU's and payment obligations for 'Alice'
        pass (days 0) ~> t0
      , 'Bank' commits create (iouFor 'Alice') ~> aliceIou
      , 'Alice' commits create (aliceMustPayBobUntil (t0 + days 2)) ~>
    mustPay
        -- Alice is not obligable because she can choose the contract.
        -- However, the only kind of contracts she can choose are
        -- contracts, in which she becomes obligable. That makes
        -- her de facto obligable.
        -- demonstrate a successful fulfillment of a payment obligation
        -- after one day.
      , pass (days 1)
      , 'Alice' commits 'Alice' exercises "pay" with aliceIou on
    mustPay ~> {"payment": bobIou}
      , assert (bobIou ~ iouFor 'Bob')
      ]
    ;
```

The formal syntax for choice-steps with support for both optional choices and must-choose obligations is:

```
controllingPartyExpr1
    [chooses | must choose ]
        valueBinder1_1 :: Type1_1, ..., valueBinder1_L :: Type1_L
    at choiceStepTimeBinder1
    after t0
    until t1
    such that
        booleanChoiceStepCondExpr1
``` where t0 and t1 are expressions of type Time that do not reference any of the choice's bound values, and [chooses must choose] means that one of the two keyword(s) on either side of the must be used. Both the after t0 and the until t1 constraints are optional for optional choices. For must-choose obligations only the after t0 constraint is optional.

DAML™ embodiments explain the semantics of the extended choice-steps in two parts. After t0 until t1 time constraints are evaluated. Then this embodiment defines when a 'must choose' obligation is breached and what the consequences of such a breach are.

Any choice or must-choose-obligation with an after tMin constraint can only be taken at a time t>=tMin. Any choice or must-choose-obligation ch with an until tMax constraint can only be taken at a time t<tMax. DAML™ embodiments call tMax the horizon of ch. DAML™ embodiments decided to interpret after tMin until tMax as a time-interval of the form {t|tMin<=t<tMax} to ensure that the intervals associated to two constraints of the form after t0 until t1 and after t1 until t2 are guaranteed to be disjoint. Thereby DAML™ embodiments simplify avoiding corner-cases where two choices are available at the same time. DAML™ embodiments decided to make the interval closed for its minimum time to ensure that a choice ch constrained by after 0 has the same behavior as the choice ch without the after 0 constraint.

A must-choose-obligation ch is breached at time t iff t is larger or equal to the horizon of ch. A model instance containing must-choose-obligations is breached at time t iff one of its must-choose-obligations is breached at time t.

DAML™ embodiments freeze breached models by disabling all choices for all parties.

The motivation for completely freezing breached models is the following. DAML™ embodiments designed must-choose-obligations to be used in models where there is no default behavior for resolving breaches. If there was a default behavior, DAML™ embodiments could and would encode it by giving optional choices for handling the breach to the counter-parties. DAML™ embodiments expect that breaches of must-choose obligations in a model c are resolved by proposing a resolution model that asks all stakeholders of the model c for approval and then deletes model c jointly with creating other models to compensate for the damages caused by the breach. The following example illustrates such a must-choose-obligation breach and its resolution.

```
testMustChooseObligationBreachResolution =
    let iouFor = \(owner :: Party) -> iouSellSettle 'Bank' owner 100;
        aliceMustPayBobUntil = mustPayUntil 'Alice' 'Bob' (iouFor 'Alice');
    in
      scenario
      [ -- create IOU's and payment obligations for 'Alice'
        pass (days 0) ~> t0
      , 'Bank' commits create (iouFor 'Alice') ~> aliceIouId
      , 'Alice' commits create (aliceMustPayBobUntil (t0 + days 2)) ~>
mustPayId
        -- demonstrate that contracts are frozen as soon as one of their
        -- 'must choose' obligations is breached
      , pass (days 2)
        -- 'Alice' is too late with her payment.
      , mustFail ('Alice' exercises "pay" with aliceIouId on mustPayId)
        -- contracts with breached 'must choose' obligations are frozen
      , mustFail ('Bob' exercises "forfeit" on mustPayId)
        -- Demonstrate resolution of breached contract
        --
        -- Let's assume that 'Alice' and 'Bob' agreed out of ledger that
        -- 'Alice' can resolve the breached mustPayId contract by paying
        -- both the original payment and a 100% fine in two days after
        -- 'Bob's acceptance of the reparation proposal.
      , 'Alice' commits create (
          await
          { "accept": 'Bob' chooses at t then
              { "deleted": delete mustPayId (aliceMustPayBobUntil (t0 +
days 2))
              , "payment1": aliceMustPayBobUntil (t + days 2)
              , "payment2": aliceMustPayBobUntil (t + days 2)
              }
            , "bob rejects": 'Bob' chooses then { }
          }
        ) ~> proposedResolution
      , 'Bob' commits 'Bob' exercises "accept" on proposedResolution
          ~> { "payment1": payment1, "payment2": payment2 }
        -- Alice immediately pays the first installment.
      , 'Alice' commits 'Alice' exercises "pay" with aliceIouId on pay-
ment1
      ]
    ;
```

Alternate DAML™ embodiments include extensions of the model language that DAML™ embodiments might want to add in alternate execution environments. They may include Descriptive Literals for Relative Time like '1d' to denote one day in relative time. Analogously, for other common units of measuring relative time. Mustache Templates for Legal Agreements: The explicit syntax for describing legal text is quite verbose. Provided is a lightweight alternative in the style of Mustache templates. For example, DAML™ embodiments may use an agreement as follows.

```
seller, buyer agree
   "{{seller}} has mown the lawn of {{buyer}} between {{tbought}}
``` and {{tbought + 1d}}, and if this was not the case, then {{buyer}} can sue {{seller}} according to the Swiss OR."

Public Choices explain the whenever some partyMakingChoiceBinder at choiceTimeBinder prefix for choices. DAML™ embodiments allow the definition of newtypes with a light-weight syntax that defines explicit conversion functions, and introduces lifted versions of all functions on the representation type. These newtypes are intended to reduce the number of opportunities for confusion in the positional calling convention.

```
newtype Amount = Integer
fromAmount :: Amount -> Integer
toAmount :: Integer -> Amount
newtype Account = Text
fromAccount :: Account -> Text
toAccount :: Text -> Account
```

Type+Operator Extensions include a group of extensions that DAML™ embodiments envision to be useful, which can all be described as an additional set of types and functions using these types. DAML™ embodiments currently envision the following ones. Banking Calendar Support since banking models may depend heavily on trade-location-specific calendar conventions. DAML™ embodiments may want to provide custom operators with a well-defined semantics to capture these conventions. Times are usually in local exchange timezone. Many options/futures expire on things like 3rd Friday of month at 08:30. special treatment is required during business holidays where dates usually move before the holiday. Using an observable of something like businessDayOrBefore(t, "Europe/Zurich") might thus be useful.

Simple Observables are usable since many models need access to market data and other observable values of the physical reality where there is an objective definition of how they are measured. If the models are executed between participants sharing a common definition of observable values then an operator of the form obs::Text→Time→Integer would be useful and sufficient to look up the values of the observable at specific times. Note that that this lookup would fail for times lying in the future. In case the model parties want to delegate the publication of observable values to third-parties, then DAML™ embodiments may use cryptographic receipts as described in the next section.

Cryptographic Receipts may be used to support binding of model evolution with off-ledger cryptographic statements; e.g., for certified market-data. Simple Key-based Receipts use signatures directly in the choice conditions. Policy-based Receipts are based on Proof-Carrying Authorization, and allow for elaborate policies to be used to check receipts provided in choice conditions.

Figure 2:
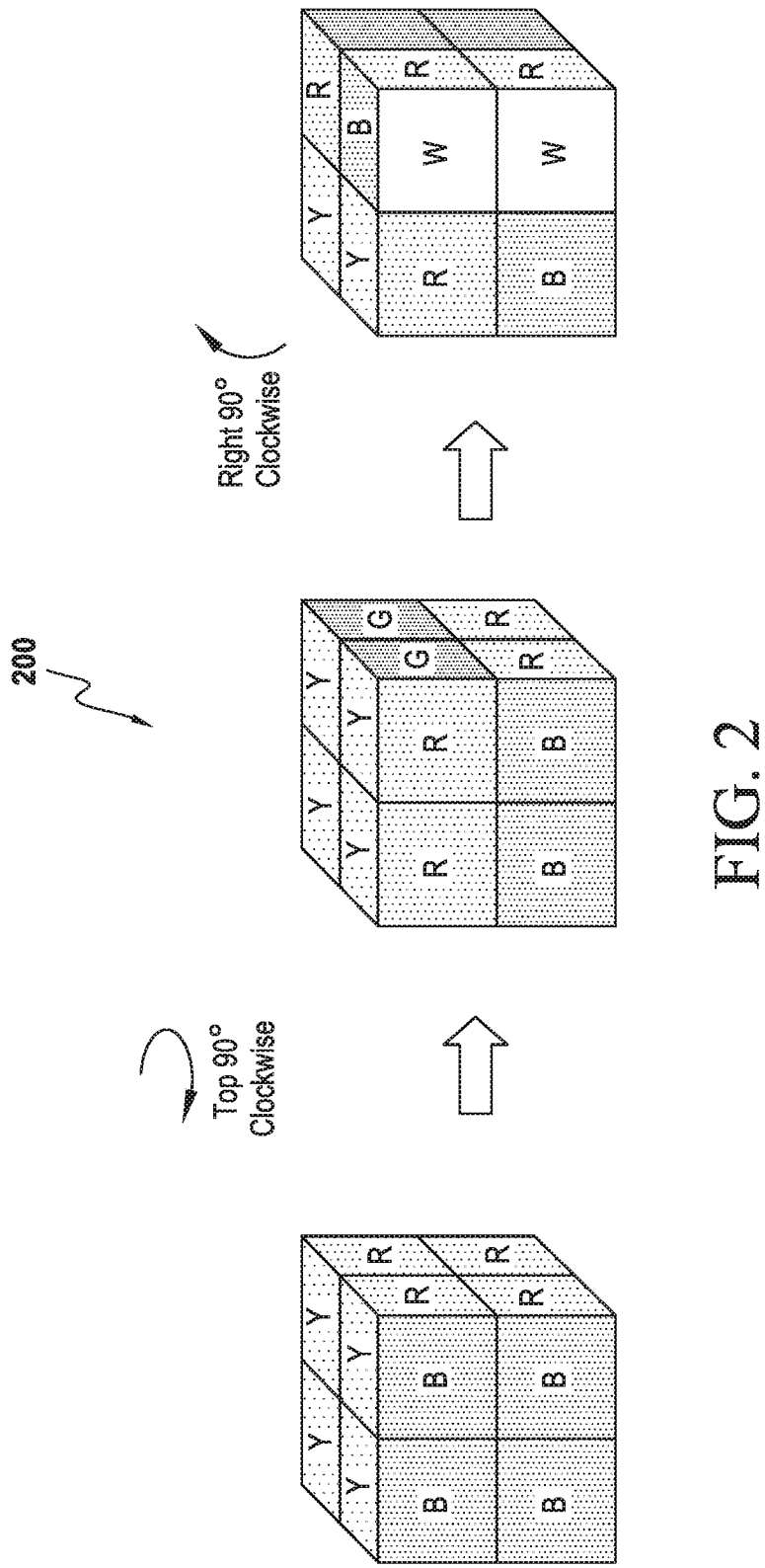
FIG. 2 is a hybrid analogical diagram showing state changes relative to actions in accordance with an exemplary embodiment of the present disclosure.

Turning to FIG. 2, a rotatable 2×2×2 multi-faced puzzle cube is indicated generally by the reference numeral 200. For ease of description, this cube is offered as an example somewhat analogous to a smart model to represent the potential states of the model. The state of the cube is defined as the ordered colors of the four blocks showing on each of three visible faces. In an initial state, all four sections of each respective one of the cube's six faces are a respective one of six colors such as Red (R), White (W), Blue (B), Yellow (Y), Green (G), and Black (B). A first transaction transitions the cube through a top 90-degree clockwise rotation. A second transaction transitions the cube through a right 90-degree clockwise rotation.

Figure 3:
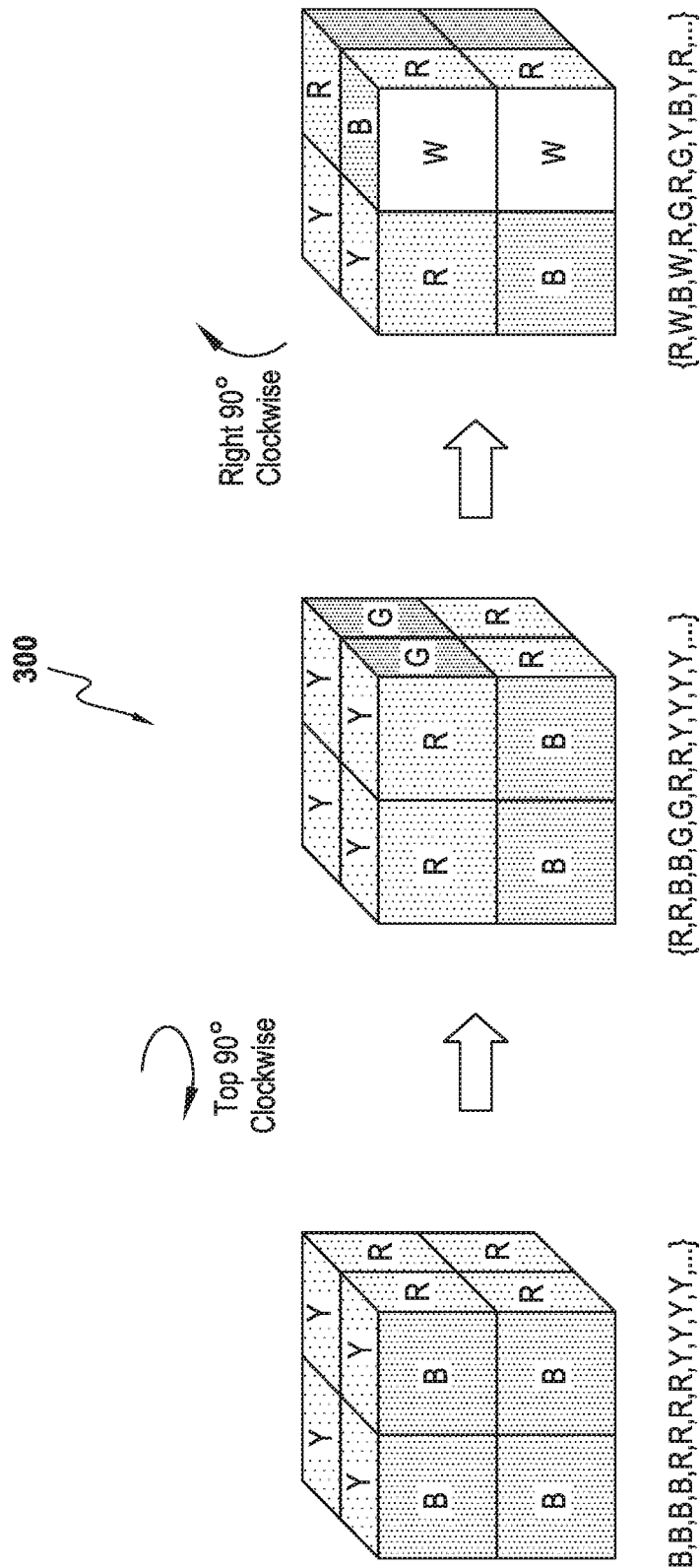
FIG. 3 is a hybrid analogical diagram showing digitized states relative to the state changes of FIG. 2 in accordance with an exemplary embodiment of the present disclosure.

Turning now to FIG. 3, an example of representation of the states to be recorded for the cube of FIG. 2 are indicated generally by the reference numeral 300. The initial state is {B, B, B, B, R, R, R, R, Y, Y, Y, Y, . . . }; the state after the top 90-degree clockwise rotation is {R, R, B, B, G, G, R, R, Y, Y, Y, Y, . . . }; and the state after the right 90-degree clockwise rotation is {R, W, B, W, R, G, R, G, Y, B, Y, R, . . . }.

Figure 4:
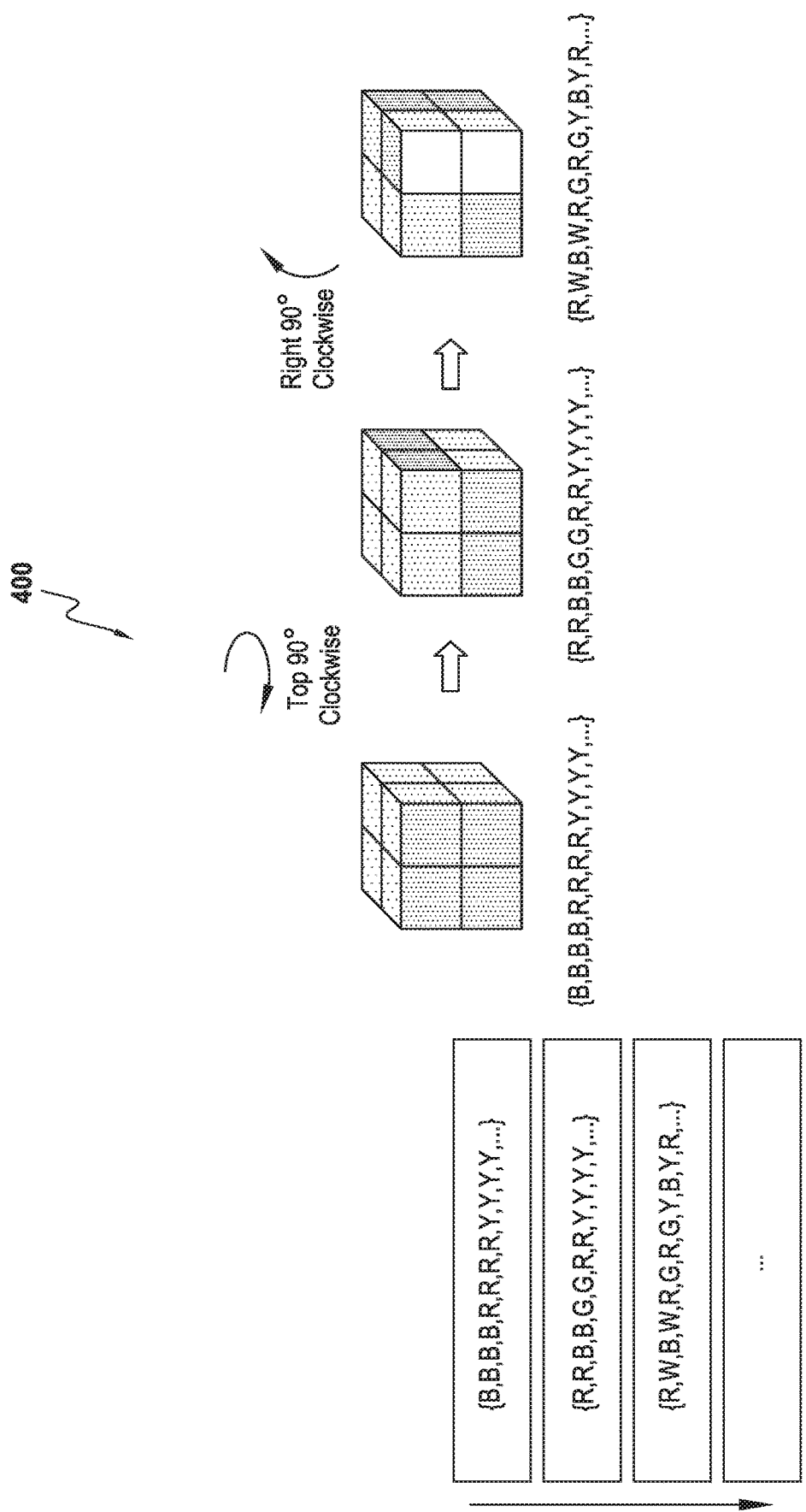
FIG. 4 is a hybrid analogical diagram showing recordation of the states of FIG. 3 to a ledger in accordance with an exemplary embodiment of the present disclosure.

As shown in FIG. 4, the states of the cube as recorded to an append-only ledger in chronological order are indicated generally by the reference numeral 400. Here, the initial state of {B, B, B, B, R, R, R, R, Y, Y, Y, Y, . . . } is appended first; the second state of {R, R, B, B, G, G, R, R, Y, Y, Y, Y, . . . } is appended next; and the third state of {R, W, B, W, R, G, R, G, Y, B, Y, R, . . . } is appended last.

Figure 5:
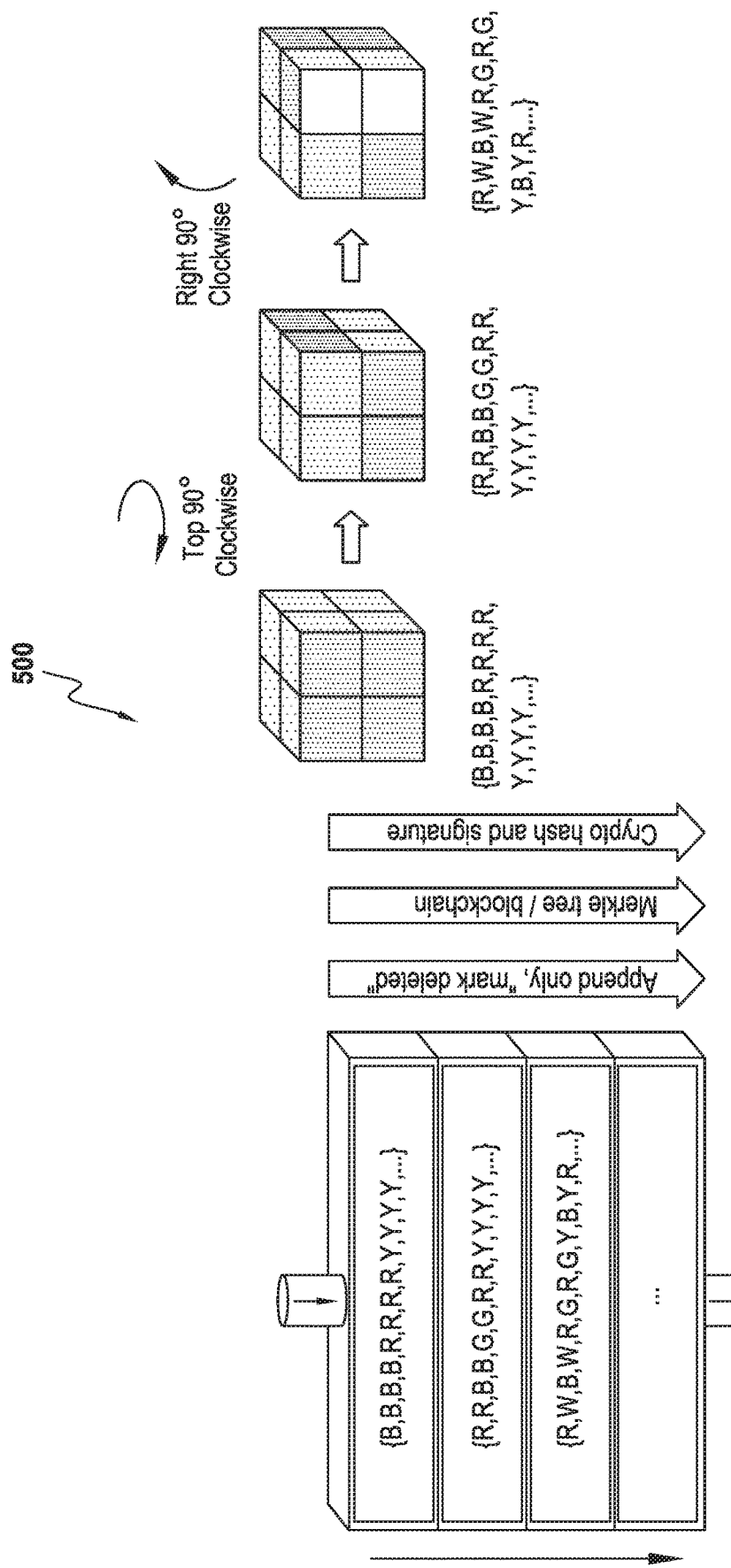
FIG. 5 is a hybrid analogical diagram showing change of state, securing, and authorization of the ledger of FIG. 4 in accordance with an exemplary embodiment of the present disclosure.

Turning to FIG. 5, change semantics, security and authorization, measures for the append-only ledger are indicated generally by the reference numeral 500. Such measures may include marking a previously recorded state of the smart model as superseded, creating a cryptographic hash and/or signature tied to each new state of the smart model; and using a Merkle tree or block-chain to ensure that each ledger committed to the ledger is built from a provable origin of references to previous ledger entries, follows verifiable commitments to previously defined validations rules, enables later sharing of hidden provable properties, and is tamper-proof.

Figure 6:
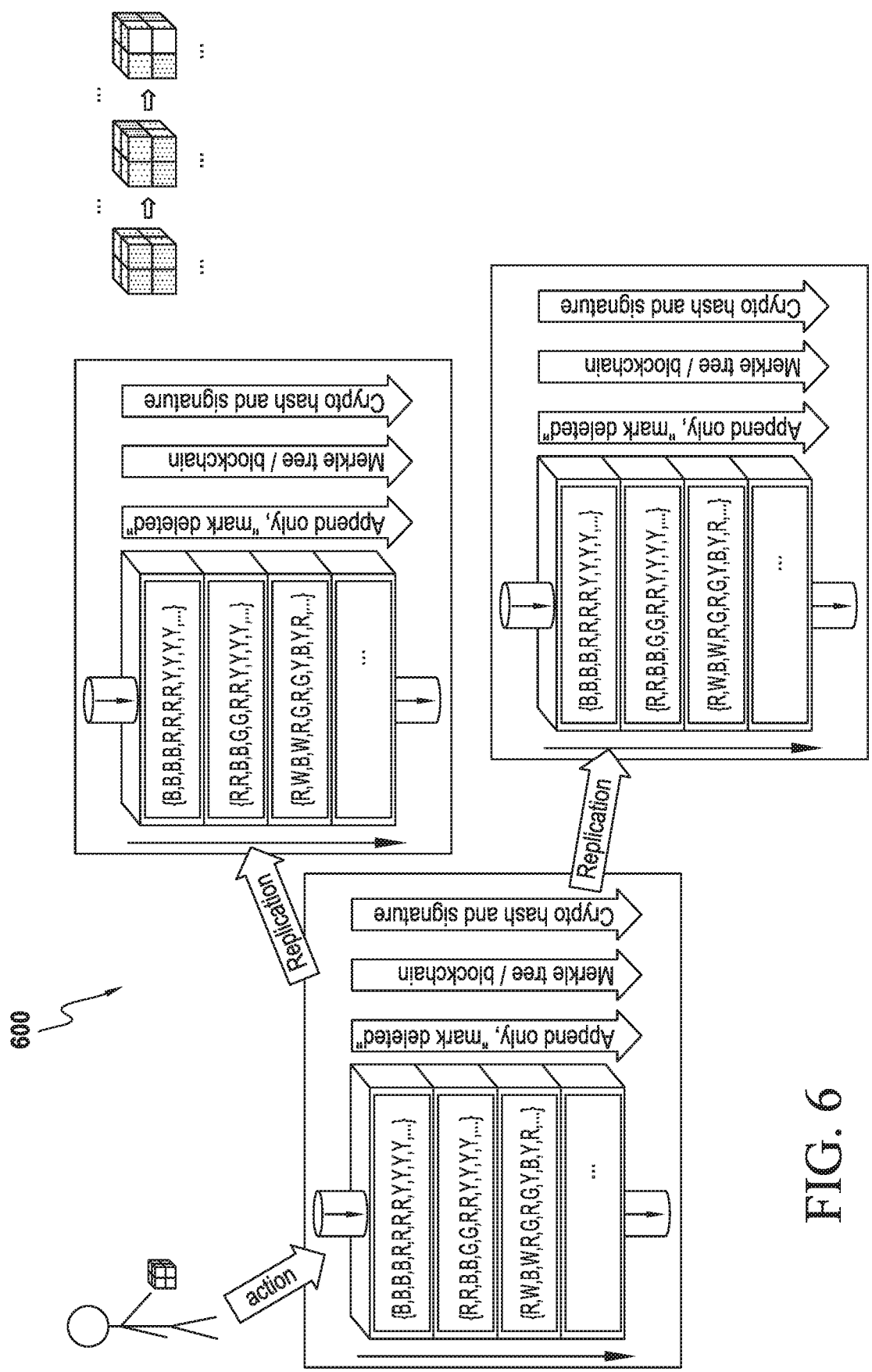
FIG. 6 is a hybrid analogical diagram showing replication of the modifiable, secured and authorized ledger of FIG. 5 in accordance with an exemplary embodiment of the present disclosure.

Turning now to FIG. 6 replicated copies of the ledger are indicated generally by the reference numeral 600. The replicated copies may be used to make the ledger robust to localized failures.

Figure 7:
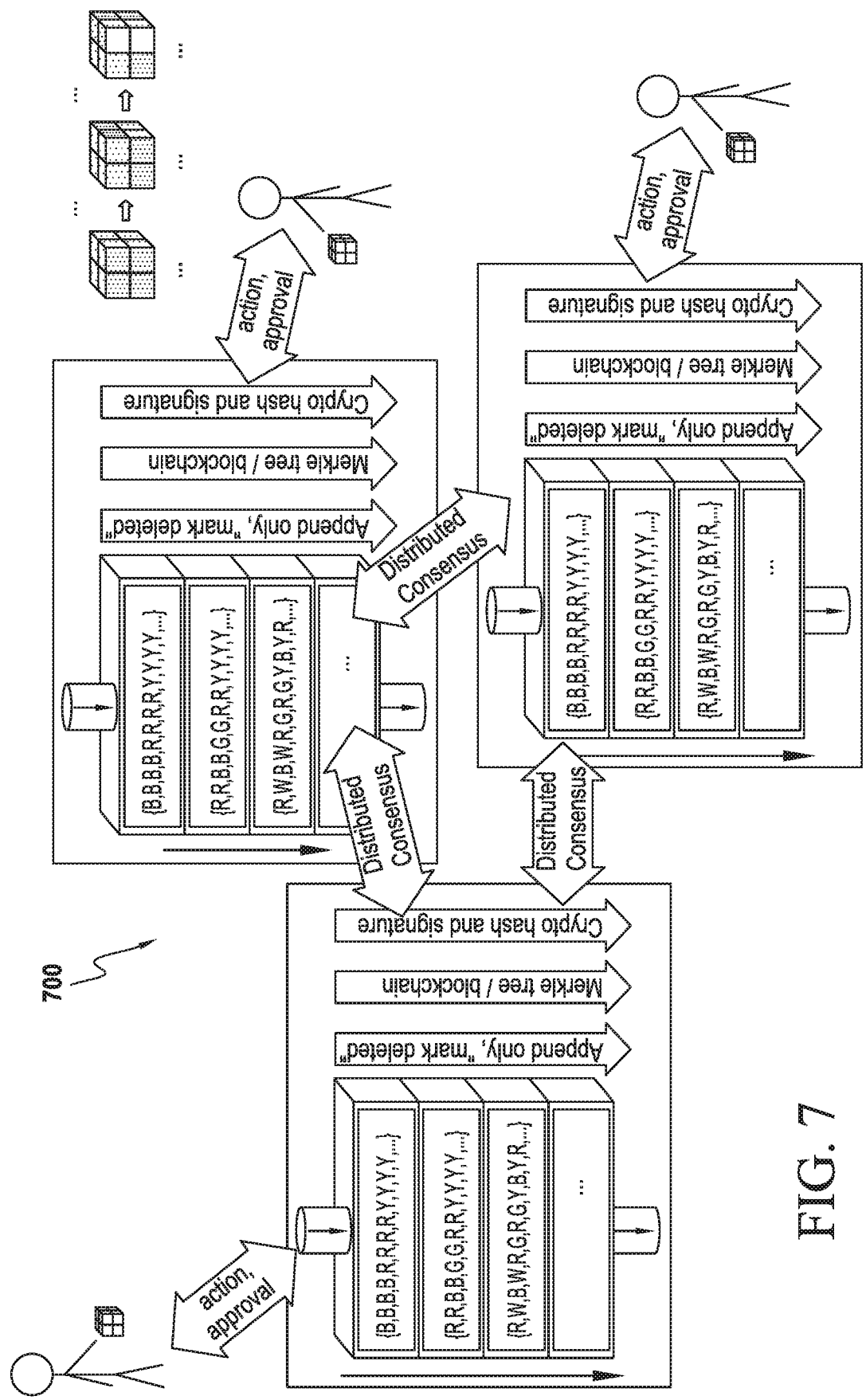
FIG. 7 is a hybrid analogical diagram showing distributed consensus for the replicated ledger of FIG. 6 in accordance with an exemplary embodiment of the present disclosure.

As shown in FIG. 7, a ledger with approval and consensus distribution among the replicated copies of the ledger 600 is indicated generally by the reference numeral 700. Consensus facilitates maintenance of a single version of the distributed ledger.

Figure 8:
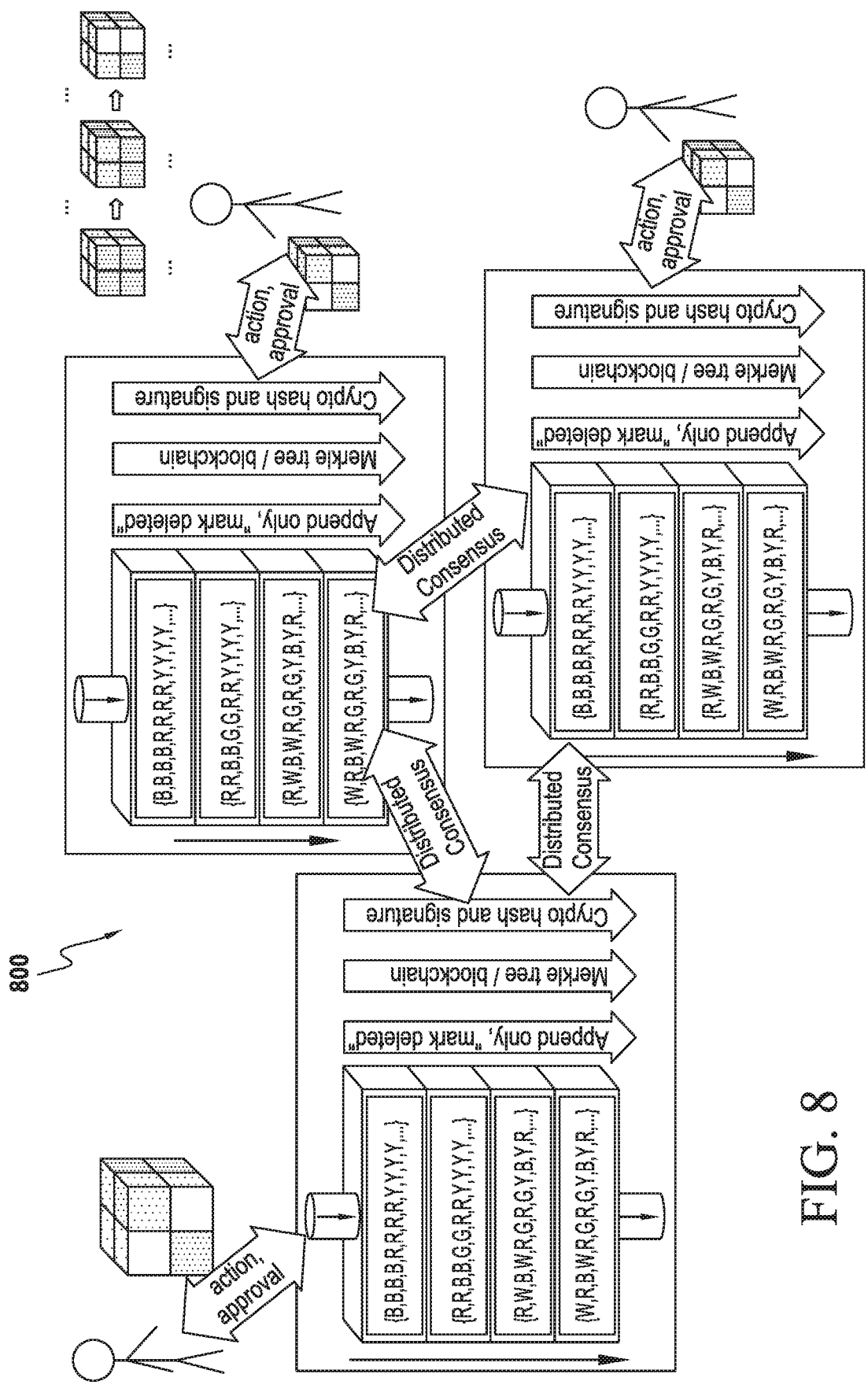
FIG. 8 is a hybrid analogical diagram showing unnoticed propagation of invalid or inconsistent state within the distributed ledger of FIG. 7 in contrast with an exemplary embodiment of the present disclosure.

Turning to FIG. 8, the ledger 700 with the latest approved entry appended is indicated generally by the reference numeral 800. As shown, the ledger 800 includes apparent unoticed errors for the front face of the cube. This is not an acceptable state, and yet is not excluded without additional algorithms that validate the semantic correctness of the ledger entries. Such situations of error or inconsistent states inclusion in the ledger is not a current exemplary embodiment of the DAML™ ledger storage.

Figure 9:
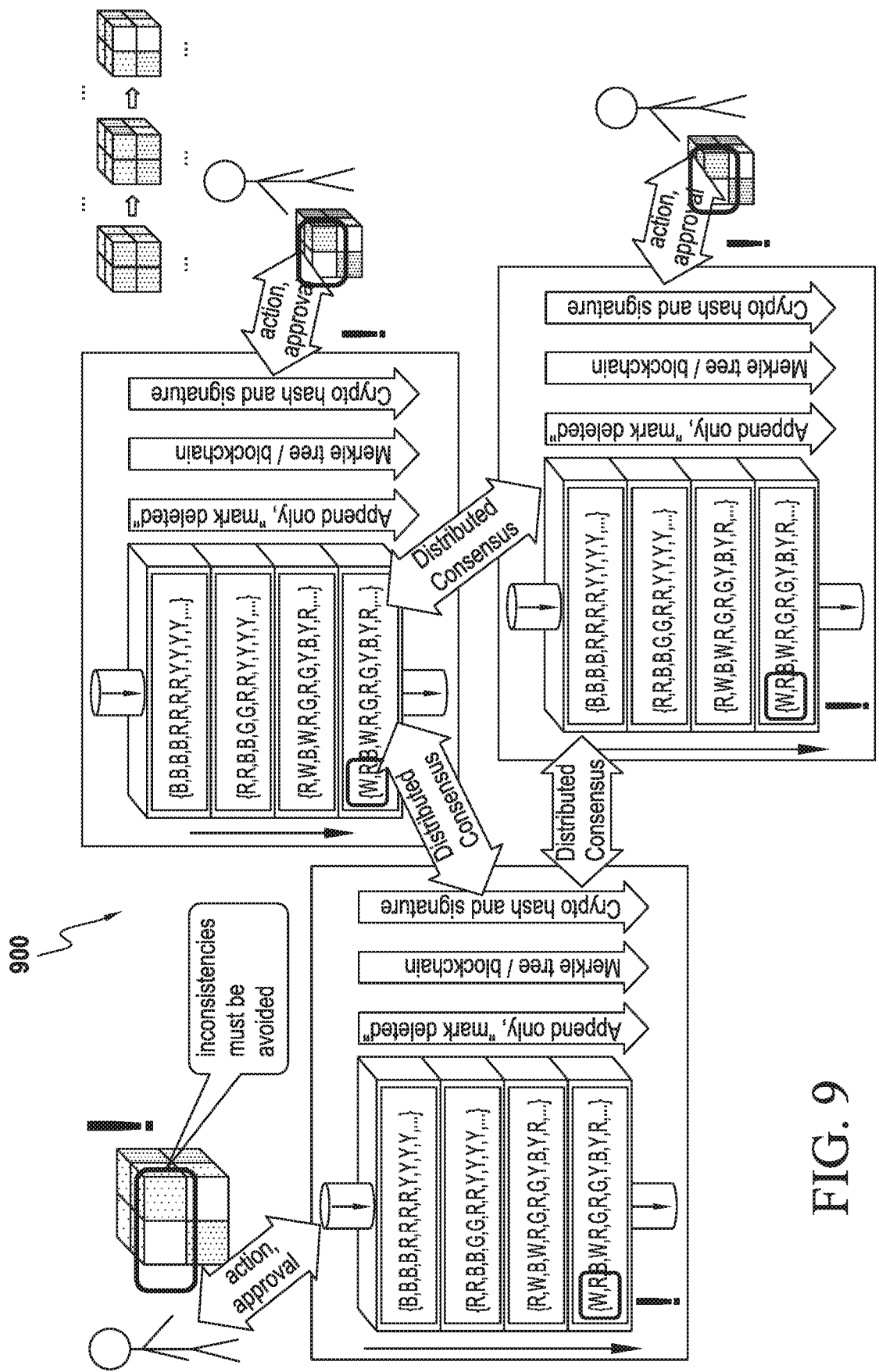
FIG. 9 is a hybrid analogical diagram showing noticed propagation of invalid or inconsistent state within the distributed ledger of FIG. 8 in contrast with an exemplary embodiment of the present disclosure.

Turning now to FIG. 9, the ledger with errors is indicated generally by the reference numeral 900. Here, the same error state, which was apparently noticed and committed, had become the distributed consensus on all nodes. This is not an acceptable state, and yet is not excluded without additional algorithms that validate the semantic correctness of the ledger entries. Such situations of error or inconsistent states inclusion in the ledger is not a current exemplary embodiment of the DAML™ ledger storage.

Figure 10:
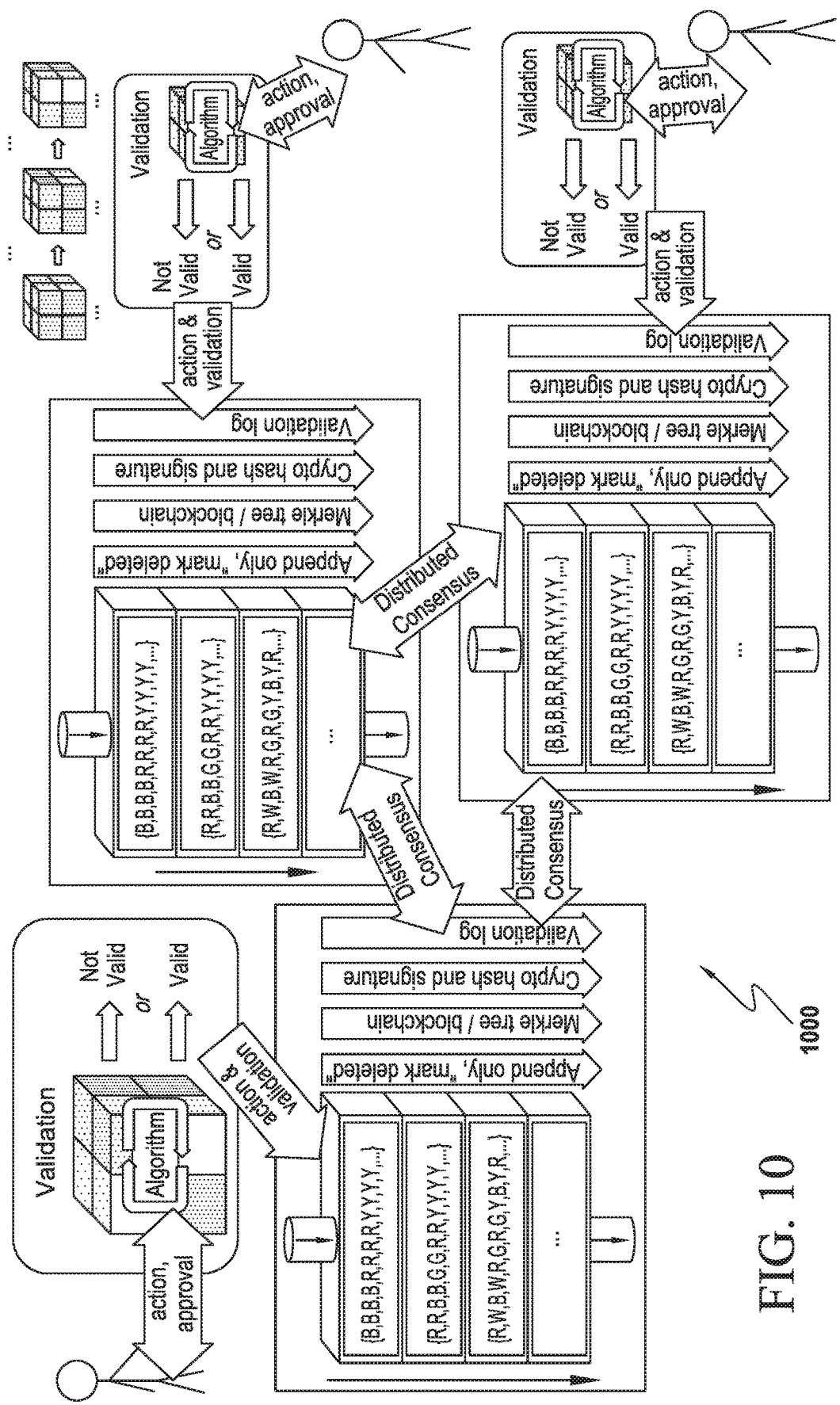
FIG. 10 is a hybrid analogical diagram showing entry validations and prevention of invalid or inconsistent states within the ledger of FIGS. 8 and 9 in accordance with an exemplary embodiment of the present disclosure.

As shown in FIG. 10, a ledger with validation of semantic correctness of ledger entries to avoid the entry of incorrect ledger entries indicated generally by the reference numeral 1000. Here, the validation against the higher rule or master model yielded an invalidity conclusion, and one or more parties blocks the ledger entries from entering the ledger because of this failed validation. In case of correct validation, the ledger entries can be committed with the inclusion of the "validating logic" within the ledgers log. The current exemplary embodiment of the DAML™ storage and ledger logic has one or more parties rejecting erroneous or semantically incorrect proposed ledger entry transaction. The current exemplary embodiment of the DAML™ storage and ledger logic has parties maintaining hash trees basic logic in the form of a blockchain allowing the full history of validation of each ledger transaction to be revisited and rechecked for auditing purpose.

Figure 11:
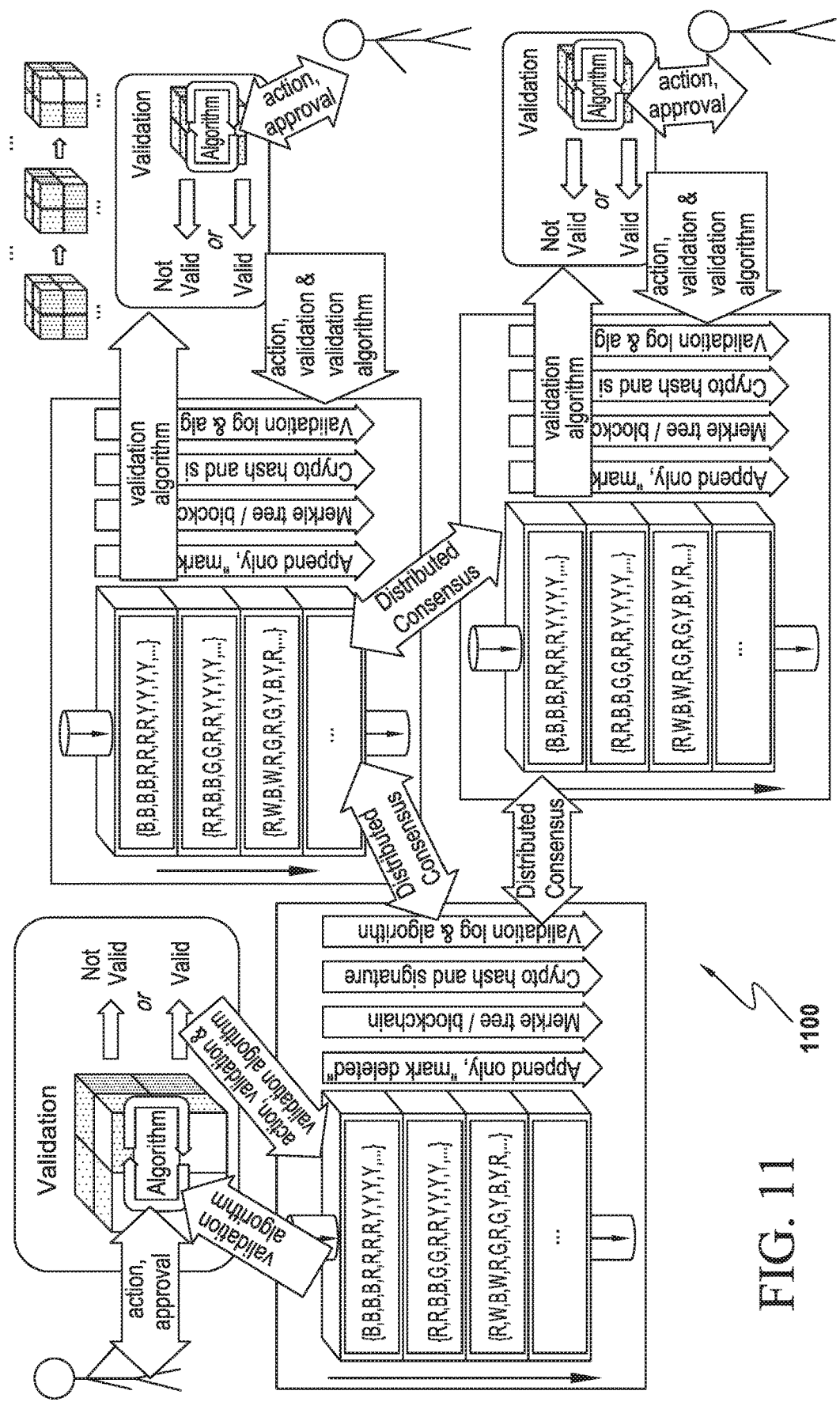
FIG. 11 is a hybrid analogical diagram showing dynamic strengthening and extension of the validation process for the ledger of FIG. 10 in accordance with an exemplary embodiment of the present disclosure.

Turning to FIG. 11, a ledger where validation algorithms are define within the ledger, strengthening and extending the capabilities of the validation of ledger entries, is indicated generally by the reference numeral 1100. Here, a validation algorithm applied to each instance of the distributed ledger may depend on algorithms defined within previous ledger entries, and the resulting action and validation are applied. This makes validation stronger and extensible. The current exemplary embodiment of the DAML™ storage uses the formal property of the DAML™ to validate the later execution of DAML™ functions, uses previously stored DAML™ digital asset based ledger entries as a basis to validate DAML™ execution logic, and validate the include of new DAML-based ledger entries.

Figure 12:
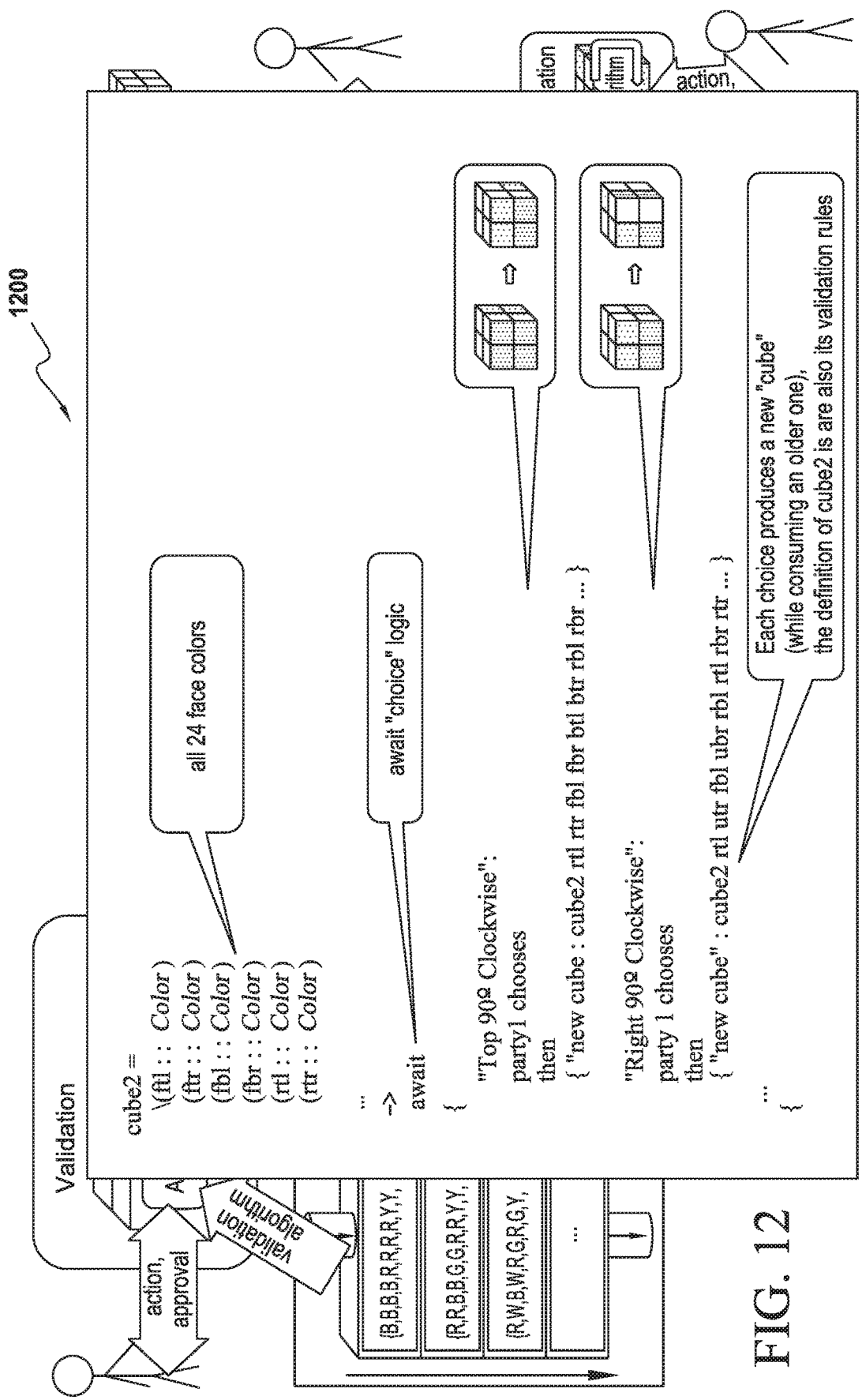
FIG. 12 is a hybrid diagram showing DAML™ code using the Await function with defined actions for single party in accordance with an exemplary embodiment of the present disclosure.

Turning now to FIG. 12, an instance of DAML™ code is indicated generally by the reference numeral 1200. This DAML™ code defines variables of type color (an example party define defined type) for each of the four sections of each of the six faces (24 total), which will indicate one of the six colors for each section. This code further includes a DAML™ "await" function, which awaits a party's choice of rotating either a top side or a right side, for example. Here, each choice produces a new "cube" while consuming an older one, and the definition of cube2 includes its validation rules.

Figure 13:
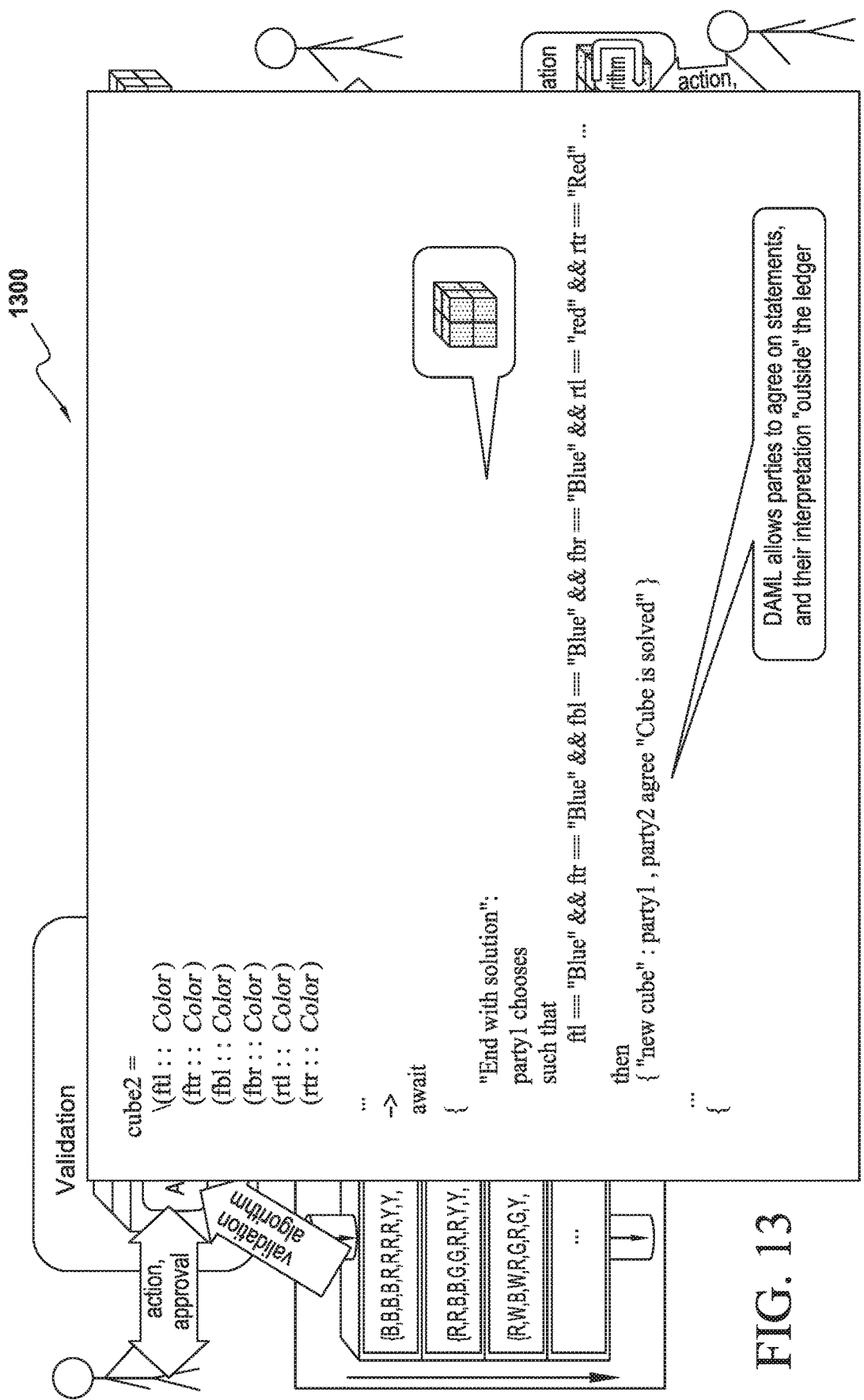
FIG. 13 is a hybrid diagram showing DAML™ code using defined actions for real-world agreement among multiple parties within a conditional in accordance with an exemplary embodiment of the present disclosure.

As shown in FIG. 13, an instance of DAML™ code is indicated generally by the reference numeral 1300. This code includes a DAML™ "await" function that awaits party1's choice ("chooses") "such that" if each side is a single color, "then" the parties "agree" that the "Cube is solved". Here, DAML™ allows parties to agree on statements and their interpretations external to the ledger.

Figure 14:
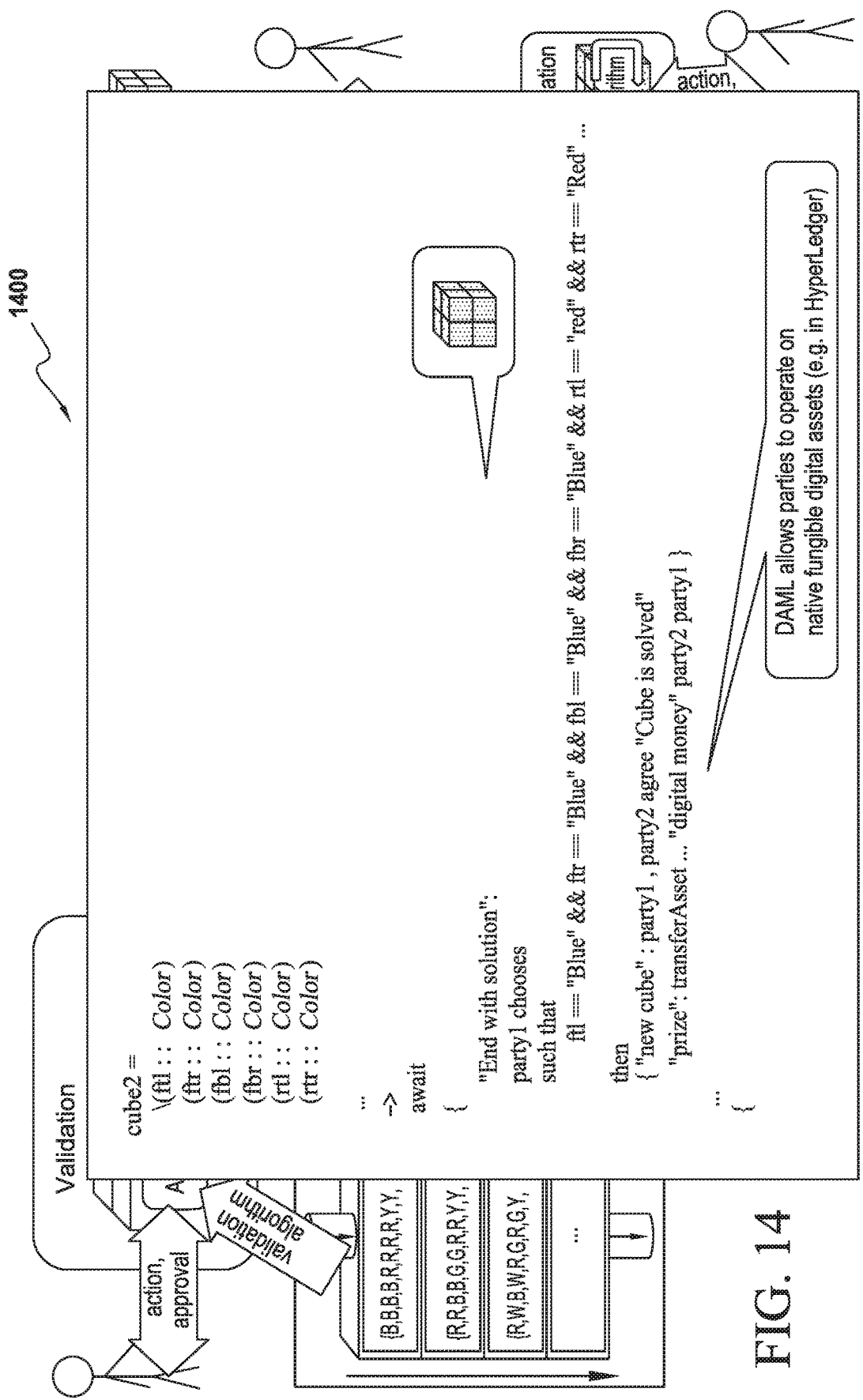
FIG. 14 is a hybrid diagram showing DAML™ code operating on native fungible digital assets in accordance with an exemplary embodiment of the present disclosure.

Turning to FIG. 14, an instance of DAML™ code is indicated generally by the reference numeral 1400. This code includes a DAML™ "await" function that awaits party1's choice ("chooses") "such that" if each side is a single color, "then" the parties "agree" that the "Cube is solved" and a prize is transferred ("transferAsset") from party2 to party1. Thus, DAML™ allows parties to operate on native fungible digital assets (e.g., assets in HyperLedger).

Figure 15:
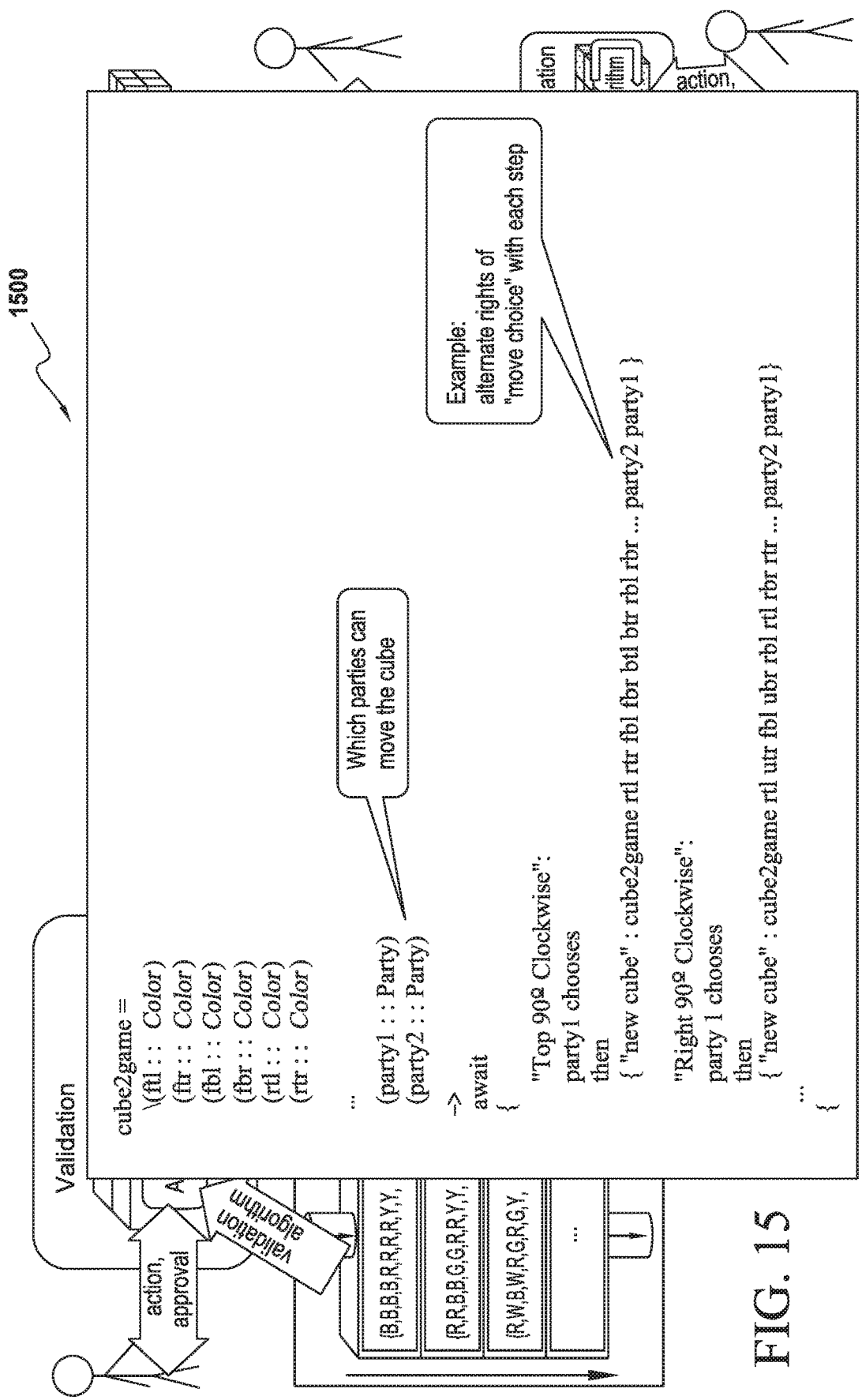
FIG. 15 is a hybrid diagram showing DAML™ code with alternating actions by two parties versus the single party logic of FIG. 12 in accordance with an exemplary embodiment of the present disclosure.

Turning now to FIG. 15, an instance of DAML™ permitting alternating moves by two parties is indicated generally by the reference numeral 1500. This DAML™ two-party alternating moves example is different than that of FIG. 12, in which only one party could choose one of the two shown moves.

Figure 16:
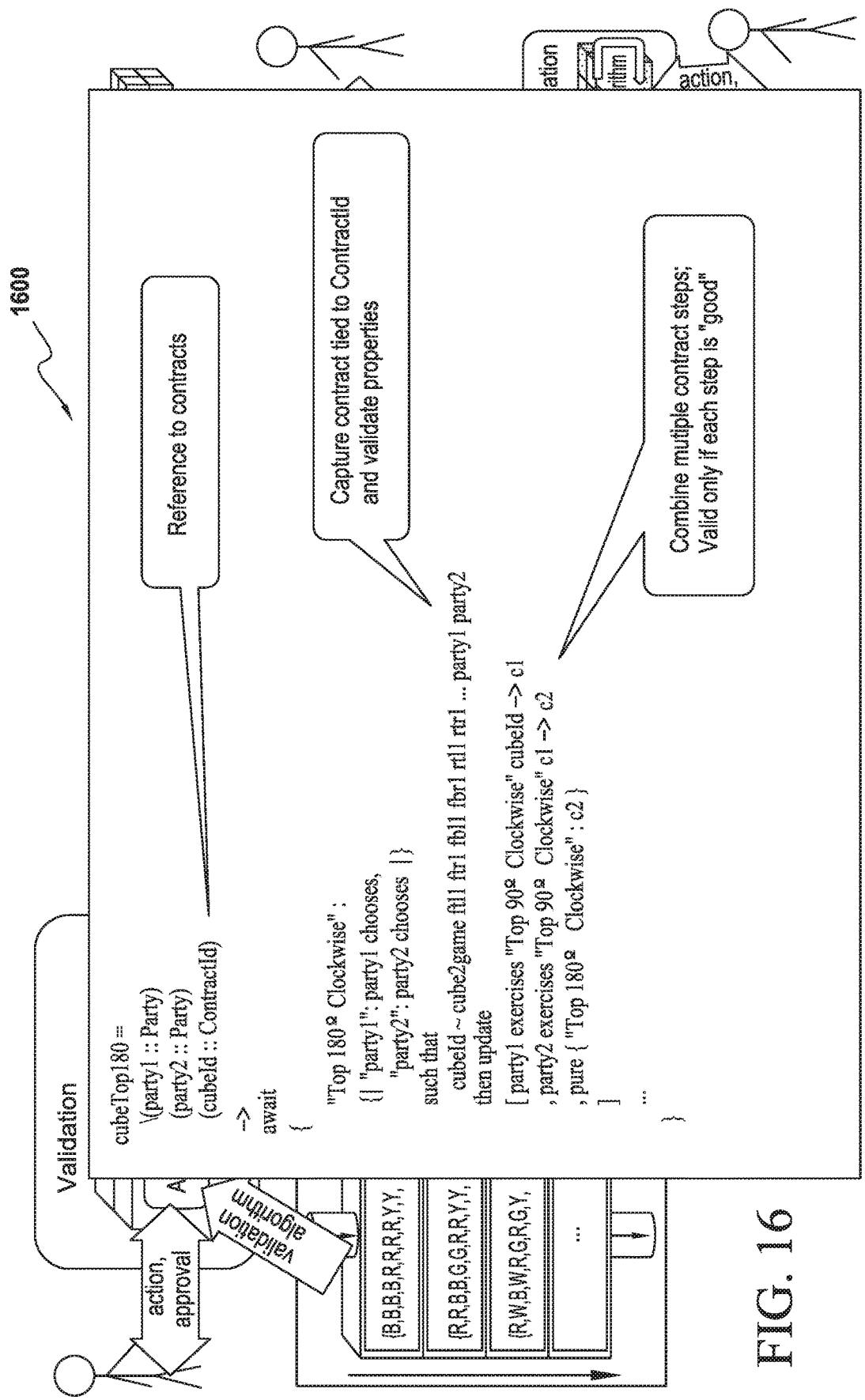
FIG. 16 is a hybrid diagram showing DAML™ code combining multiple steps in accordance with an exemplary embodiment of the present disclosure.

As shown in FIG. 16, an instance of DAML™ code combining multiple steps is indicated generally by the reference numeral 1600. This is a multiple-moves example with a "such that" condition that must be met in order for the validation to be accepted and allow the update to take place.

Figure 17:
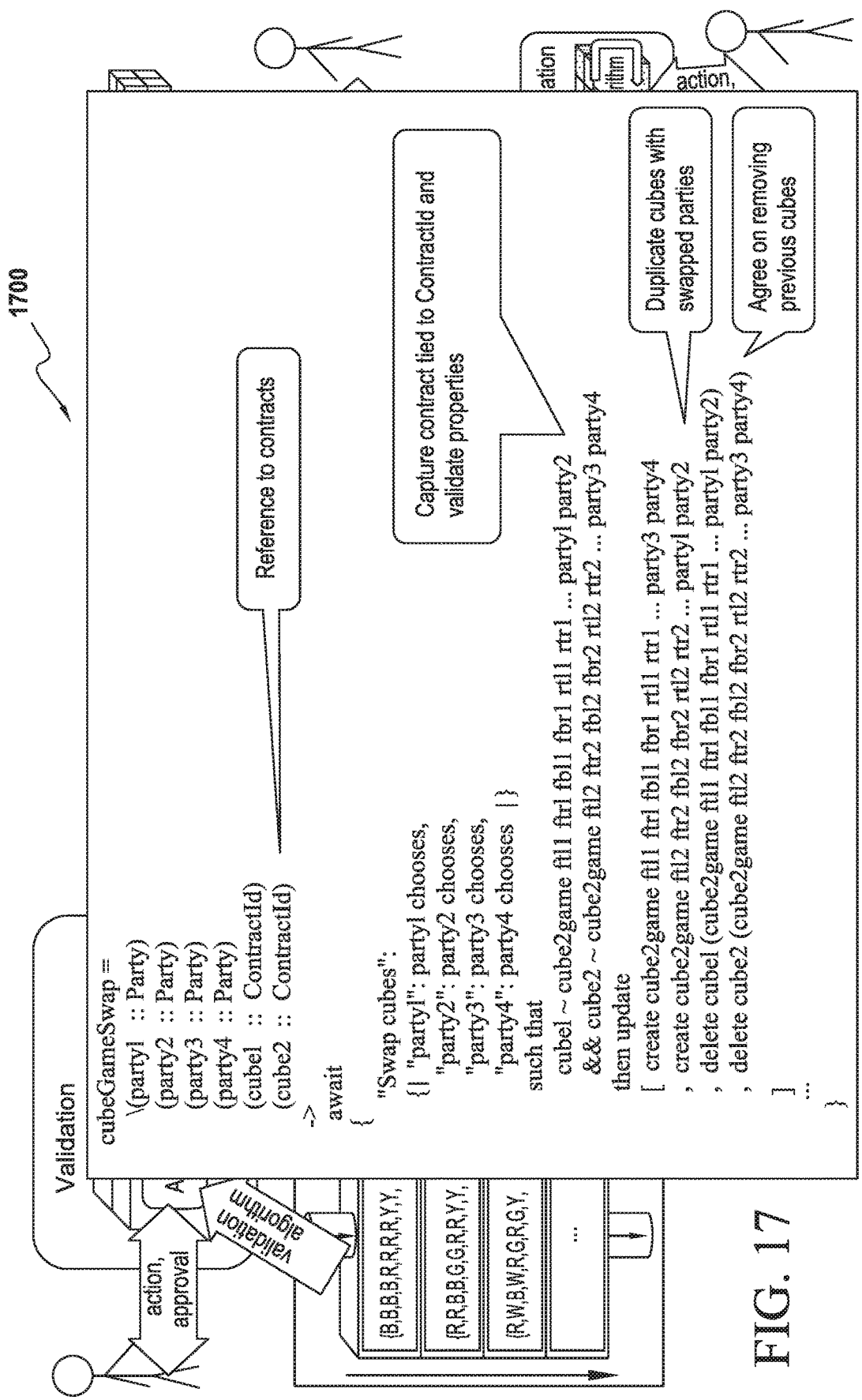
FIG. 17 is a hybrid diagram showing DAML™ code for an asset swap between two parties in accordance with an exemplary embodiment of the present disclosure.

Turning to FIG. 17, exemplary DAML™ code for an asset swap between two parties is indicated generally by the reference numeral 1700. This may be extended via recursion to a swap of cubes between multiple parties.

Thus, DAML™ ledger entry may be agreements, "await" (active models) waiting for parties to make one or more choices, and/or operations on native fungible assets. DAML™ agreements tie parties to "real world" data or "real world" activity and/or promises. DAML™ active models and operations on digital assets are both data and algorithmic in that they "contain" agreements that are data centric, and they allow active model exercise and asset operations that are algorithmic. Validation rules for an active model exercise are defined "within" each active model where they are like blockchain scripts, but in effect with a more sophisticated language, and new active models may create new validation rules.

Figure 18:
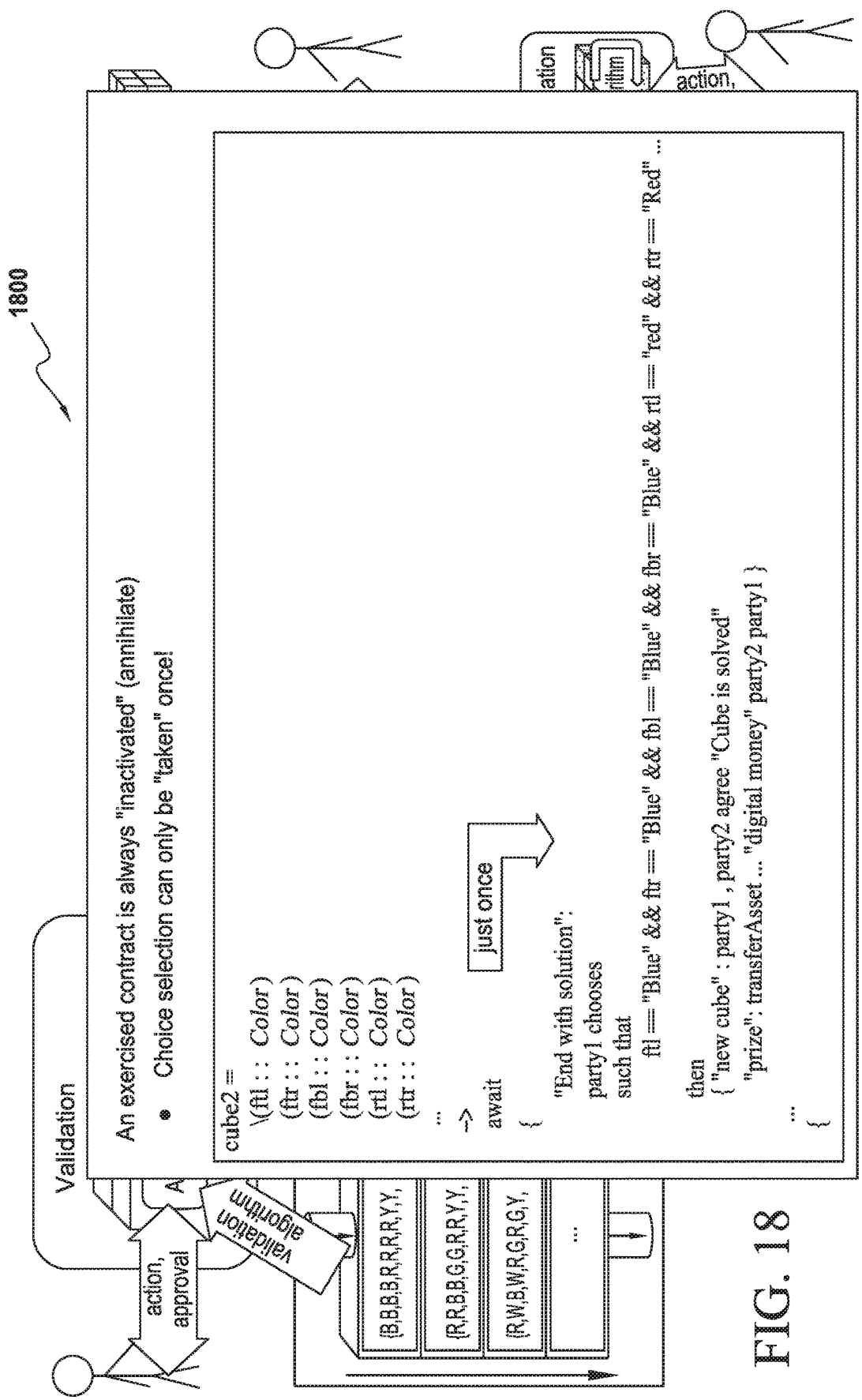
FIG. 18 is a hybrid diagram showing DAML™ code choice in accordance with an exemplary embodiment of the present disclosure.

Turning now to FIG. 18, exemplary DAML™ code entry types are indicated generally by the reference numeral 1800. An active model, once exercised, always becomes an inactive model. That is, only one choice can be taken within a choice selection, and once taken the choice selection is no longer available.

Figure 19:
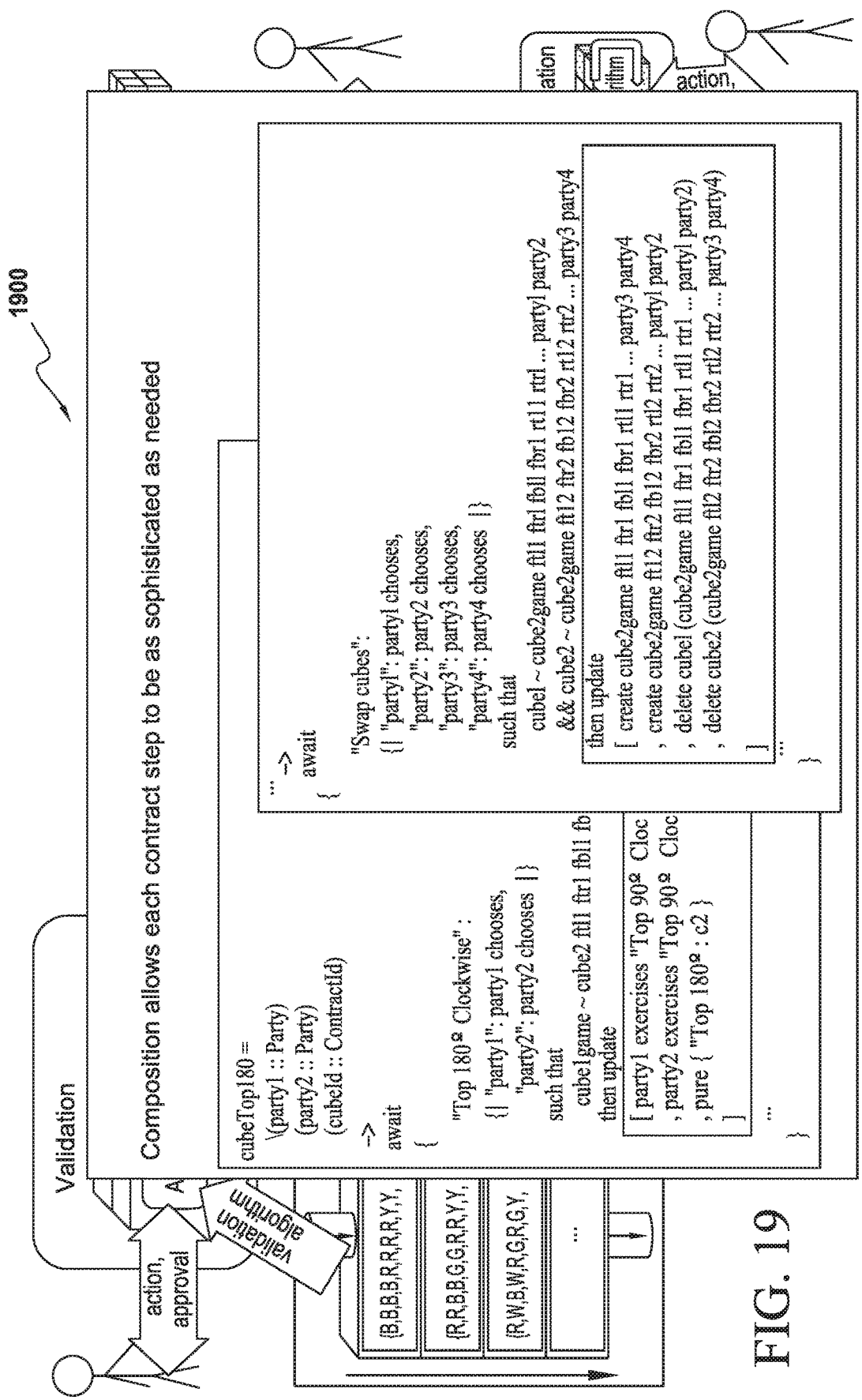
FIG. 19 is a hybrid diagram showing DAML™ code composition in accordance with an exemplary embodiment of the present disclosure.

As shown in FIG. 19, exemplary DAML™ code choice is indicated generally by the reference numeral 1900. Composition allows each model step to be as sophisticated as desired. Here, in addition to the multiple moves await for "Top 180" of FIG. 16, another await for "Swap cubes" is presented. An update section swaps two cubes by creating active swapped cubes and deleting the previous cubes by making them inactive.

Figure 20:
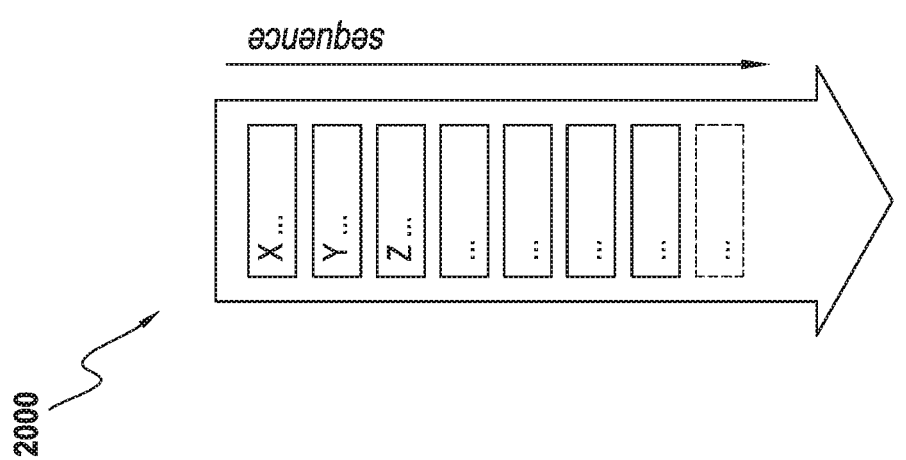
FIG. 20 is a hybrid diagram showing DAML™ ordered ledger entries in accordance with an exemplary embodiment of the present disclosure.

Turning to FIG. 20, an exemplary DAML-based ledger with ordered ledger entries is indicated generally by the reference numeral 2000. A ledger is an ordered set of ledger entries shown here as X, Y, Z. The current exemplary embodiment of the DAML™ ledger storage is append-only sequential ordering where a strict "one dimensional" order is maintained. Alternate embodiment of the DAML™ storage can be used to achieve better scaling by using a less strict and yet still logically correct sorting of ledger entries (e.g. through the use of direct acyclic graphs).

Figure 21:
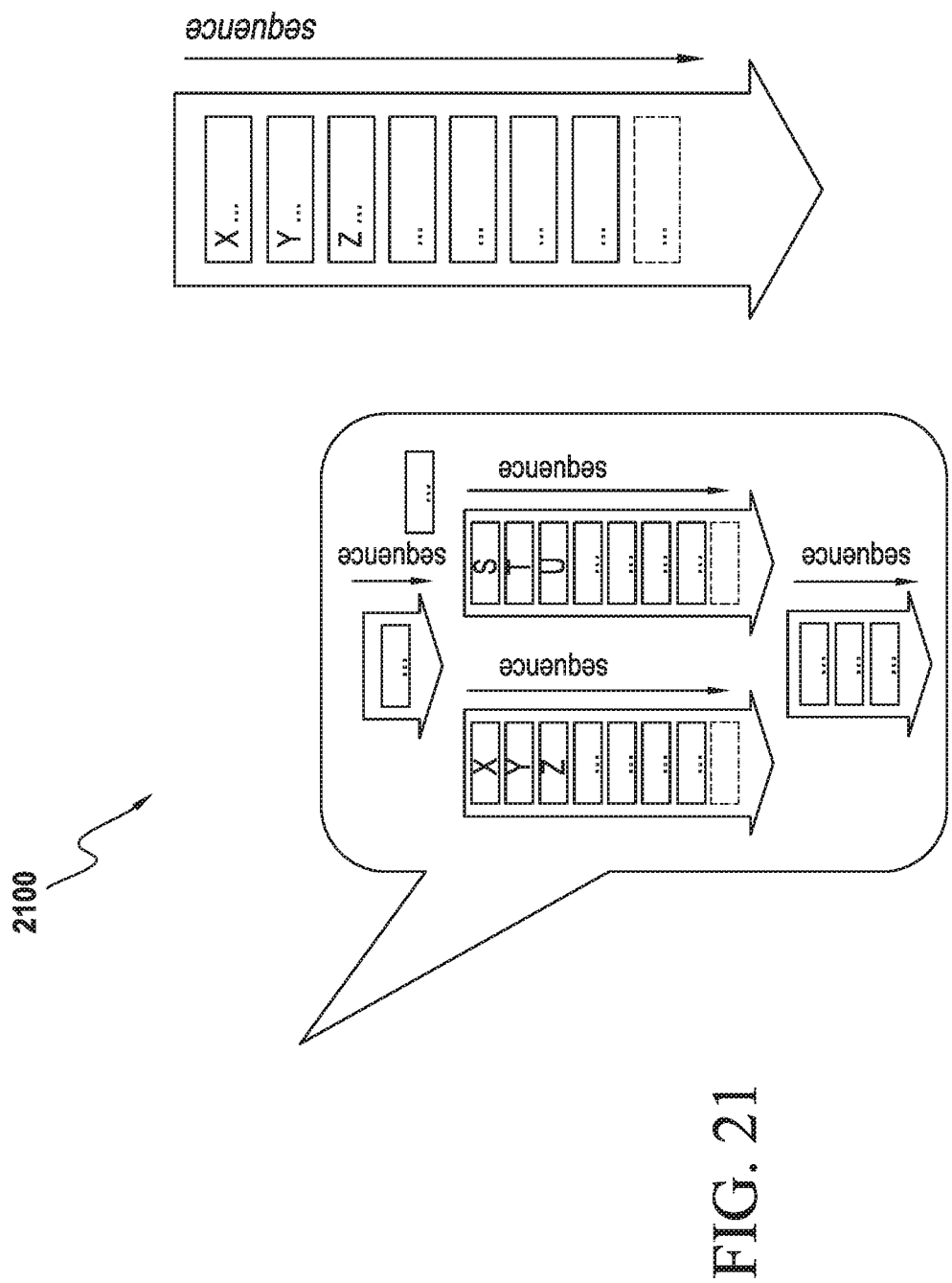
FIG. 21 is a hybrid diagram showing a DAML-based ledger with ordered ledger entries in accordance with an exemplary embodiment of the present disclosure.

Turning now to FIG. 21, another exemplary DAML-based ledger with ordered ledger entries is indicated generally by the reference numeral 2100. While the strict one-dimensional ordering of FIG. 20 is sequential, local versus global ordering allows for other sequential ordering possibilities. Here, topological sorting or a direct acyclic graph (DAG) technique may be utilized for scaling to larger scenarios and more complex possibilities.

Figure 22:
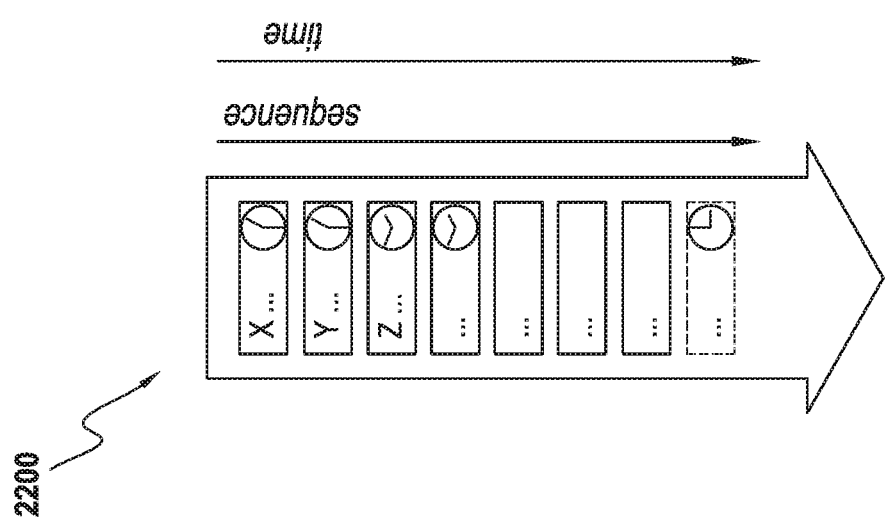
FIG. 22 is a hybrid diagram showing a DAML-based ledger with ordered and timestamped ledger entries in accordance with an exemplary embodiment of the present disclosure.

Turning to FIG. 22, an exemplary DAML-based ledger with ordered and timestamped ledger entries is indicated generally by reference numeral 2200. This ledger contains an ordered and timestamped set of ledger entries shown here as X, Y, Z. The current exemplary embodiment of the DAML™ ledger storage is an append-only ledger where temporal information is maintained with each monotonically increasing timestamped ledger entry.

Figure 23:
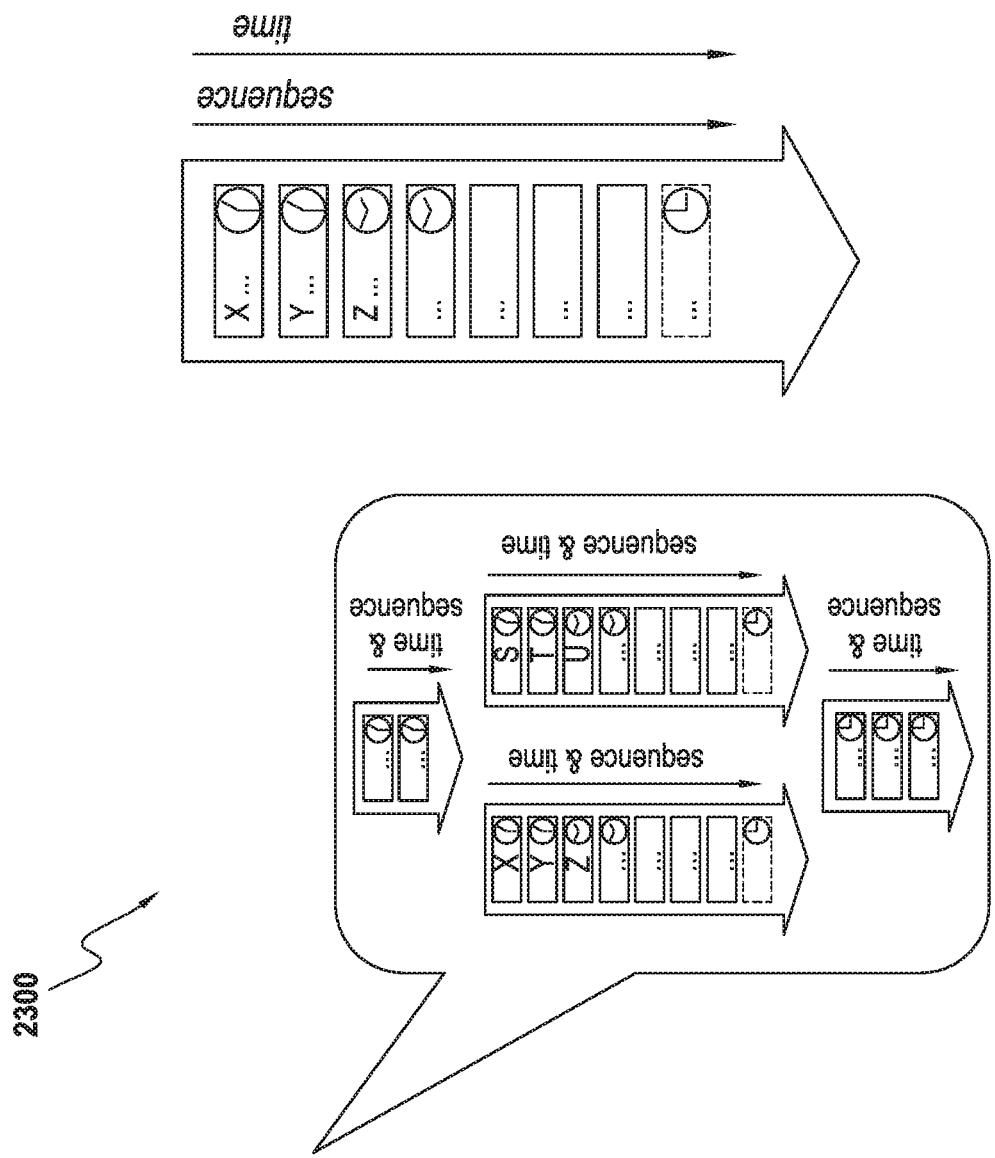
FIG. 23 is a hybrid diagram showing two exemplary DAML™ storage and ledger logic deployments across multiple parties in accordance with an exemplary embodiment of the present disclosure.

Turning to FIG. 23, two exemplary DAML™ storage and ledger logic deployments across multiple parties are indicated generally by the reference numeral 2300. Here, one (right) has centralized logic as in FIG. 22, but the other (left) has distributed logic. The centralized embodiment of the DAML™ storage and ledger logic is centralized around a key business party (e.g., an exchange), where parties can still maintain their own version of DAML™ storage and ledger logic. The distributed embodiment of a DAML™ storage and ledger logic deployment is distributed to support business processes that are not centralized around a key business party. This and like embodiments of the DAML™ storage can be used to achieve larger scaling by using weakly increasing timestamps (e.g., where unrelated ledger entries have no temporal dependencies).

Turning now to FIG. 24, an exemplary DAML™ transaction with ledger entries, stored as data structures, and secrecy is indicated generally by the reference numeral 2400. Both centralized (left) and distributed (right) ledger embodiments are shown. Here, parties C and D cannot see certain ledger entries, while parties A and B can. The ledger visible to a party may be effectively masked, using known cryptographic techniques, for example, such that the ledger transaction shows ledger entries visible only to authorized parties, such as to support secrecy. Here, a ledger transaction may include multiple ledger entries added as a "group" where transaction logic ensures "all or nothing" execution logic for the group. Secrecy and partial visibility are provided since not all parties involved in a transaction need or are authorized to see all ledger entries of that transaction, as a transaction may include ledger entries that are private to a subset of transaction participants. Transaction and entry insert/append authorization is supported where multiple parties need to authorize the transaction for it to be entered or committed.

Figure 25:
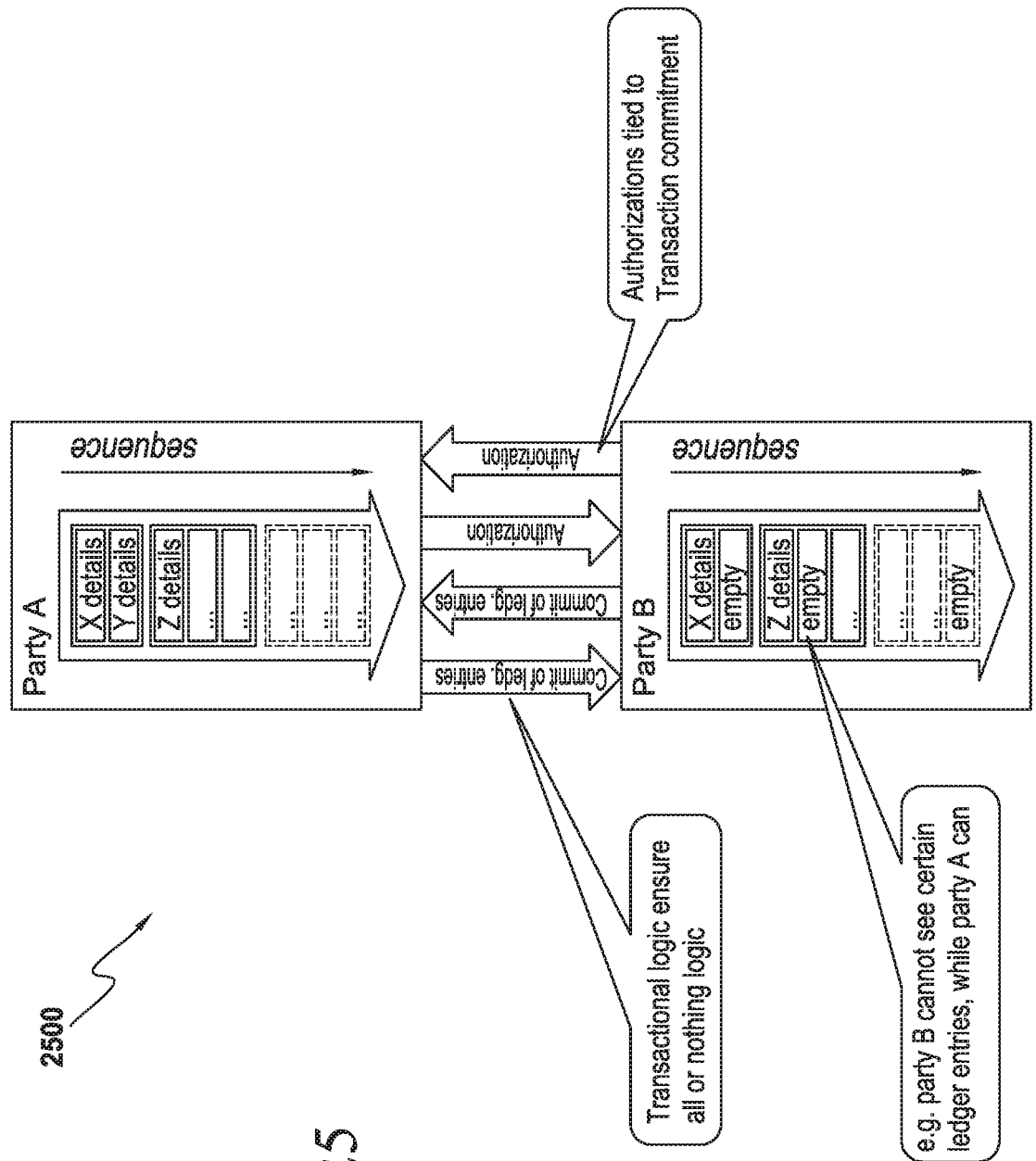
FIG. 25 is a hybrid diagram showing a DAML™ transaction with ledger entries and secrecy in accordance with an exemplary embodiment of the present disclosure.

Turning now to FIG. 25, an exemplary DAML™ transaction with ledger entries and secrecy is indicated generally by the reference numeral 2500. Here, party B cannot see certain ledger entries, while party A can. The ledger visible to a party may be effectively masked such that the ledger transaction shows ledger entries visible only to authorized parties, such as to support secrecy. Here, a ledger transaction may include multiple ledger entries added as a "group" where transaction logic ensures "all or nothing" execution logic for the group. Secrecy and partial visibility are provided since not all parties involved in a transaction need or are authorized to see all ledger entries of that transaction, as a transaction may include ledger entries that are private to a subset of transaction participants. Transaction and entry insert/append authorization is supported where multiple parties need to authorize the transaction for it to be entered or committed.

Figure 26:
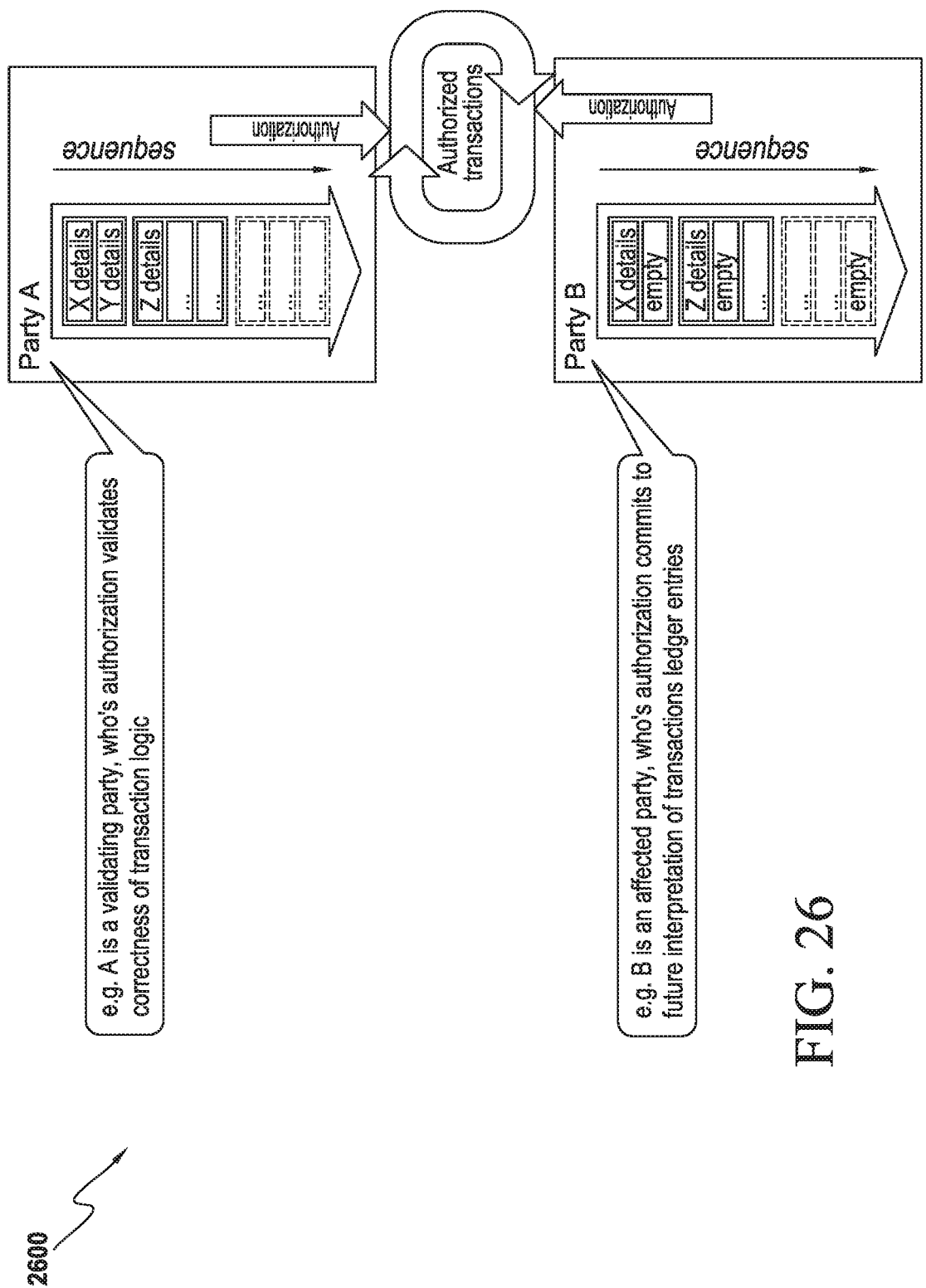
FIG. 26 is a hybrid diagram showing a DAML-based ledger including multi-party authorization of commitment of new ledger entry transactions in accordance with an exemplary embodiment of the present disclosure.

As shown in FIG. 26 an exemplary DAML-based ledger including multi-party authorization of commitment of new ledger entry transactions is indicated generally by the reference numeral 2600. Here, authorization is provided by the validating an affected party. Authorization from one or more validating party may guarantee that all new ledger entries committed to the ledger meet proper and previously agreed upon ledger logic. Authorization from the affected parties may be to commit to agree to future business variants and scenarios defined within ledger entries. That is, one or more parties consents to immediate and possible future ledger execution impacts of the proposed DAML-based ledger transaction. Likewise, one or more partiesies consents to immediate and possible future impact on cross-party relations of the proposed DAML-based ledger transaction. The current exemplary embodiment of the DAML™ ledger has one or more parties consenting to DAML™ ledger execution logic, and has one or more parties consenting to changes to legal rights and obligations between two or more parties following the interpretation of the proposed DAML™ ledger transaction within the context of previously agreed external legal agreements. Alternate embodiments of the DAML™ ledger may have the authorization certified by legal authorities to allow a DAML™ ledger transaction to define legally binding relations between two or more parties without the necessity to work within a previously external agreement framework. Alternate embodiments of the DAML™ ledger may have the authorization certified by multiple legal authorities to allow a DAML™ ledger transaction to define legally binding relations between two or more parties across two or more legal jurisdictions. The current exemplary embodiment of the DAML™ ledger has one or more parties validating the correctness of the DAML™ ledger execution logic.

Figure 27:
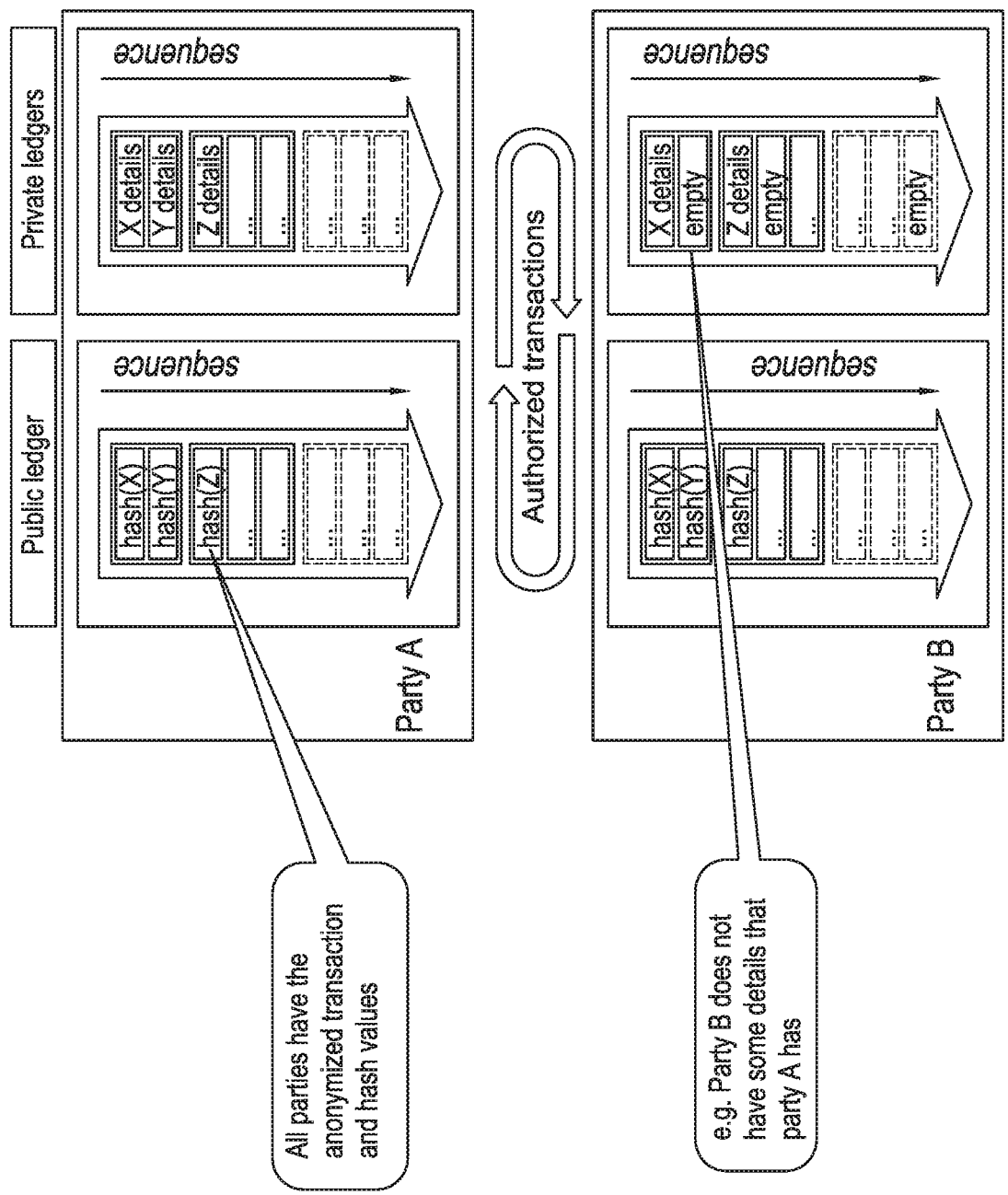
FIG. 27 is a hybrid diagram showing a DAML-based two-tiered ledger including hash versus entry and details in accordance with an exemplary embodiment of the present disclosure.

As shown in FIG. 27, an exemplary DAML-based two-tiered ledger including hash versus entry and details is indicated generally by the reference numeral 2700. Here, all parties have the anonymized transactions and hash values, but party B does not have some details that party A has. The hash keys are tied to ledger entries. A hash is associated with each ledger entry, but the hashes do not reveal ledger entry details. Hashes help to provide proof of ledger entry details without revealing them. A two-tiered ledger includes a ledger or log of hash data, and a ledger of ledger entries. Both ledger tiers include a transaction structure and/or an optional block structure.

Figure 28:
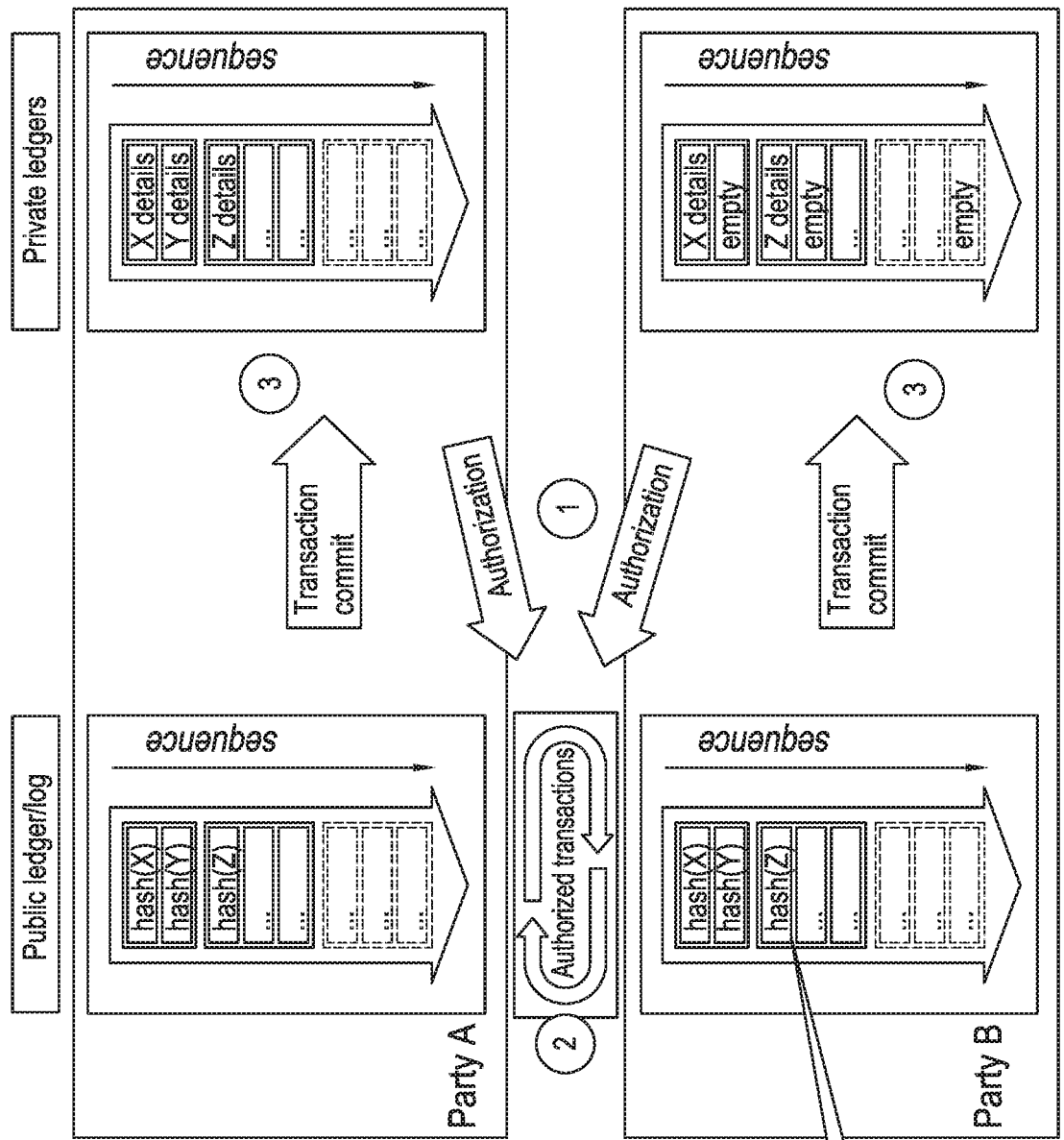
FIG. 28 is a hybrid diagram showing a DAML-based hash-centric public ledger tier or public log in accordance with an exemplary embodiment of the present disclosure.

As shown in FIG. 28, an exemplary DAML-based hash centric public ledger tier or public log is indicated generally by the reference numeral 2800. Here, the public ledge provides provably authorized references. This public ledger is a ledger of "hashes" that hides ledger entry data. The hash of each ledger entry is the anonymized reference to that ledger entry. This provides the transaction commitment status, where the parties authorize the transaction based on their private ledger, but the transaction commit is in the public ledger. The private ledger commit depends on the public ledger commit. This particular embodiment implements only hashes, and has no finite life cycle nor cross-entry dependencies. That is, the public ledger is a log where the entries are hash values associated with detailed ledger entries stored in private ledgers, and the public ledger entries are anonymized references to the detailed private entries. A ledger transaction commitment is authorized by one or more parties within the public ledger, and this public ledger commitment status determines the commitment status of the transactions of the private ledger. The current exemplary embodiment of the DAML™ ledger does not include any life cycle of its entries (the hash values), nor cross-entry dependencies, and can therefore be seen as a log. Alternate embodiments of the DAML™ ledger may include additional logic, such as homomorphic encryption of certain ledger details, and implement further ledger logic.

Figure 29:
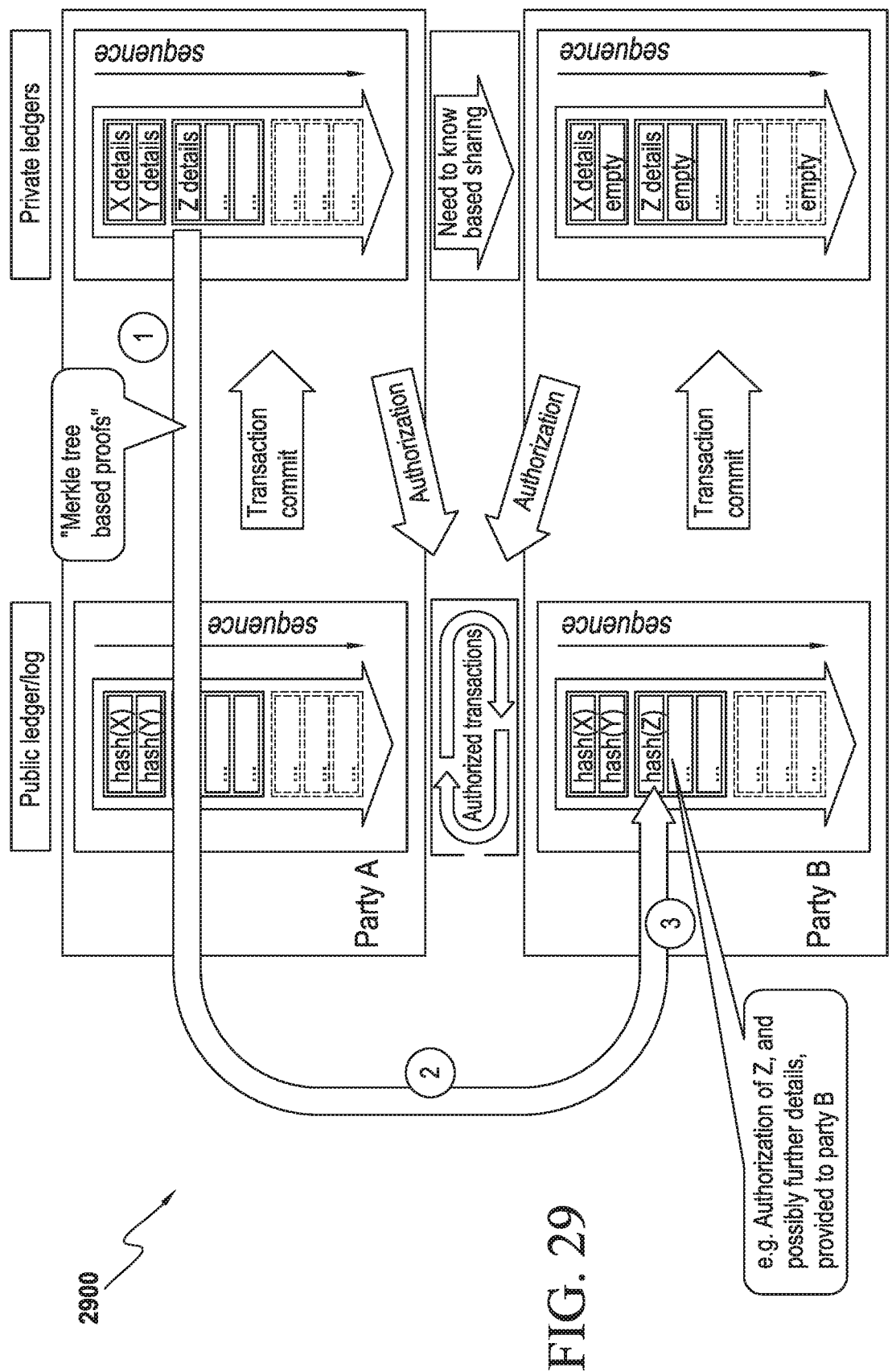
FIG. 29 is a hybrid diagram showing a DAML-based private and sharable private ledger in accordance with an exemplary embodiment of the present disclosure.

As shown in FIG. 29, an exemplary DAML-based private and sharable private ledger tier is indicated generally by the reference numeral 2900. Here, the private ledger includes an authorized private and sharable private ledger. The ledger entry data may be shared on a "need to know basis." Privacy is maintained since parties do not receive, nor see, nor store ledger entries to which they are not "participants". The private and public ledgers are linked through a hash of ledger entries. Authorization and transaction commitment apply to both, including "Merkle tree based proofs" on Merkle trees that are built and shared by a party (e.g. validating party), securely distributed, and encrypted; where the need to know basis may be used by a party with a partial view of the private ledger.

The private ledger provides certifications or "proofs of correctness" of properties associable to the public ledger to other parties on a need-to-know basis based on the relation of the requesting party to the requested private ledger properties. The current exemplary embodiment of the certification and proof scheme of public ledger entries through private data properties is based on a Merkle signature scheme. Alternative embodiments of the certification and proof scheme are possible, for example based on PKI and a proof carrying scheme.

Figure 30:
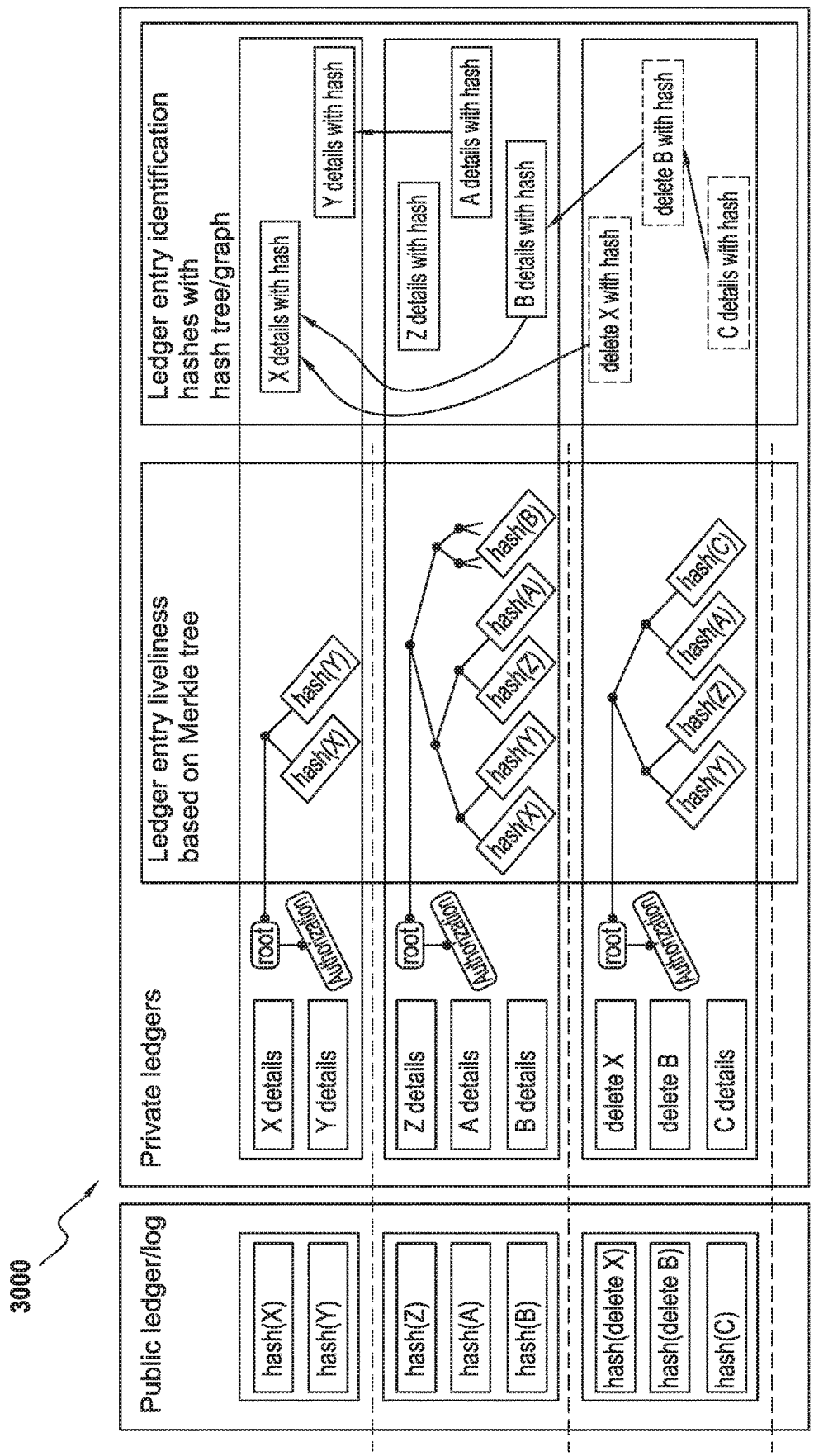
FIG. 30 is a hybrid diagram showing a two tier DAML™ ledger with associated ledger entry identification and ledger entry liveliness tracking in accordance with an exemplary embodiment of the present disclosure.

As shown in FIG. 30, an exemplary two tier DAML™ ledger with associated ledger entry identification and ledger entry liveliness tracking is indicated generally by the reference numeral 3000. The current exemplary embodiment of these two ledger entry properties are built upon the hash structures that reside within the private ledger tier, where the hash tree/graph is used to associate unique and relevant cryptographic hash values with ledger entries while capturing the acyclic dependency between the DAML™ (and possible non-DAML) based private ledger entries, while incrementally updating a Merkle tree structure is used to track the liveliness (active versus inactive status) of each ledger entry. Alternative embodiments of the ledger entry identification and ledger entry liveliness tracking may target scalability by addressing the non-uniform nature of ledger entry data via capturing properties of the physical partitioning model within the hash value assignment logic and within the liveliness tracking structure.

Figure 31:
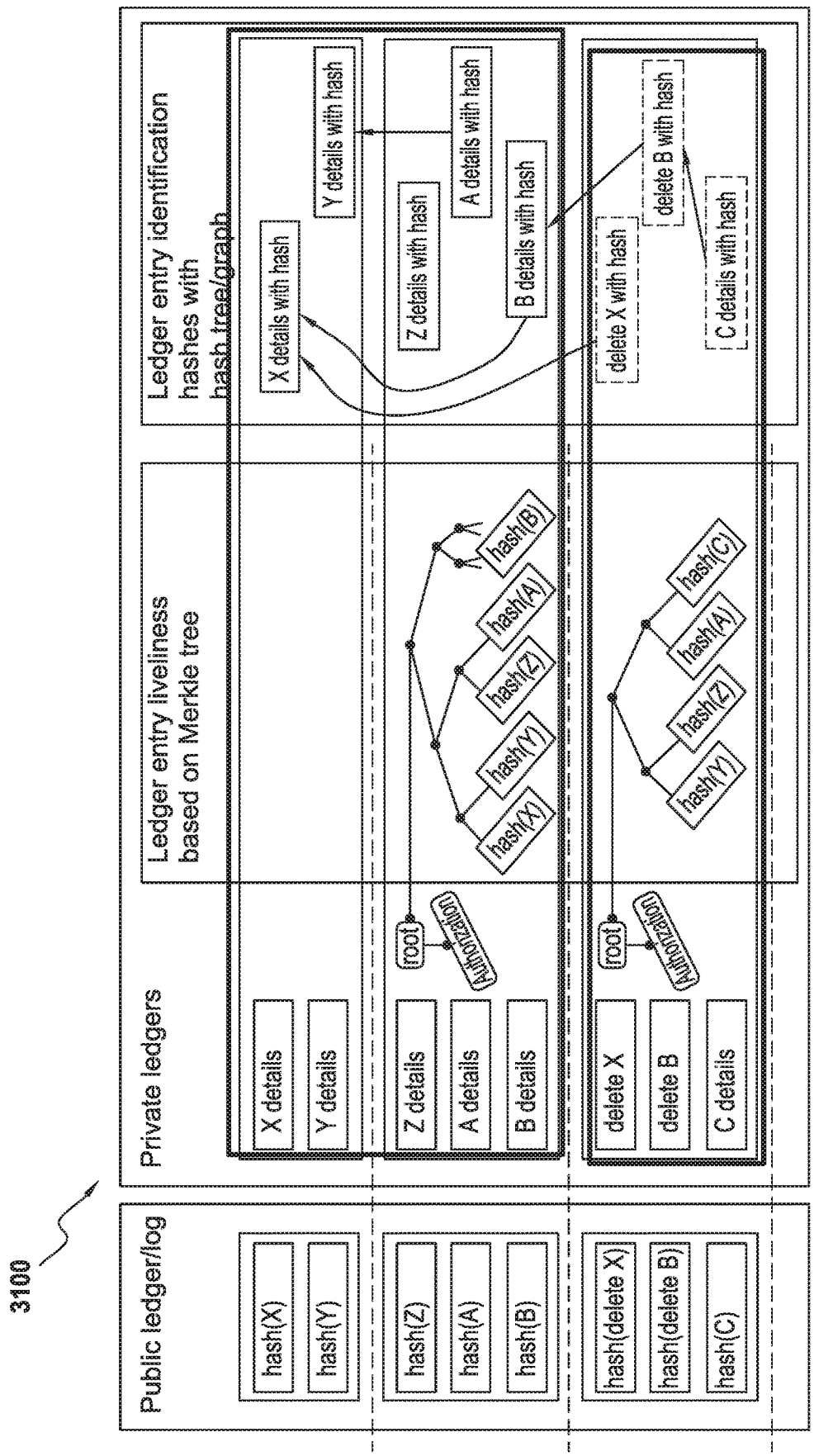
FIG. 31 is a hybrid diagram showing a two tier DAML™ ledger with block-oriented logic, and with associated ledger entry identification and block-centric liveliness tracking in accordance with an exemplary embodiment of the present disclosure.

As shown in FIG. 31, an exemplary two tier DAML™ ledger with block-oriented logic, and with associated ledger entry identification and block-centric liveliness tracking is indicated generally by the reference numeral 3100. The current exemplary embodiment to track ledger entry liveliness is to regroup ledger transactions as blocks of multiple transactions, and incrementally update the private ledger Merkle tree with each new block of transactions. Alternative embodiments of block-oriented ledger entry liveliness tracking may target scalability by addressing the non-uniform nature of ledger entry data via capturing properties of the physical partitioning model within the hash value assignment logic and within the block-oriented liveliness tracking structure.

Figure 32:
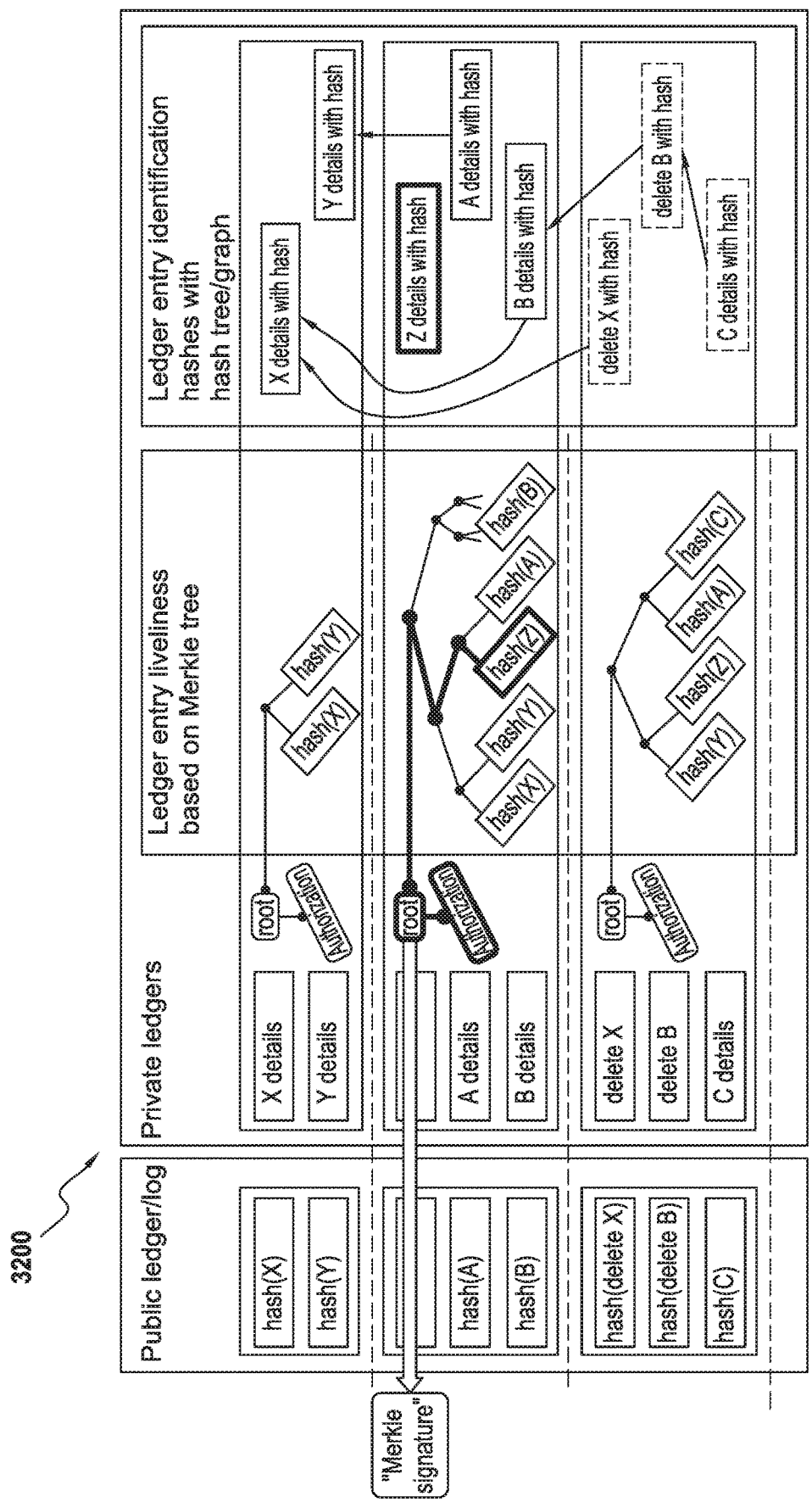
FIG. 32 is a hybrid diagram showing party to party sharing of certification or provable properties of private ledger entry properties in accordance with an exemplary embodiment of the present disclosure.

As shown in FIG. 32, an exemplary party to party sharing of certification or provable properties of private ledger entry properties is indicated generally by the reference numeral 3200. The current exemplary embodiment to share certification or provable properties of private ledger entry properties is to provide on a need to know basis Merkle signature scheme based certification of specific ledger entries, optionally supported by partial deeper private ledger data tied to the ledger entry hash value. Here, authorization of ledger liveliness is based on a "Merkle signature."

Figure 33:
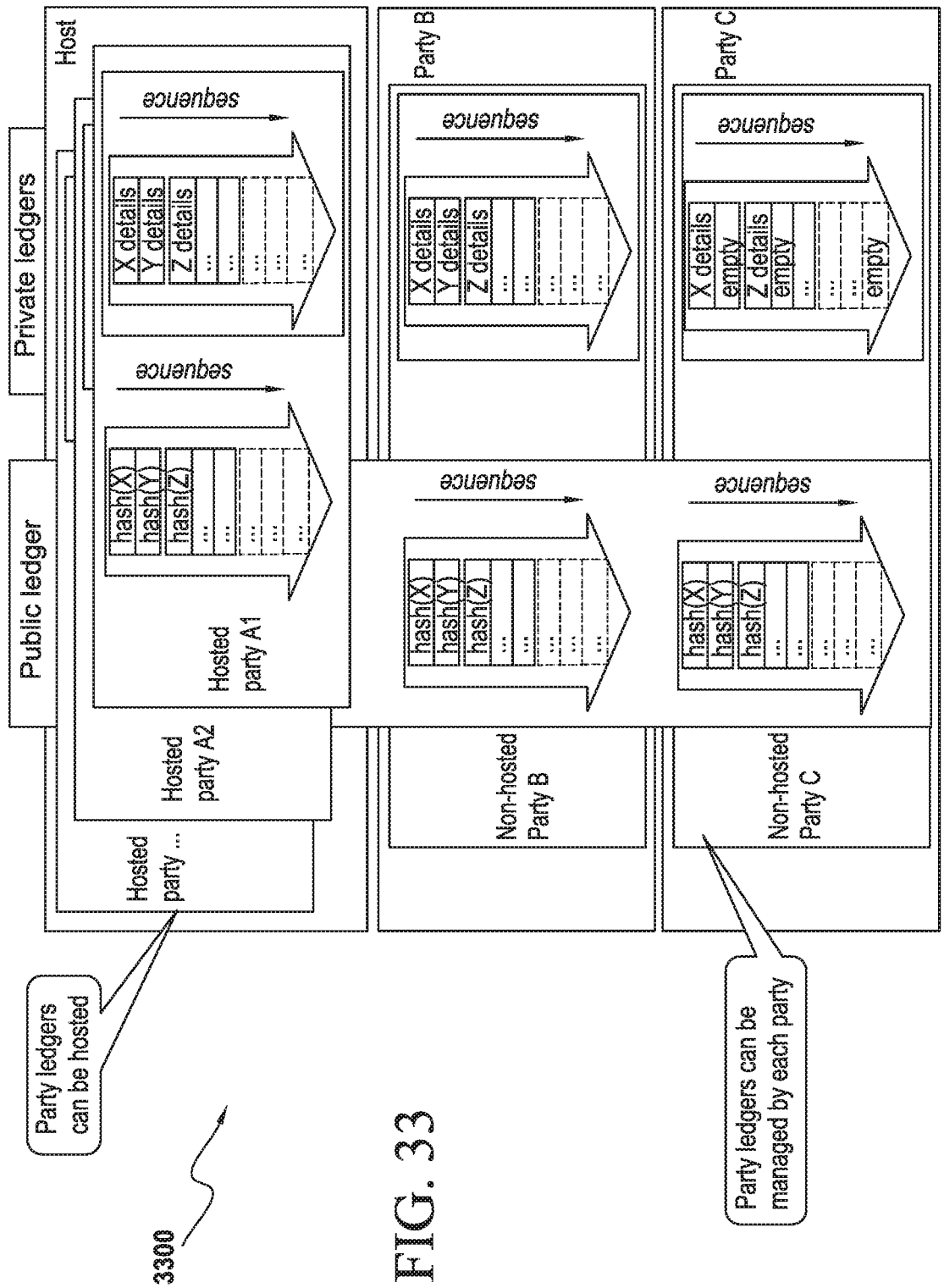
FIG. 33 is a hybrid diagram showing hosted and non-hosted copies of a distributed ledger in accordance with an exemplary embodiment of the present disclosure.

Turning to FIG. 33, hosted and non-hosted copies of a distributed ledger are indicated generally by the reference numeral 3300. Here, public versions are in the left column and private versions are in the right column. Hosted copies of both the public and private versions are in the top row for parties A1, A2, etc., while non-hosted copies are in the bottom two rows for party B and party C, respectively. That is, party ledgers may be hosted, or they may be managed by the respective parties.

Figure 34:
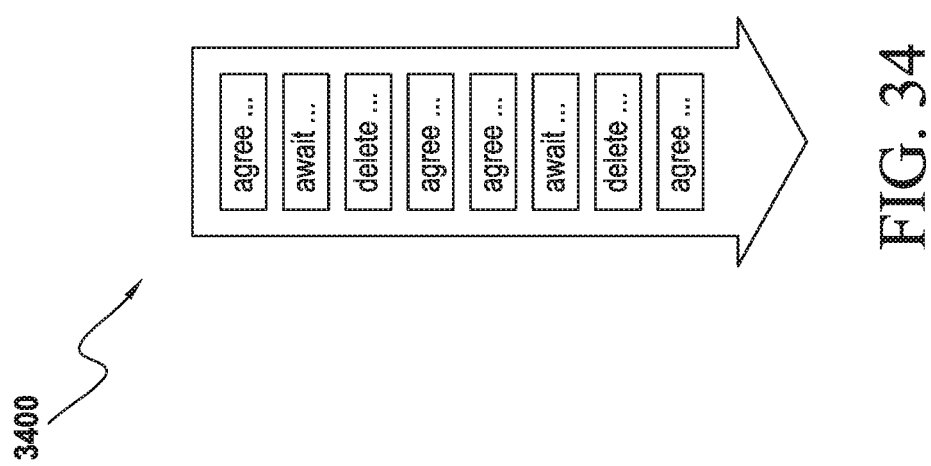
FIG. 34 is a hybrid diagram showing DAML™ ledger entry types for Agree, Await, and Delete commands in accordance with an exemplary embodiment of the present disclosure.

Turning now to FIG. 34, exemplary DAML™ ledger entry types for Agree, Await, and Delete commands are indicated generally by the reference numeral 3400. There are the three main types of DAML™ ledger entries. Here, Agree generally means that one or more parties agree on a real world change, or a real world promise among specified parties. Await generally means that execution awaits a permit or promise later or in the future of a "predefined" change to the ledger. Delete generally means that a previously entered active model is inactivated (such as deactivate/annihilate/invalidate). Ledger entries may also include native cryptographic assets defined by the supporting ledger. These are separate ledger entries which can be both referenced and created by DAML™ ledger entries of type await (see FIG. 14). In operation, an Await may act as an offer, while a Chooses and/or Agree may act as an acceptance.

Figure 35:
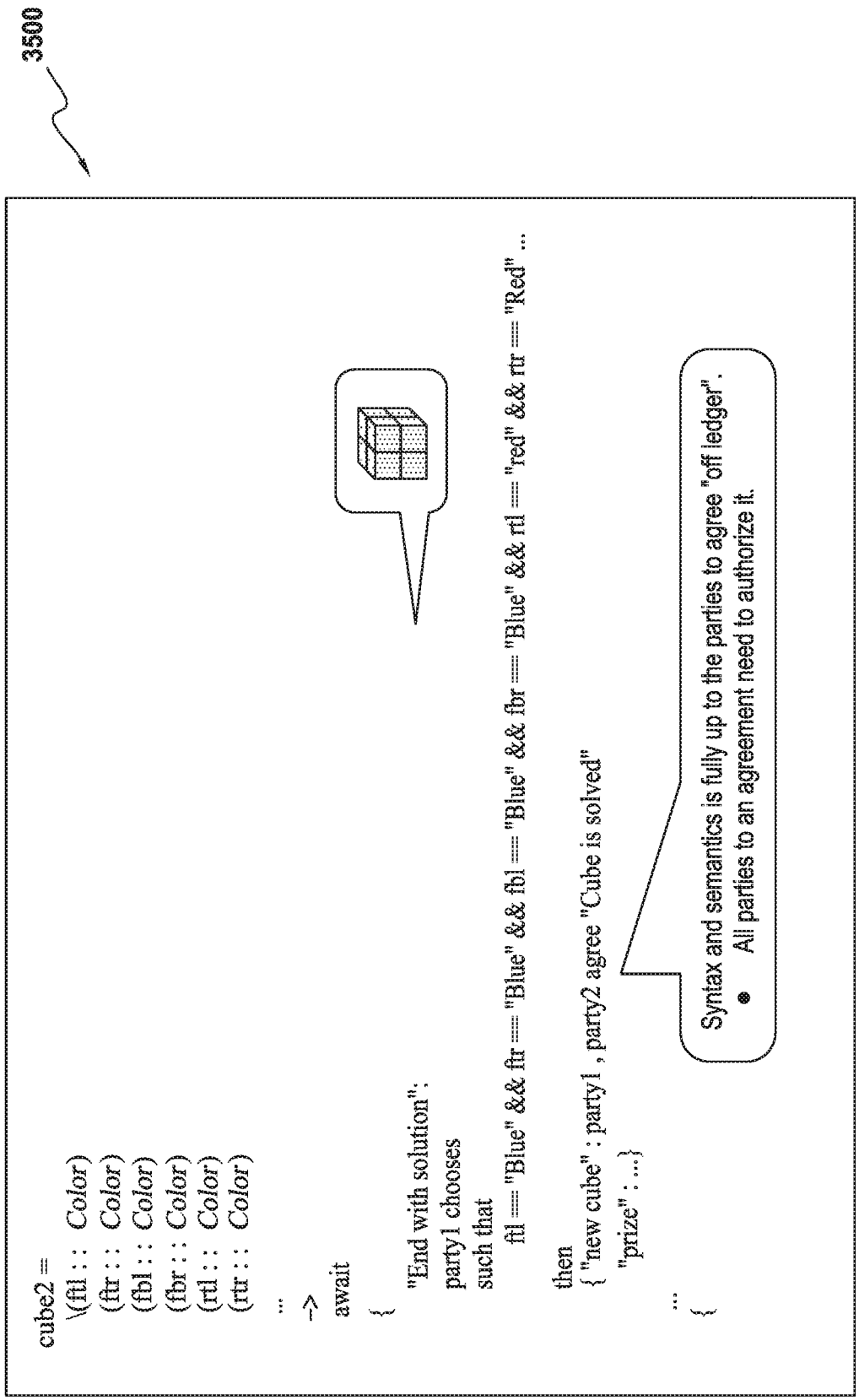
FIG. 35 is a hybrid diagram showing usage of the DAML™ Agree command in accordance with an exemplary embodiment of the present disclosure.

As shown in FIG. 35, exemplary usage of the DAML™ Agree command is indicated generally by the reference numeral 3500. Here, the syntax and semantics are fully up to the parties to agree "off ledger", but all parties to an agreement need to authorize it. In greater detail, Agree means that one or more parties agree on a real world change. The syntax, etc. is fully up to the parties to agree "off ledger". All parties to an agreement need to authorize it. Under some circumstances, such agreement or active model may embody a legal court-enforceable contract if the authorization had legal standing and other lawful requirements were met. For example, a master contract may be used to give such an agreement legal status. Otherwise, master contracts may impart other features to agreements. An agreement or active model history cannot actually be deleted, yet an agreement may supersede a previous one and thereby inactivate the previous one. Thus, the function Delete makes a model inactive, but need not remove its history. "Ledger logic" does not automatically know the scope of real world effects.

Figure 36:
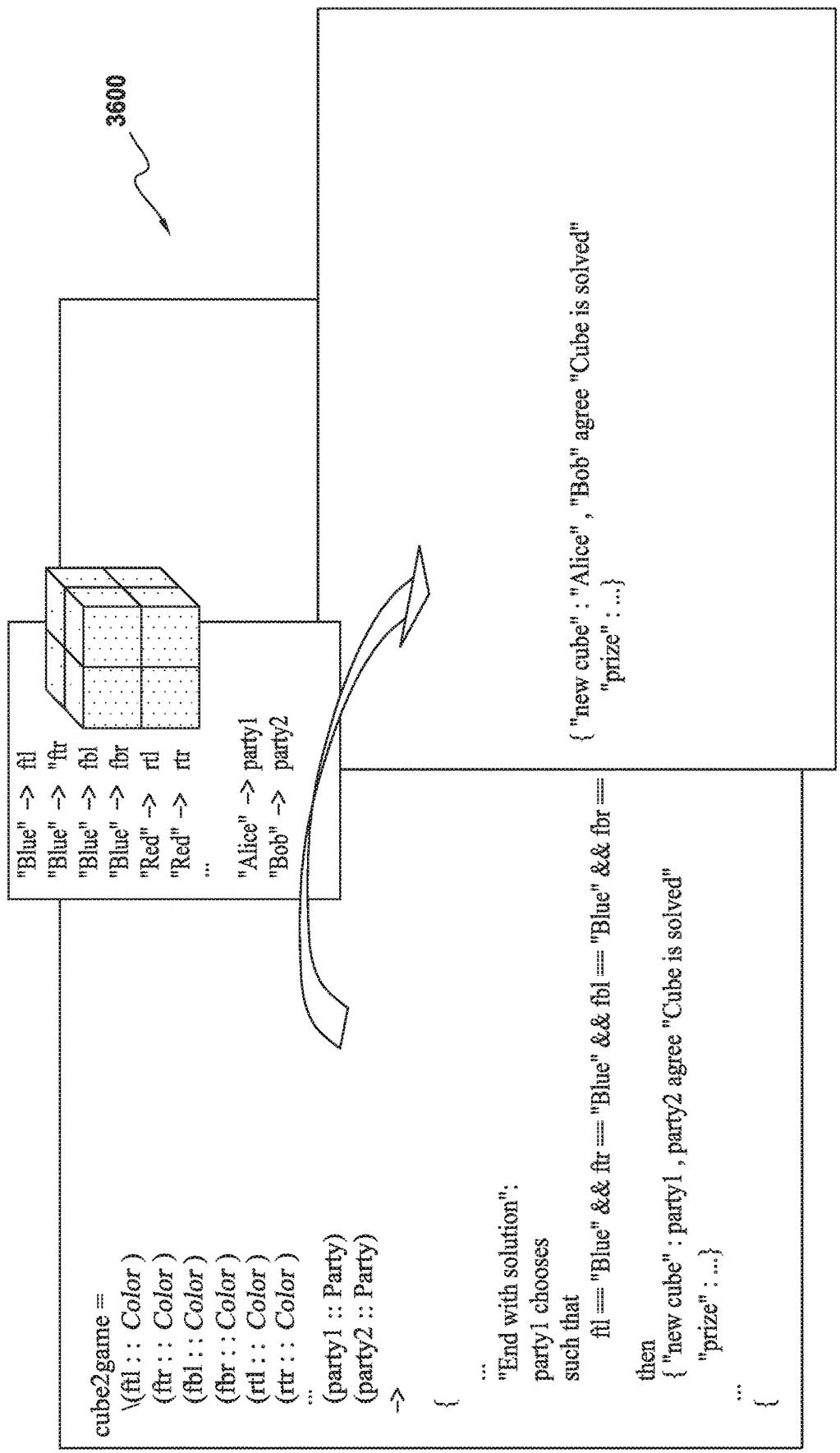
FIG. 36 is a hybrid diagram showing ledger entries that are instantiated in accordance with an exemplary embodiment of the present disclosure.

Turning to FIG. 36, ledger entries are "instantiated" entries indicated generally by the reference numeral 3600. Here, the code in the left column represents a non-instantiated model template for a cube, the middle column represents data values to be instantiated into the template, and the right column represents an instantiated active model including the data values.

Turning now to FIG. 37, exemplary DAML™ code of an agreement for external notification within an equity model, where the parties agree that they are making and receiving notification of an event in the format for that event, is indicated generally by the reference numeral 3700. In alternate embodiments, agreement may be used in many other DAML™ applications.

Figure 38:
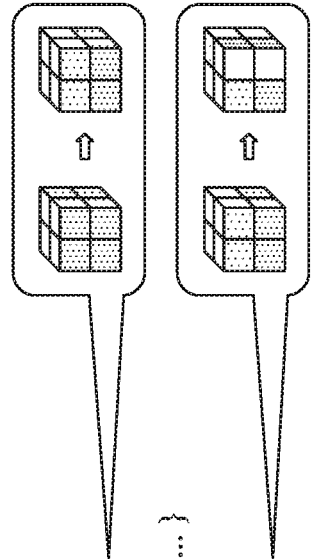
FIG. 38 is a hybrid diagram showing DAML™ code using the Await command within a cube model in accordance with an exemplary embodiment of the present disclosure.

As shown in FIG. 38, exemplary DAML™ code using the Await command within a cube model is indicated generally by the reference numeral 3800. Here, Await waits for a permit or promise of a later/future "predefined and pre-authorized" change to the ledger. These are the logic "choices" that are offered by an await entry. Each choice produces a new "cube" or active model while consuming an older one making that an inactive model. In this example, the definition of the cube2 model is also its validation ruleset.

Figure 39:
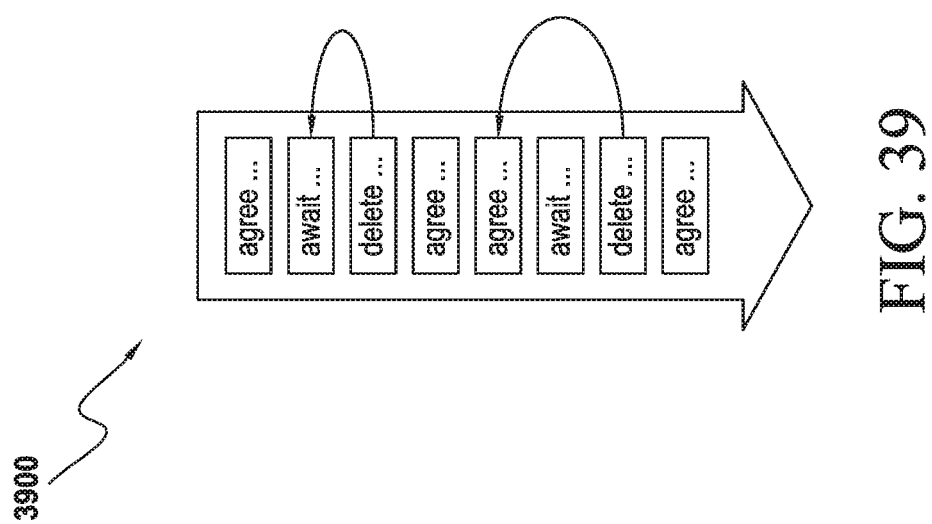
FIG. 39 is a hybrid diagram showing a DAML™ ledger with delete commands in accordance with an exemplary embodiment of the present disclosure.

Turning to FIG. 39, a DAML™ ledger with delete commands is indicated generally by the reference numeral 3900. The delete command is used to transform an active model into an inactive model such as by applying deactivate/annihilate/invalidate to any previous active entry. Here, the earlier (upper) delete references an await, while the later (lower) delete references an agree.

A bundle or block of transactions is executed as a single step, all or nothing, including the following three parts.

1. Transactions within a bundle are created, defined or derived to contain:
   a. A set of one or more of:
      i. Deactivation of previous ledger entries;
      ii. Transient entries that are created and deactivated within the same transaction; and/or
      iii. Creation of new ledger entries.
   b. For each entry:
      i. Which parties need to authorize it (affected parties);
      ii. Which parties see this entry (to which party is the entry visible); and/or
      iii. Justification/proof of reasoning for b(i) and b(ii) as needed to support the soundness of each party's validation checking.
2. Get authorization from affected parties for content.
3. Commit transaction to ledger with authorizations.

In the first part, a transaction and/or ledger entry may be proposed and/or created by a single party, or jointly proposed and/or created by multiple parties. A transaction may be communicated as a data-centric set of transaction entries, or as a DAML™ script that generates transaction entries with optional supporting salt codes. Each transaction entry can be independent of the past and unrelated to previous ledger entries, or it can be dependent on one or more previous ledger entries. Proposing parties provide the basis of the validation of their proposed ledger transaction if this was not previously visible to affected parties. For example, entries having no dependency on the past do not require reference to prior entries for justification.

Figure 40:
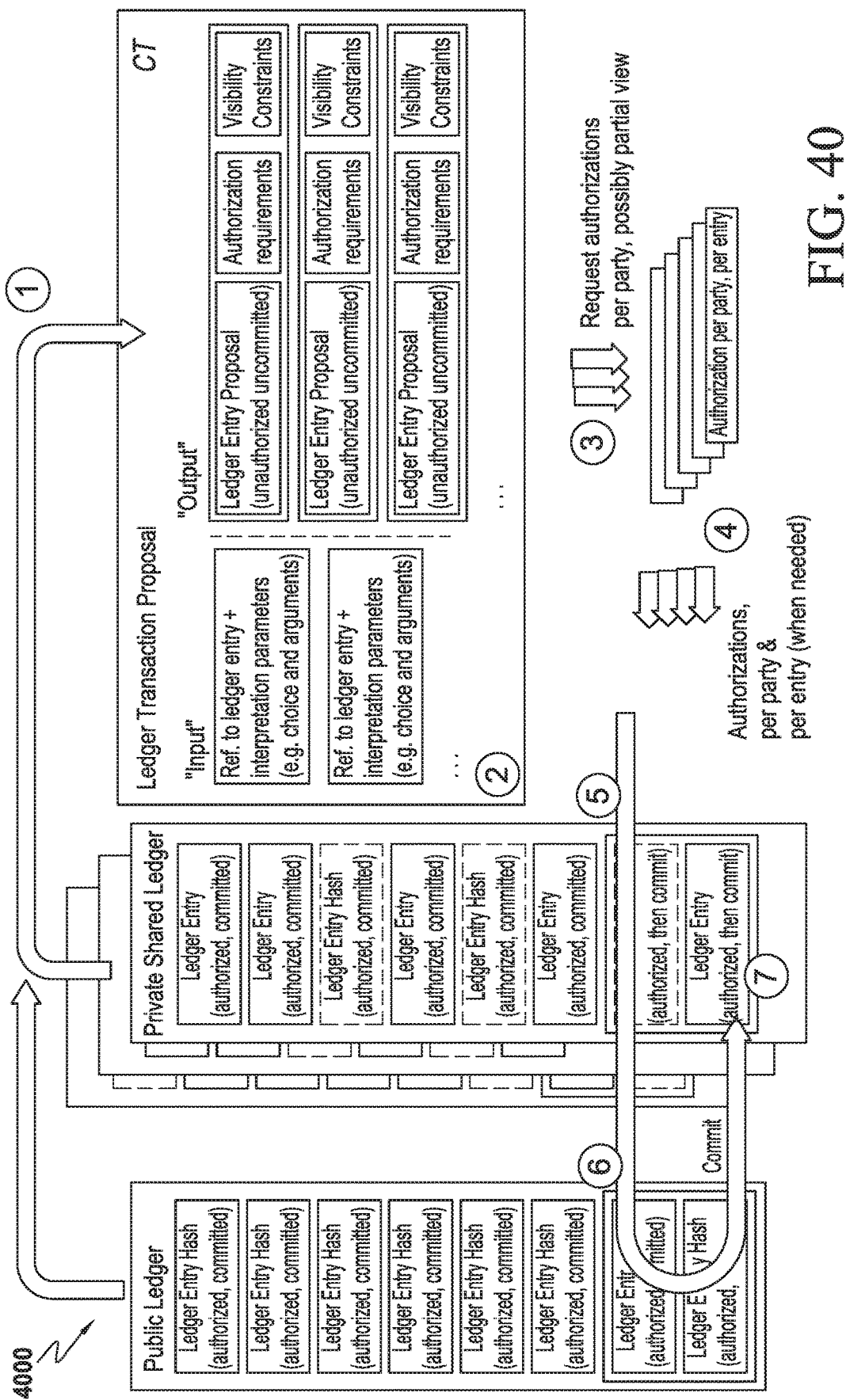
FIG. 40 is a hybrid diagram showing a ledger algorithm with role-centric flows in accordance with an exemplary embodiment of the present disclosure.
Figure 41:
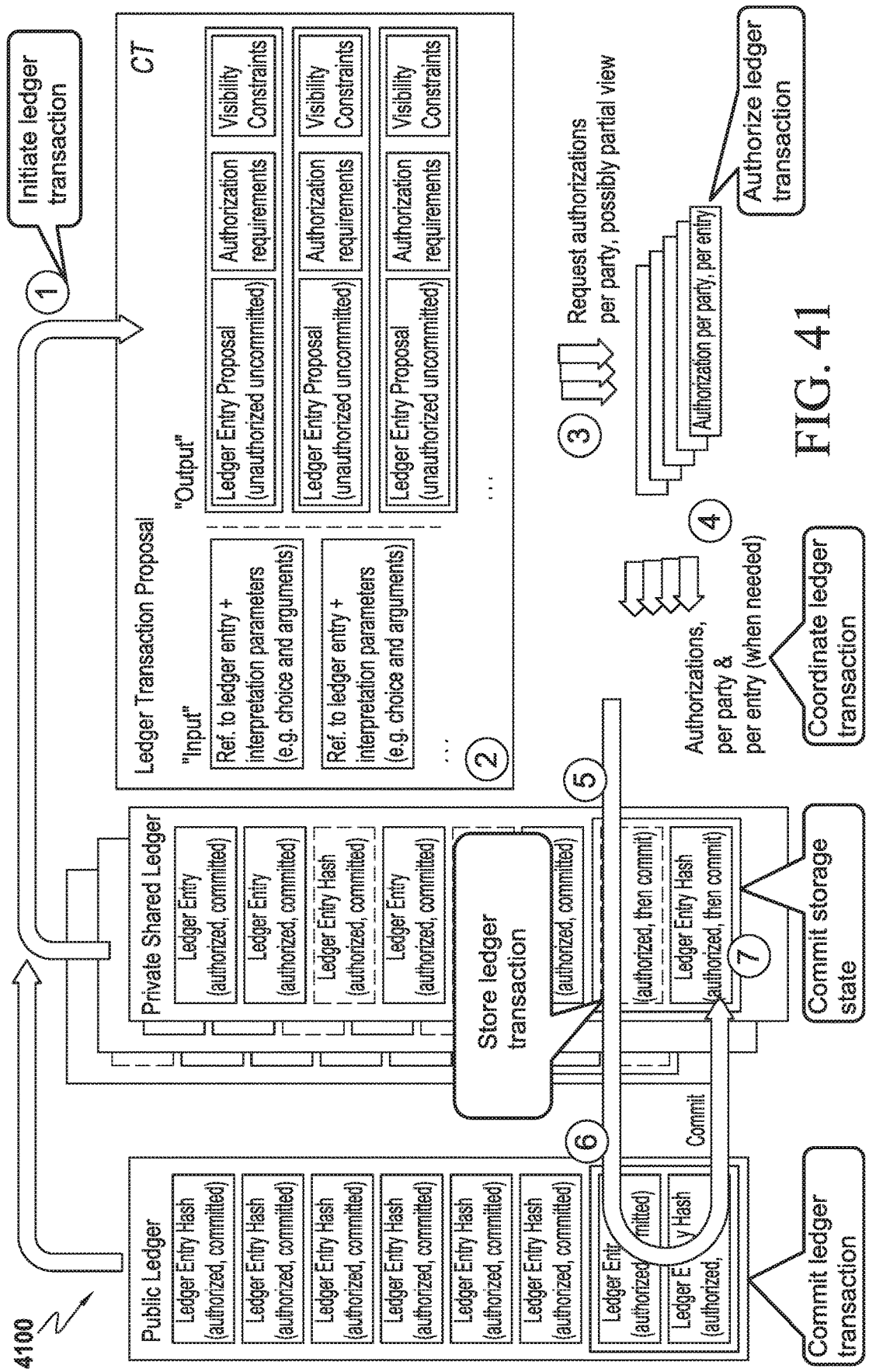
FIG. 41 is a hybrid diagram showing a ledger algorithm with role-centric flows and comments in accordance with an exemplary embodiment of the present disclosure.

Turning now to FIGS. 40 and 41, a ledger algorithm with role-centric flows is indicated generally by the reference numerals 4000 and 4100. The ledger algorithm is distributed and repeats the following operational steps, in sequence or optionally in parallel.

At step and/or node 1, a ledger transaction is initiated. The ledger transaction proposal is created, or optionally derived from interpreting existing ledger entries. A party creates a "ledger entry update" that specifies the expected transaction. Optionally, more than one party can agree together on creating a ledger entry update. The impact on the ledger caused by the ledger entry update, which may also be referred to as the "Core Transaction", is computed by the party's DAML™ engine system.

At step and/or node 2, the proposed transaction may include outputs, inputs, authorizations, and proofs/justification. The outputs may include a set of one or more new ledger entries. There may be any number of types of ledger entries, but the principal ones are destruction of ledger entries (DAML™ delete), and creation of new ledger entries such as DAML™ agreements or DAML™ awaits with choice logic. The inputs may include a set of zero or more references to existing active ledger entries. For each transaction ledger entry, authorization information may include which parties need to authorize it within this transactions (affected or validating parties), which parties see this entry (to which party is the entry visible), optionally which parties are needed to authorize the derived action, and supporting Merkle signatures tied to ledger entries needed to justify the transaction.

At step and/or node 3, the ledger transaction is authorized. Here, requests for authorization are created and sent to concerned parties. The requests are created and only sent to parties from whom authorization is needed, and each request contains a copy of transaction ledger entries, excluding those for which the party has no visibility.

At step and/or node 4, the ledger transaction is coordinated. Digital signatures from the authorization parties are provided. These are generated per ledger transaction or per Merkle signature tied to ledger entries within a Merkle tree of the ledger transaction or possibly within the Merkle tree of a block of transactions. Each party checks correctness of the transaction, ledger entries and visible Merkle tree hashes before providing their authorization.

At step and/or node 5, the ledger transaction is stored. Each party involved in transactions stores new ledger entries in the private tier of their ledger, but without yet committing these to private storage.

At step and/or node 6, the ledger transaction is committed. The shared public tier of the ledger with a distributed consensus algorithm (e.g., HyperLedger) stores and commits the new transaction with its Merkle tree hashes and authorizations but without transaction entry details.

At step and/or node 7, the ledger transaction is committed to private tier of the ledger storage. Each party involved in a new transaction can commit its previously stored transaction entry details in the public tier of the ledger.

The current exemplary embodiment of the DAML™ ledger has a dedicated party that validates each new DAML™ ledger entry transaction proposal (e.g., an exchange entity). The current exemplary embodiment of the DAML™ ledger has a new DAML™ ledger entry transaction being proposed by one party and has the proposing party and an additional dedicated party consenting to the impact of the new transaction on the ledger and on relations with other parties. Multi-party consent is done by successive entry of DAML™ ledger transactions by different parties in such a manner as to build DAML™ logic combining the multiple parties' consents. Alternate embodiments of the DAML™ ledger can allow any number of parties to consent to the impact of a new DAML™ transaction on the ledger and on relations with other parties.

Figure 42:
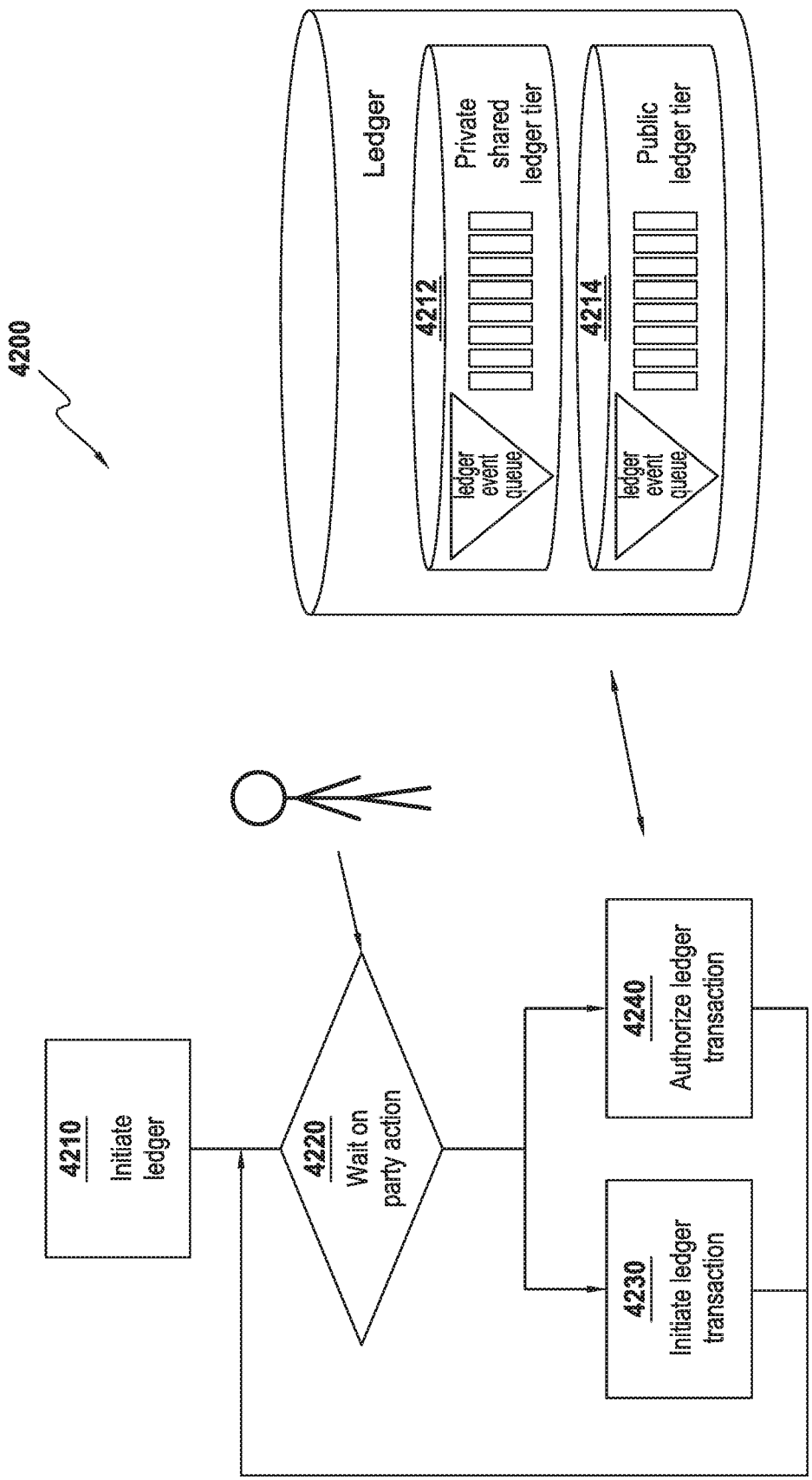
FIG. 42 is a hybrid diagram showing a party-centric ledger algorithm flow in accordance with an exemplary embodiment of the present disclosure.

Turning to FIG. 42, a party-centric ledger algorithm flow is indicated generally by the reference numeral 4200. Here, function block 4210 initiates the ledger, including a private shared tier 4212 of the ledger and a public tier 4214 of the ledger, and passes control to decision block 4220. Decision block 4220 waits for party action, and then passes control to function blocks 4230 and/or 4240. Function block 4230 initiates a ledger transaction on the private shared ledger 4212, and passes control back to the decision block 4220 to await further party action. Function block 4240 authorizes the ledger transaction on the public ledger 4214, and passes control back to the decision block 4220 to await further party action.

Figure 43:
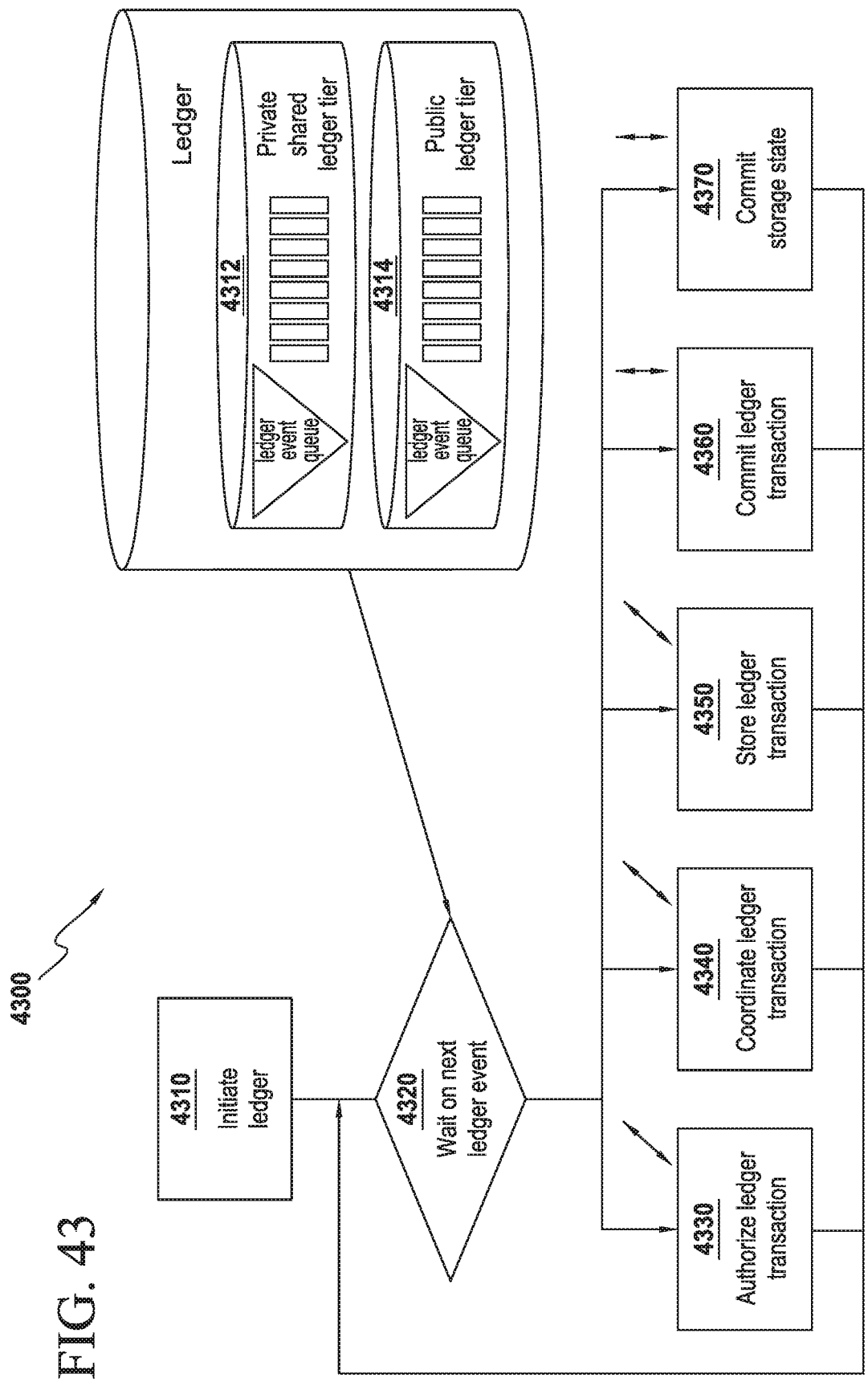
FIG. 43 is a hybrid diagram showing a ledger-centric ledger algorithm in accordance with an exemplary embodiment of the present disclosure.

Turning now to FIG. 43, a ledger-centric ledger algorithm is indicated generally by the reference numeral 4300. Here, function block 4310 initiates the ledger, including a private shared tier 4312 of the ledger and a public tier 4314 of the ledger, and passes control to a decision block 4320. The decision block 4320 passes control to one or more of function blocks 4330, 4340, 4350, 4360, and/or 4370 based on the ledger event, which each implement their particular function and pass control back to the decision block 4320 to await the next ledger event. Here, the function block 4330 authorizes the ledger transaction; the function block 4340 coordinates the ledger transaction; the function block 4350 stores the ledger in the private shared ledger 4312; the function block 4360 commits the ledger transaction to the public tier 4314 of parties ledger; and/or the function block 4370 commits the storage state to the private tier of the parties ledger.

Figure 44:
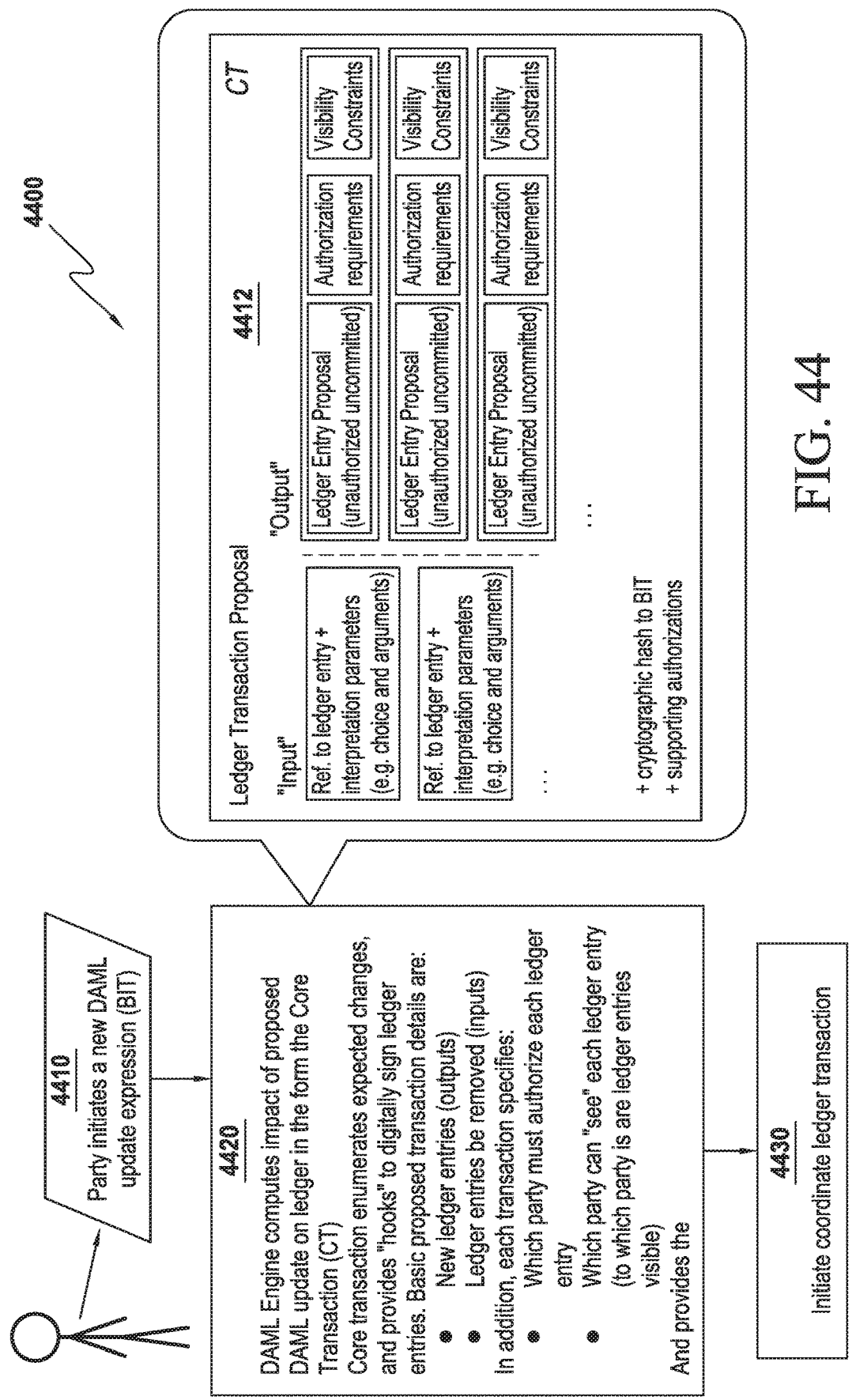
FIG. 44 is a hybrid diagram showing a function to initiate a ledger transaction in accordance with an exemplary embodiment of the present disclosure.

As shown in FIG. 44, an exemplary function to initiate a ledger transaction is indicated generally by the reference numeral 4400. At input block 4410, a party initiates a new DAML™ update expression based on a business intent message (BIT), and passes control to a function block 4420. The function block 4420 uses the DAML™ engine to compute the impact of the proposed DAML™ update on the ledger in the form of a core transaction (CT) 4412, and passes control to a function block 4430. The function block 4430 initiates and coordinates the core transaction on the ledger. The core transaction 4412 enumerates expected changes, and provides hooks to digitally sign ledger entries. The basic proposed transaction details may include new ledger entries (outputs that will become active models), and ledger entries to be removed (inputs that will become inactive models). In addition, each transaction specifies which party must authorize each ledger entry, and which party can "see" each ledger entry (to which party are the ledger entries visible), as well as justification in the form of a cryptographic hash of the BIT, and supporting Merkle proofs.

A DAML™ engine may further include a DAML™ simulator that provides the ability to observe and interact with DAML™ Modeling activities. DAML™ is a new type of contract specification language (CSL). Users may inspect the developed DAML™ code by running the scenarios and observing how the DAML™ models are used to progress in a scenario. They may use this visibility to observe how their input is absorbed into the DAML-based ledger, for example.

The DAML™ simulator may be deployed together with the DAML™ engine onto a host accessible to the user. The DAML™ simulator may be deployed as a binary, with the DAML™ Modeling code as source code. This source code may be visible in the simulator. Thus, a user may view the Modeling of their business processes within DAML, but may not modify this installation. The DAML™ simulator includes a User Interface (UI) portion. Access to the UI may be limited via HTTP, HTTPS, or the like.

In operation, the DAML-based ledger properties assure process continuity between successive ledger operations. They are defined as fixed, and pre-agreed upon among the parties, but they can also be managed incrementally. In the current exemplary embodiment they are implemented with a "ledger of core primitives", and is then evolved as with a version management by one or more key parties (e.g., an exchange entity), allowing backwards compatibility of ledger semantics. Although variable semantics are contemplated, exemplary embodiments use fixed semantics for existing ledger entries because new versions of these rules might impose on parties the onus to migrate ledger entries from a previous version to a new version. New version function semantics can be introduced for future ledger entries as long as they maintain existing semantics of older ledger entries. Such new version functions may be tracked by version or date, for example. Note, however, that exemplary embodiments may depend on external legal agreements that may be subject to change, and should therefore be tracked by revision date.

Parties agree on ledger entries and their representation as data. Ledger entries define what parties can agree through the media of the ledger. These are defined with lexical, grammar, binary, and other representations. Exemplary embodiments of DAML™ may use agree, await, delete, transfer and other HyperLedger™-compatible digital asset ledger primitives. Semantics of previous and future ledger entry interpretation, and real world agreements. Ledger entry interpretation semantics define a deterministic way to algorithmically interpret or evaluate a ledger entry. Semantics of a ledger entry may affect previous and future ledger entries.

In DAML, the "delete" entry invalidates or deactivates previous ledger entries in DAML, but the auditable history remains. Interpretation of the execution of an "await choice" provides the "rights" to delete the "chosen await entry", and the right to create zero or more new ledger entries that meet the constraints supporting a ledger entry update.

In agreements, semantics of ledger entry may affect future ledger entries. In DAML, an "await" ledger entry authorizes a later "choice" to create ledger entries that match given properties. Future interpretation may depend on future ledger entry data. In DAML, await choice selection configurations may include templates that optionally depend upon zero or more parameters to be provided in one or more future ledger entries.

The semantics of a ledger entry may affect the physical world. In DAML, an "agree" ledger entry ties multiple parties to a "real world" agreement. Semantics of ledger entry update declaration define a deterministic way to algorithmically create new ledger entries from a ledger entry update declaration. In DAML, an update statement and generalized follow-up have such semantics.

Authorization rules may be used in an algorithm that computes which parties need to agree to the creation of a new ledger entry. These take into account effects of a ledger entry being derived from the interpretation of one or more existing ledger entries, or whether the ledger entry is created independently of the past. This takes into account that continuity in the face of secrecy" can be assured by designating trusted parties as validating authorization parties and the use of Merkle signatures on Merkle trees of active ledger entries.

Semantics of validating parties are enforced. Ledger entry interpretation semantics can define validating parties with the purpose of assuring "no double trade" by assuring that the correctness of ledger logic and the "continuity" of the Merkle tree based logic. A central concept is that validating parties may be defined within DAML. In an exemplary embodiment, that also means that if party were to become a validating party, while not having been previously, and if this party were not to have enough ledger details to assure validation, it would need to be receiving the additional ledger details from another party, and be able to show the consistency of its new view on the ledger within the instituted secrecy rule, or it would not be permitted to authorize the proposed transaction.

Semantics and rules of secrecy are used in an algorithm that computes which parties may see a new ledger entry. This takes into account authorization needs of ledger entry. Moreover, salt and Merkle tree implementation rules define a deterministic way to compute one or more hash keys of a ledger entry or of a ledger entry update. These rules will produce the same hash given the same ledger entry and salt value, and the same sequence of hashes given the same ledger entry update and same sequence of salt values. One hash per ledger entry is defined by the update.

Hashes with cryptographic properties do not allow the hashes to be used to derive information on the ledger entries that they derive from. For example, DAML™ engine implementation is not compromised by hashes usable only for confirmation of validity.

In a transaction, ledger entries are added as a "group" with "all succeed" or "all fail" atomicity properties. That is the notion of DAML™ ledger transaction. Multiple parties need to authorize the transaction for it to be entered (committed), but not all parties involved in a transaction need to see all all ledger entries of the transaction. This is because a transaction may include ledger entries that are private to a subset of transaction participants. While parties are agreeing on transactions, they are technically authorizing ledger entries within the transaction. Thus, their digital signatures are tied to individual ledger entries. The "transaction" logic further ensures "all or nothing" execution logic.

Using DAML, there are three types of ledger entries. The delete type can be said to deactivate/annihilate/invalidate a previous entry by transitioning it to an inactive model. The await type embodies a permit or promise for later or future "predefined" change(s) to the ledger. The agree type requires that multiple parties each agree to one or more steps, conditions, or results.

An await entry offers the "choices" that the authorizing parties "bind themselves to allow consequences to the choices of the await." An agree entry requires that one or more parties agree on a real world change, and although its result can be deactivated, the agreement itself cannot be deleted. "Ledger logic" does not know scope, and therefore it would be indeterminable if such scope could be "deleted".

By default, all parties to an agreement need to authorize it. The agreement might supersede a previous one. An agreement is typically "eventful", but is not required to be. The syntax and the interpretation of an agreement is left entirely up to the parties to agree "off ledger". An exemplary embodiment ledger records such off ledger agreements, but does not attempt to interpret them. Under particular circumstances, such an agreement leading to an active model may meet the requirements of a legally enforceable contract in a given jurisdiction if that was the intention of the parties and their respective authorizations had legal standing. In general, the ledger does not care whether a given agreement is legally enforceable, and an exemplary embodiment makes no distinction between a general agreement and one meeting the standards of a legally enforceable contract. Where desired, the present inventive concept envisions that a master contract may be used to give DAML™ agreements legal status as contracts in particular jurisdictions.

All ledger entries, code, declarative statements, data structures and the like discussed above can be stored in a non-transient computer readable storage media. Functional steps described herein can be accomplished by computer code executed on a processor. The various data manipulations described above can be accomplished on stored data structures to create transformed data structures that are processed by a computer processor in a different manner. The various functions, such as the await function, of the embodiments allow a computing system to operate in a new manner to accomplish transactions and provide advantages not found in the prior art. The various flow chart steps can be accomplished by software modules executed on a computer processor. The cylinders illustrated in the drawing can represent data structures, such as databases storing records, which are manipulated in the described manner to allow a computing system to operate on the data and transform the data.

While the inventive concept has been described by way of example with respect to non-limiting exemplary embodiments; other alternatives, modifications, and variations will be apparent to those of ordinary skill in the pertinent art based on the teachings disclosed herein. Accordingly, the scope of the appended claims is intended to include all such alternatives, modifications and variations on the exemplary embodiments set forth herein, as well as equivalents thereof that fall within the scope and spirit of the present disclosure.

What is claimed is:

1. A computer implemented method of manipulating data structures to model a digital asset and its evolution with respect to the rights of a plurality of parties, the method comprising:

providing a first function instance configured to execute no more than once, upon the selection of a choice from one or more choices, wherein the first function is defined therein for disposition of the digital asset with respect to the rights of at least one of the plurality of parties based upon the consent of at least one of the plurality parties to fulfill the selected choice;

providing, by the one or more processors, a second function instance that requires the consent of at least one of the plurality of parties, wherein the second function instance is configured to update an append-only ledger maintained by a plurality of distinct nodes of a computer network, the second function comprising:
(i) a cryptographic authorization by a first of the plurality of distinct nodes authorizing immediate and future ledger execution impacts of the second function instance,
(ii) data identifying an authorizing subset of the plurality of nodes that must cryptographically authorize the immediate and future ledger execution impacts of the second function instance, and
(iii) data identifying a private subset of the plurality of nodes entitled to receive information pertaining to the second function instance; and
providing access to the append-only ledger for storing results of executed function instances, including the first function instance and the second function instance.

2. The method of claim 1 wherein the at least one of the plurality of parties whose respective rights are at stake is the same at least one of the plurality of parties whose consent is required.

3. The method of claim 1, further comprising providing a delete function that requires the consent of one or more parties in the plurality of parties affected by the delete function to invalidate the second function or disable the first function, wherein the append-only ledger stores the results of the delete function.

4. The method of claim 1 wherein the digital asset comprises at least one of cash and/or cash-valued payment, a fungible, equity, bond, commodity, future, right, or good.

5. The method of claim 1 wherein the selected choice is made by a delegate of the at least one of the plurality of parties.

6. The method of claim 1 wherein the selected choice is made by respective delegates of at least two of the plurality of parties.

7. The method of claim 1 wherein the append-only ledger comprises a blockchain.

8. The method of claim 1 wherein the append-only ledger may be queried for digital asset status based on pattern-matching.

9. The method of claim 1 wherein the append-only ledger may be queried for digital asset status of all modeled digital assets in the append-only ledger using queries based on top-level definitions.

10. The method of claim 1, further comprising providing a delete function to render an active model of a digital asset inactive and no longer available for future transactions.

11. A method of interpreting a modeled digital asset and its evolution with respect to the rights of a plurality of parties, the method comprising:
executing a first function instance no more than once, upon the selection of a choice from one or more choices, wherein the first function is defined therein for disposition of the digital asset with respect to the rights of at least one of the plurality of parties based upon the consent of at least one of the plurality of parties to fulfill the selected choice;
executing a second function instance that requires the consent of at least one of the plurality of parties, wherein the second function instance is configured to update an append-only ledger maintained by a plurality of distinct nodes of a computer network, the second function comprising:
(i) a cryptographic authorization by a first of the plurality of distinct nodes authorizing immediate and future ledger execution impacts of the second function instance,
(ii) data identifying an authorizing subset of the plurality of nodes that must cryptographically authorize the immediate and future ledger execution impacts of the second function instance, and
(iii) data identifying a private subset of the plurality of nodes entitled to receive information pertaining to the second function instance; and
causing results of executed function instances, including the first function instance and the second function instance, to be stored in an append-only ledger.

12. The method of claim 11 wherein the at least one of the plurality of parties whose respective rights are at stake is the same at least one of the plurality of parties whose consent is required.

13. The method of claim 11, further comprising executing a delete function that requires the consent of one or more parties in the plurality of parties affected by the delete function to invalidate the second function or disable the first function, and storing the results of the delete functions in the append-only ledger.

14. The method of claim 11 wherein the digital asset comprises at least one of cash and/or cash-valued payment, a fungible, equity, bond, commodity, future, right, or good.

15. The method of claim 11 wherein the selected choice is made by a delegate of the at least one of the plurality of parties.

16. The method of claim 11 wherein the selected choice is made by respective delegates of at least two of the plurality of parties.

17. The method of claim 11 wherein the append-only ledger comprises a blockchain.

18. The method of claim 11 wherein the append-only ledger may be queried for a status of all modeled digital assets based on pattern-matching.

19. The method of claim 11 wherein the append-only ledger may be queried for a status of all modeled digital assets in the append-only ledger using queries based on top-level definitions.

20. The method of claim 11, further comprising executing a delete function to render an active model inactive and no longer available for future transactions.

21. A digital system configured to interpret a modeled digital asset and its evolution with respect to the rights of a plurality of parties, the system comprising:
at least one processor configured to:
execute a first function instance no more than once, upon the selection of a choice from one or more choices, wherein the first function is defined therein for disposition of the digital asset with respect to the rights of at least one of the plurality of parties based upon the consent of at least one of the plurality parties to fulfill the selected choice;
execute a second function instance that requires the consent of at least one of the plurality of parties, wherein the second function instance is configured to update an append-only ledger maintained by a plurality of distinct nodes of a computer network, the second function comprising:
(i) a cryptographic authorization by a first of the plurality of distinct nodes authorizing immediate and future ledger execution impacts of the second function instance, (ii) data identifying an authorizing subset of the plurality of nodes that must cryptographically authorize the immediate and future ledger execution impacts of the second function instance, and (iii) data identifying a private subset of the plurality of nodes entitled to receive information pertaining to the second function instance; and at least one storage device configured to cause interpreted results of executed function instances, including the first function instance and the second function instance, to be stored in an append-only ledger.

22. The system of claim 21 wherein the at least one of the plurality of parties whose respective rights are at stake is the same at least one of the plurality of parties whose consent is required.

23. The system of claim 21, the processor further configured to execute a delete function that requires the consent of one or more parties in the plurality of parties affected by the delete function to invalidate the second function or disable the first function, and to store the execution results of the delete functions in the append-only ledger.

24. The system of claim 21 wherein the digital asset comprises at least one of cash and/or cash-valued payment, a fungible, equity, bond, commodity, future, right, or good.

25. The system of claim 21 wherein the selected choice is made by a delegate of the at least one of the plurality of parties.

26. The system of claim 21 wherein the selected choice is made by respective delegates of at least two of the plurality of parties.

27. The system of claim 21 wherein the append-only ledger comprises a blockchain.

28. The system of claim 21 wherein the append-only ledger may be queried for digital asset status based on pattern-matching.

29. The system of claim 21 wherein the append-only ledger may be queried for a status of all modeled digital assets in the append-only ledger using queries based on top-level definitions.

30. The system of claim 21, the processor further configured to execute a delete function to render an active model of a digital asset inactive and no longer available for future transactions.

\* \* \* \* \*